(12) United States Patent
Kurashige et al.

(10) Patent No.: US 8,503,093 B2
(45) Date of Patent: Aug. 6, 2013

(54) ZOOM LENS, OPTICAL APPARATUS AND METHOD FOR MANUFACTURING ZOOM LENS

(75) Inventors: Takamichi Kurashige, Funabashi (JP); Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 2 days.

(21) Appl. No.: 13/215,391

(22) Filed: Aug. 23, 2011

(65) Prior Publication Data

US 2012/0050884 A1 Mar. 1, 2012

(30) Foreign Application Priority Data

Aug. 31, 2010 (JP) ................................ 2010-194999
Oct. 15, 2010 (JP) ................................ 2010-232776
Aug. 5, 2011 (JP) ................................ 2011-172297

(51) Int. Cl.
*G02B 15/14* (2006.01)

(52) U.S. Cl.
USPC .......................................... 359/682; 359/689

(58) Field of Classification Search
USPC .......................................... 359/680–682, 689
See application file for complete search history.

(56) References Cited

U.S. PATENT DOCUMENTS

| | | | | |
|---|---|---|---|---|
| 7,830,616 B2 * | 11/2010 | Masugi | .......................... | 359/689 |
| 2003/0123156 A1 * | 7/2003 | Minefuji | ....................... | 359/682 |
| 2005/0200972 A1 | 9/2005 | Nose et al. | | |
| 2009/0073575 A1 * | 3/2009 | Hsu et al. | ....................... | 359/689 |
| 2009/0225198 A1 | 9/2009 | Watanabe et al. | | |
| 2010/0149657 A1 * | 6/2010 | Kuroda | .......................... | 359/689 |
| 2010/0254023 A1 * | 10/2010 | Ito | .................................. | 359/682 |

FOREIGN PATENT DOCUMENTS

| | | |
|---|---|---|
| JP | 2005-084648 A | 3/2005 |
| JP | 2005-258059 A | 9/2005 |
| JP | 2006-065182 A | 3/2006 |
| JP | 2006-133283 A | 5/2006 |
| JP | 2008-181118 A | 8/2008 |
| JP | 2008-233499 A | 10/2008 |
| JP | 2009-216920 A | 9/2009 |
| JP | 2009-237477 A | 10/2009 |

* cited by examiner

Primary Examiner — Scott J Sugarman
(74) Attorney, Agent, or Firm — Miles & Stockbridge P.C.

(57) ABSTRACT

A zoom lens ZL comprising a first lens group G1 having negative refractive power, a second lens group G2 having positive refractive power, and a third lens group G3 having positive refractive power, wherein the first lens group G1 includes a first lens having negative refractive power and a second lens which is a plastic lens having positive refractive power, the second lens group G2 includes a third lens having positive refractive power, a fourth lens having positive refractive power and a fifth lens having negative refractive power, the third lens group G3 includes a sixth lens having positive refractive power, and the conditional expressions: $1.50<(-f1)/fw<2.52$, $0.4<(-f1)/fL2<0.8$, $n2 \times n2 \times v2 < 77.0$ are satisfied respectively.

36 Claims, 39 Drawing Sheets

(EXAMPLE 1)

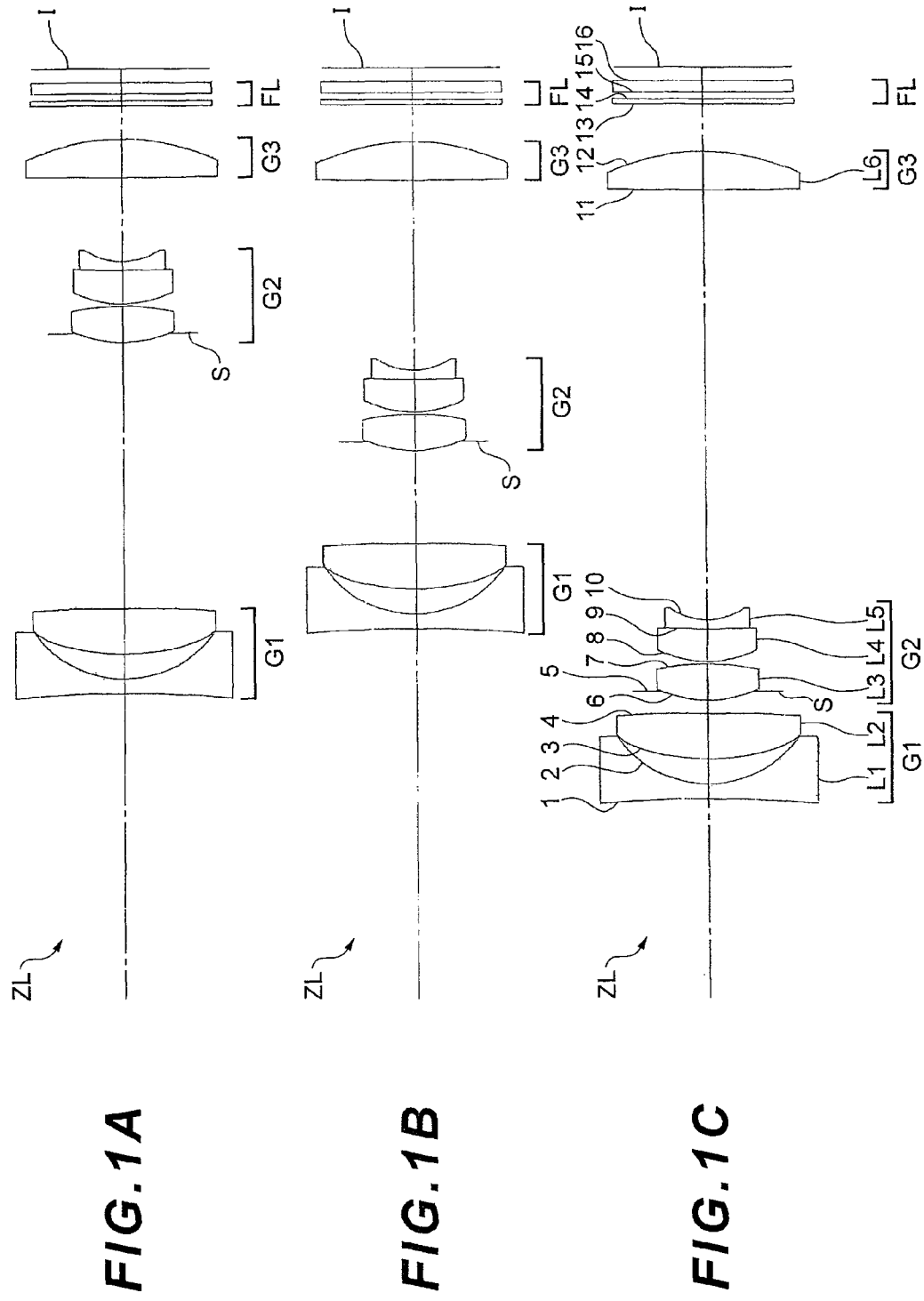

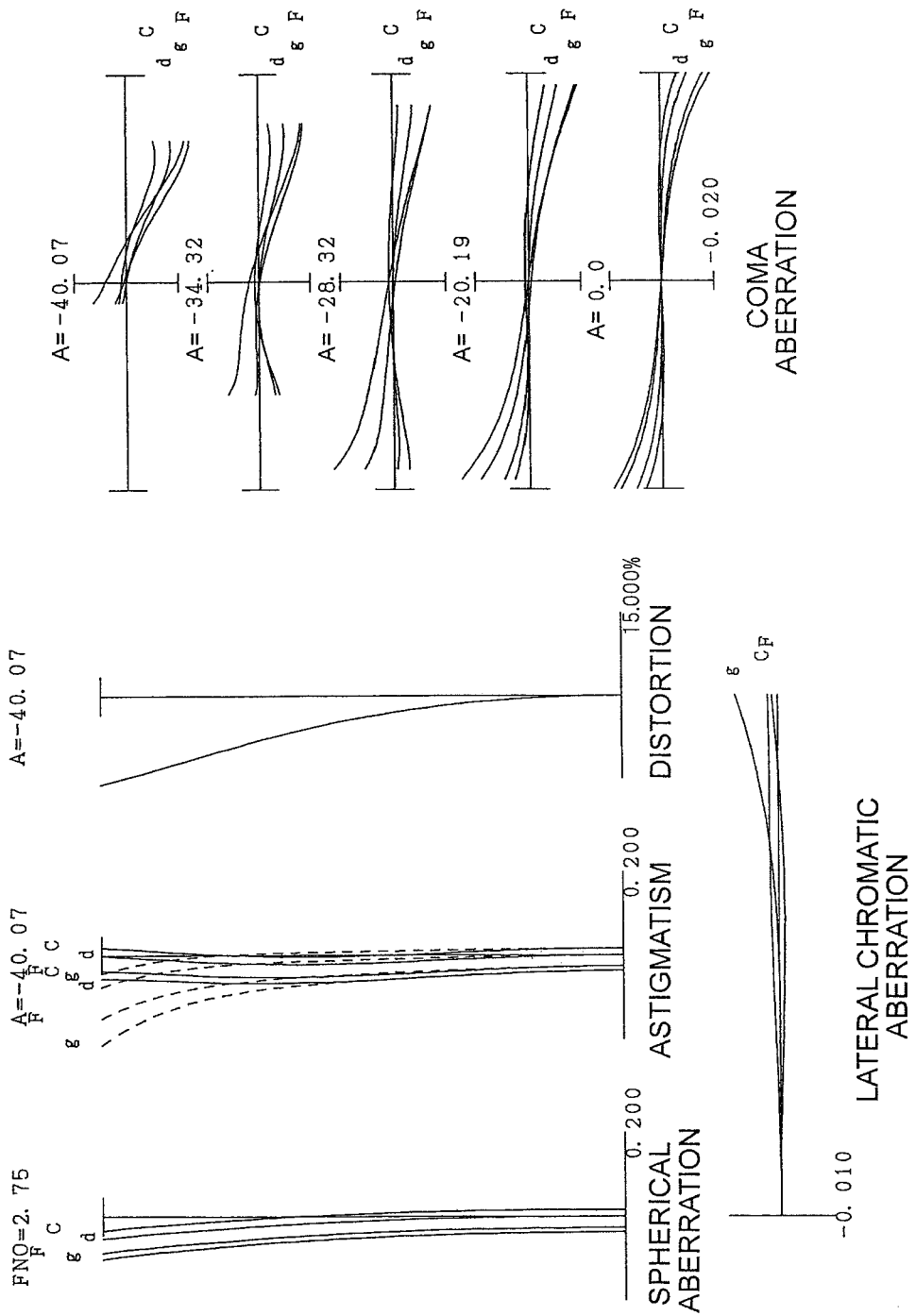

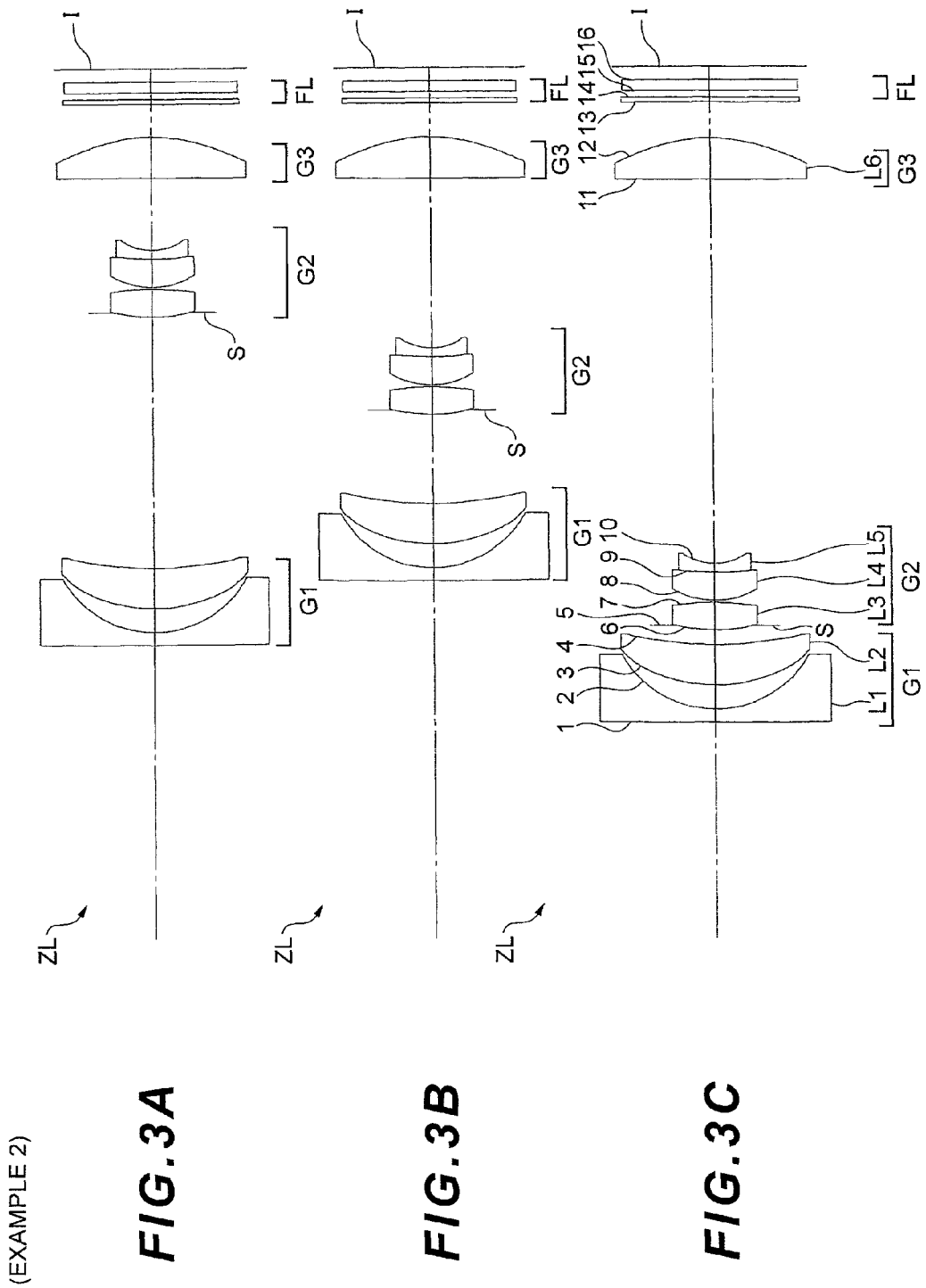

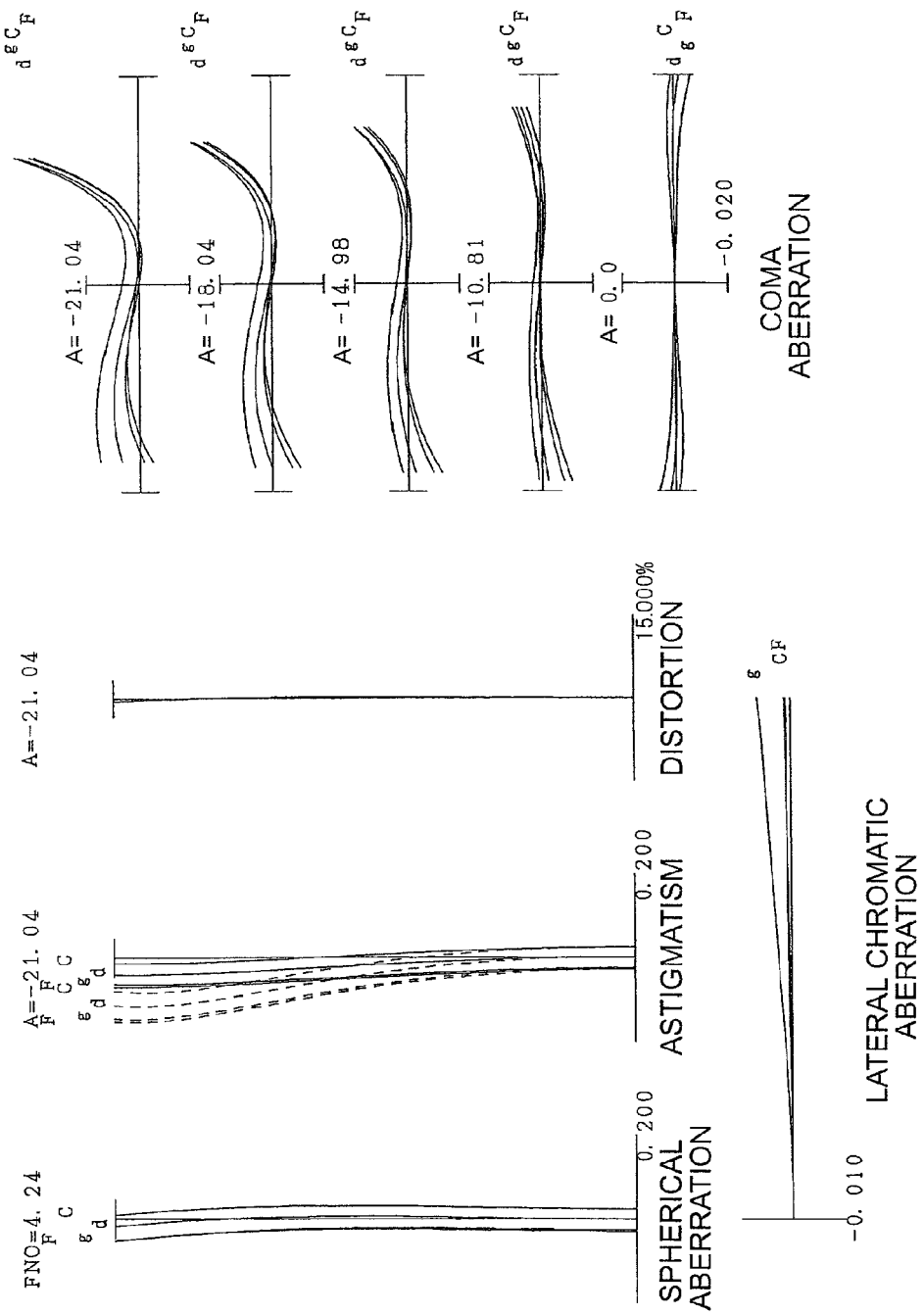

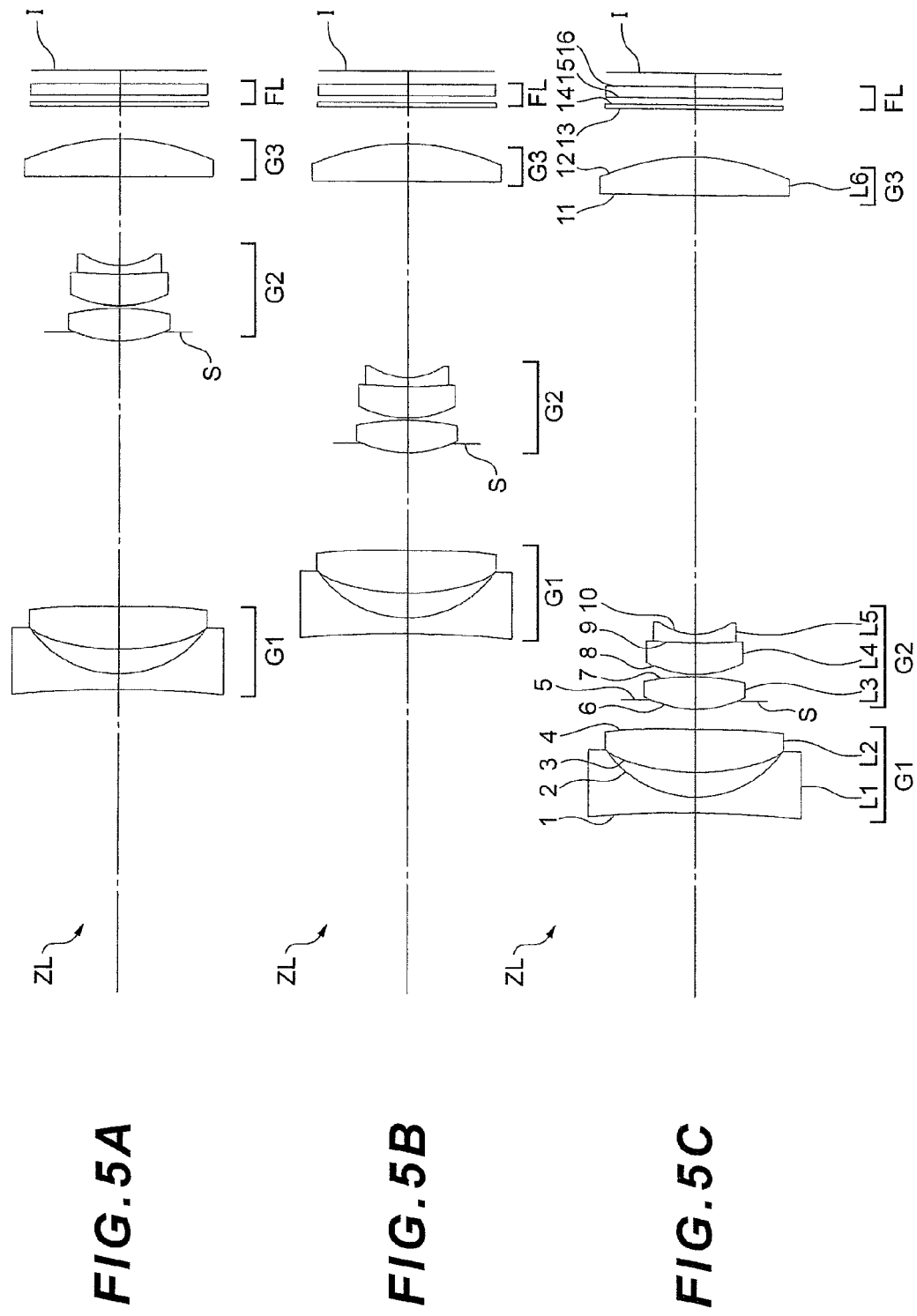

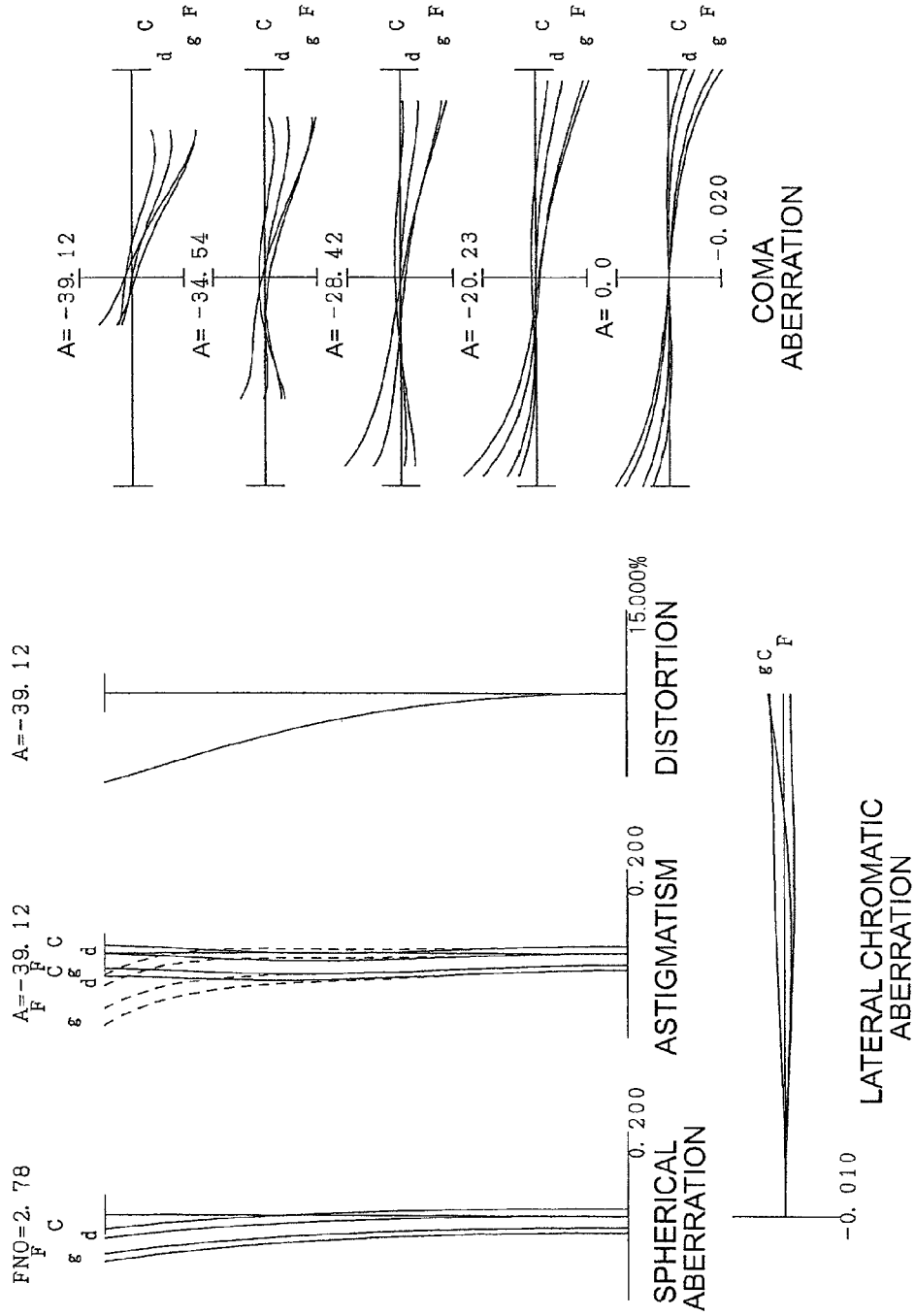

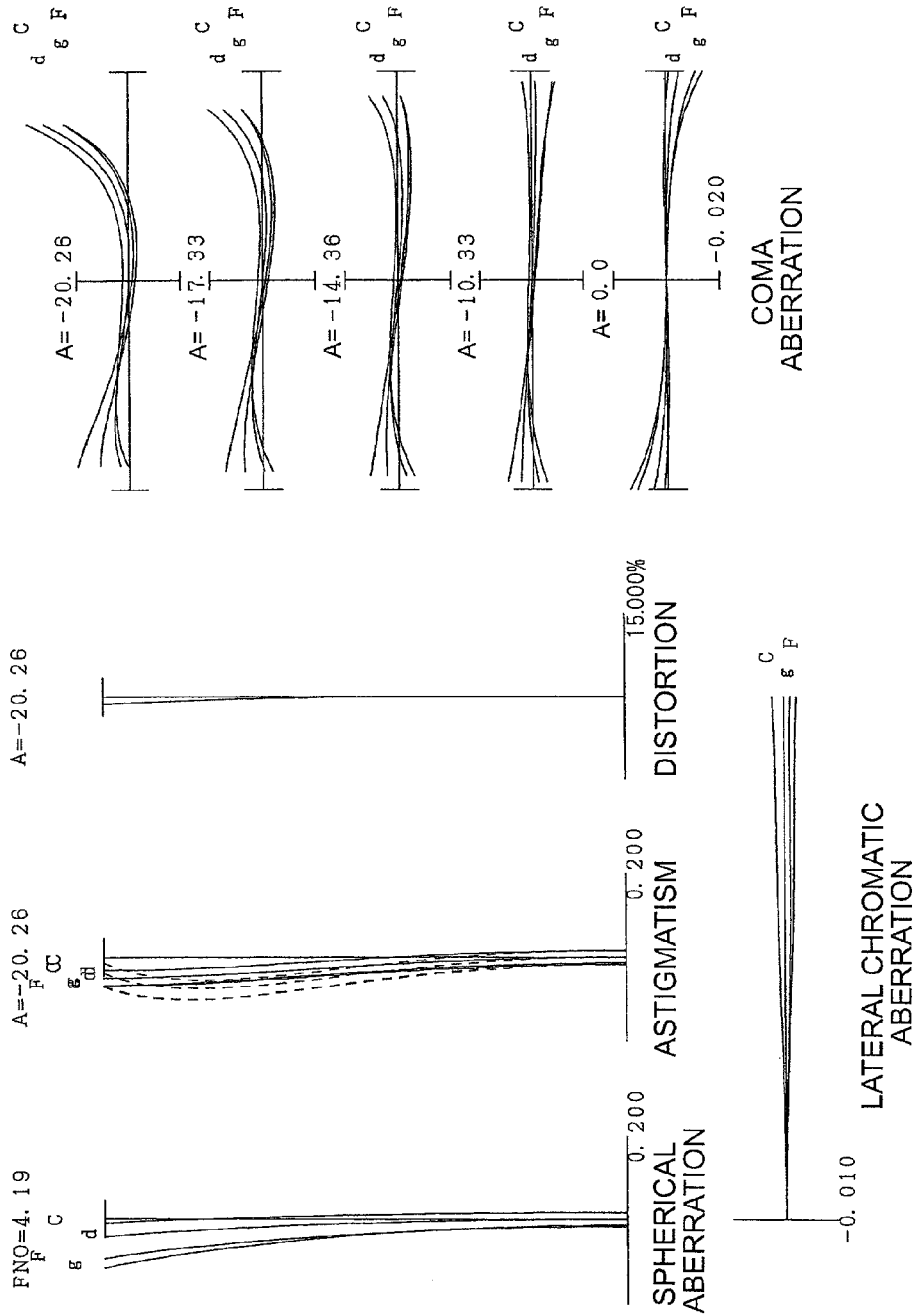

(EXAMPLE 4)

(EXAMPLE 5)

(EXAMPLE 6)

(EXAMPLE 7)

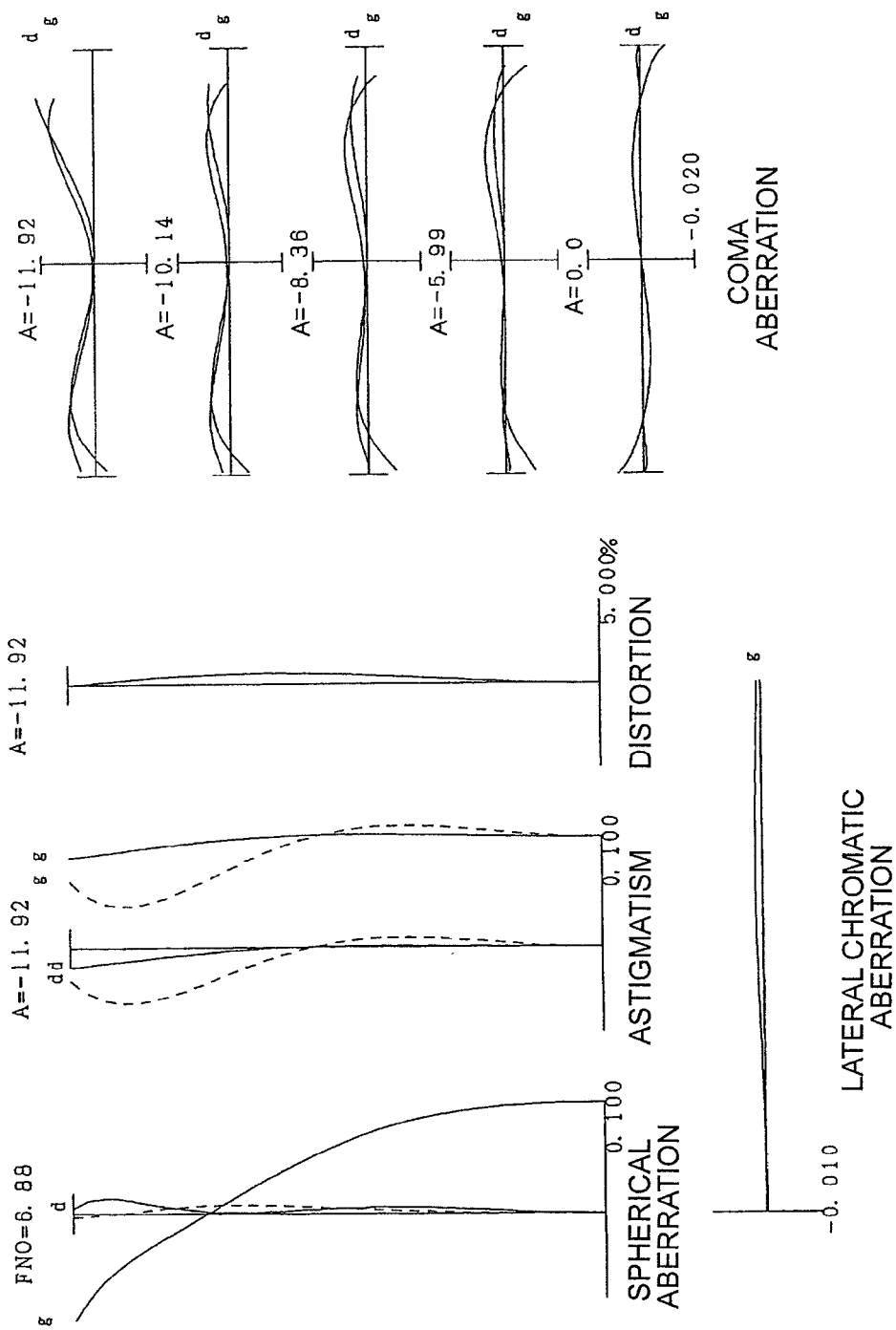

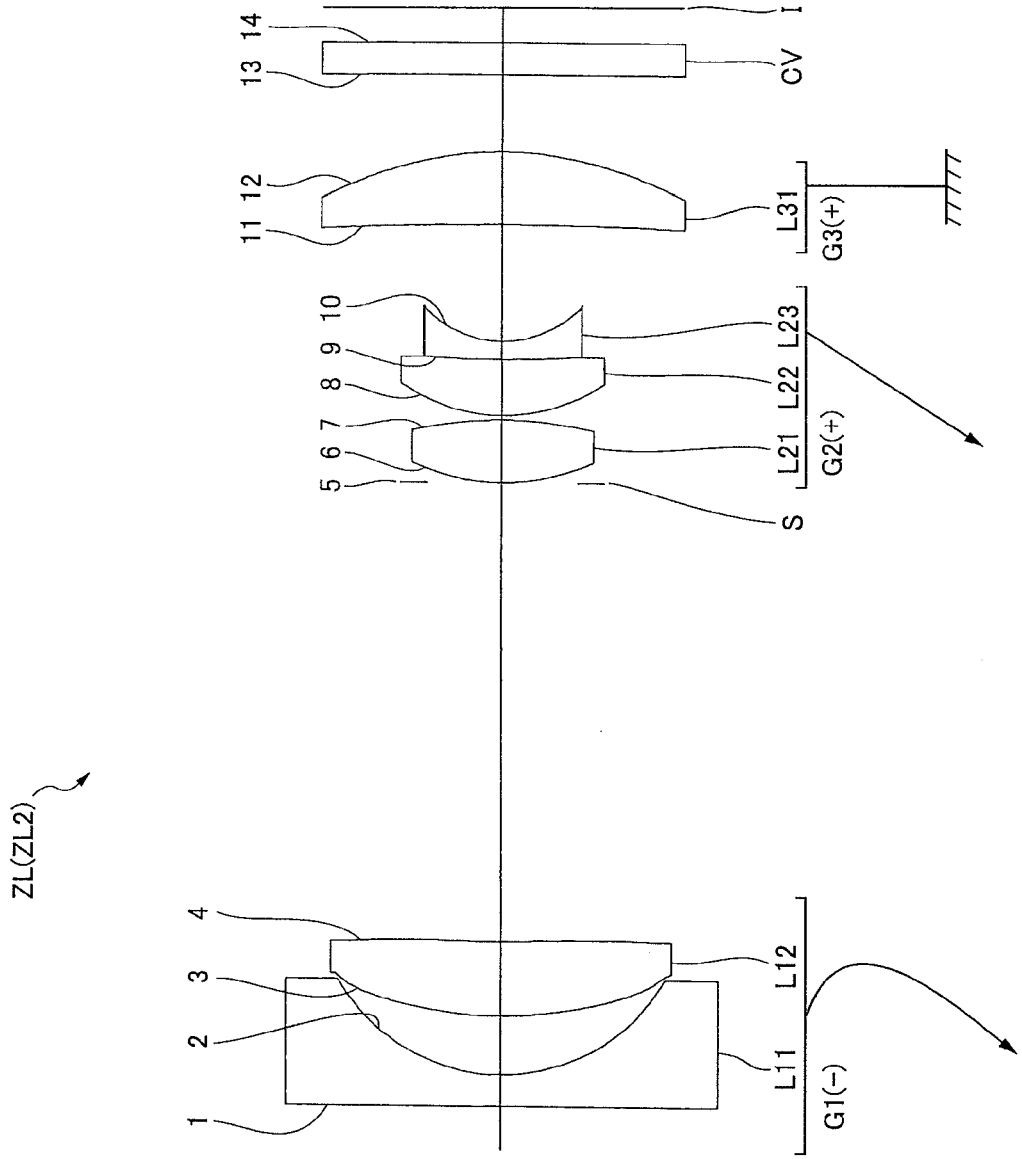

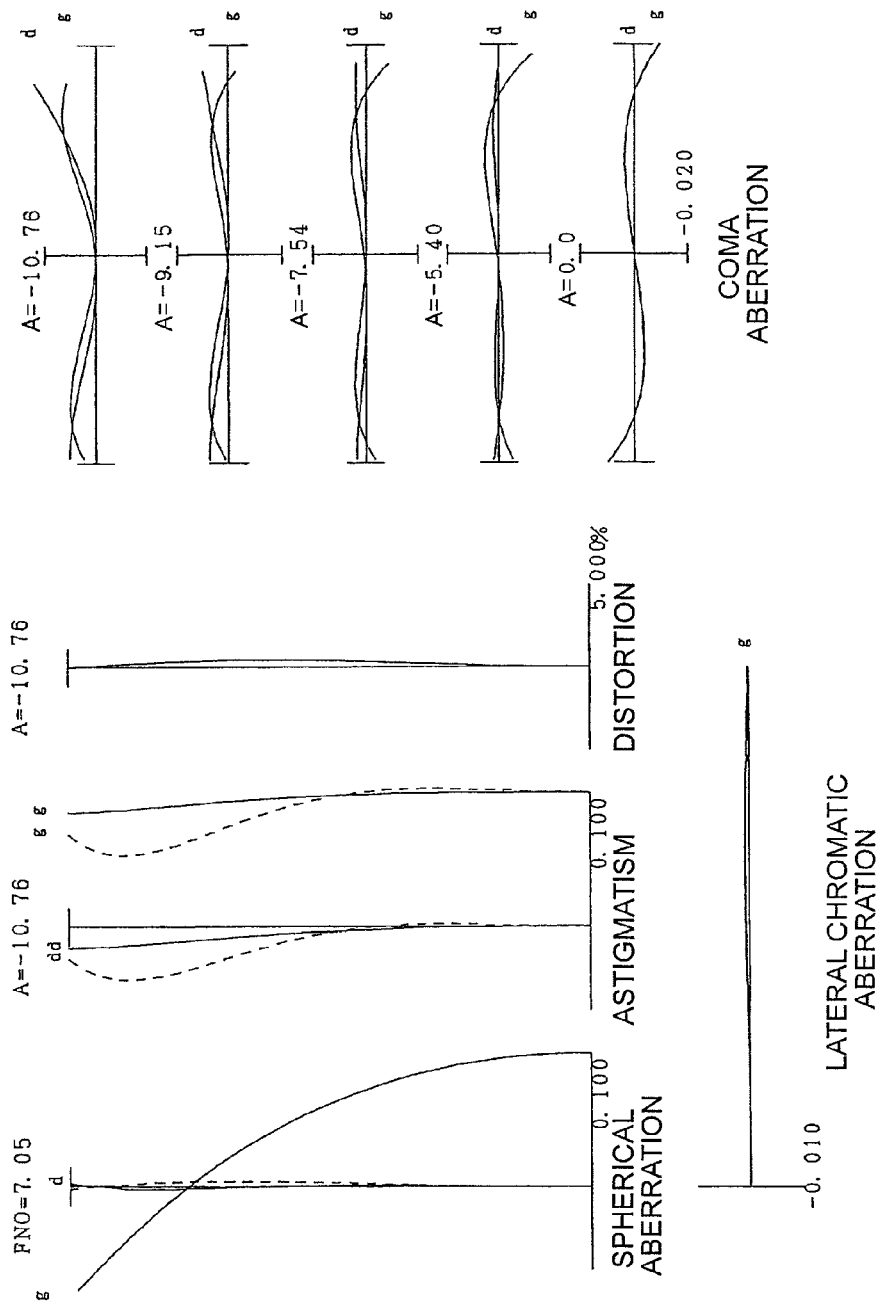

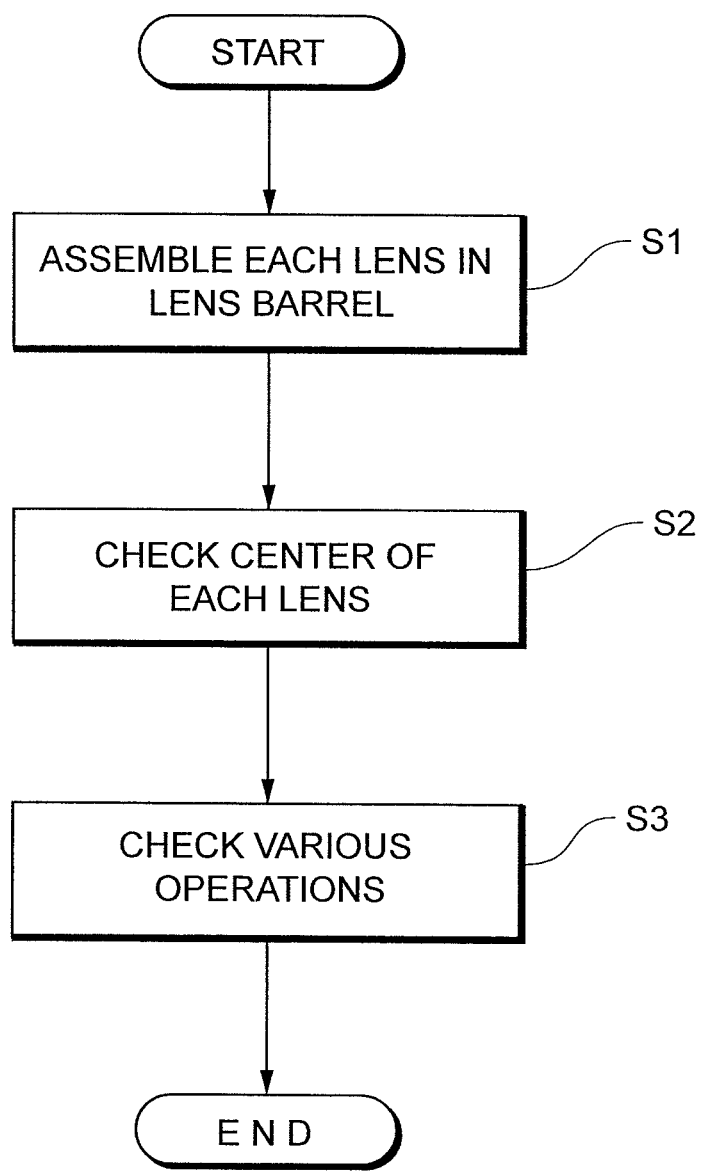

ZOOM LENS, OPTICAL APPARATUS AND METHOD FOR MANUFACTURING ZOOM LENS

RELATED APPLICATIONS

This invention claims the benefit of Japanese Patent Application Nos. 2010-194999, 2010-232776 and 2011-172297 which are hereby incorporated by reference.

TECHNICAL FIELD

The present invention relates to a zoom lens, an optical apparatus and a method for manufacturing a zoom lens.

TECHNICAL BACKGROUND

Recently in such image capturing devices as digital cameras and video cameras, smaller sizes and higher performances are demanded. As a lens to satisfy these demands, a zoom lens comprising, in order from an object, a lens group having negative refractive power, a lens group having positive refractive power and a lens group having positive refractive power is widely used. For such a zoom lens, a lens system, of which weight and cost are decreased by comprising less number of lenses and using plastic lenses instead of glass lenses, is known (e.g. see Japanese Laid-Open Patent Publication No. 2008-181118(A)).

In the case of this conventional zoom lens however, the angle of view is narrow and the zoom ratio is low, even if a smaller size, lighter weight and lower cost are implemented.

Another zoom lens that is known as a zoom lens, that meets the demands for smaller size, slimmer construction and lighter weight of the camera main unit, comprises, in order from an object, a first lens group having negative refractive power, a second lens group having positive refractive power and a third lens group having positive refractive power, wherein the first lens group is constituted by only two lenses by effectively disposing an aspherical lens as a negative lens in the first lens group (e.g. Japanese Laid-Open Patent Publication No. 2005-84648(A)).

But if an aspherical lens is used for the negative lens, a manufacturing cost increases dramatically.

SUMMARY OF THE INVENTION

With the foregoing in view, it is an object of the present invention to provide a zoom lens and an optical apparatus having good image forming performance with compact size and low cost, while having a wide angle of view and high zoom ratio, and a method for manufacturing the zoom lens.

A zoom lens according to a first aspect of the present invention comprises, in order from an object: a first lens group having negative refractive power; a second lens group having positive refractive power; and a third lens group having positive refractive power, wherein at least the first lens group and the second lens group moving along the optical axis respectively upon zooming from a wide-angle end state to a telephoto end state, and the first lens group includes, in order from the object, a first lens having negative refractive power and a second lens having positive refractive power, and the second lens is a plastic lens having an aspherical surface, the second lens group includes, in order from the object, a third lens having positive refractive power, a fourth lens and a fifth lens, and one of the fourth lens and the fifth lens is a negative lens and the other a positive lens, the third lens group includes a sixth lens having positive refractive power, and the following conditional expressions are satisfied respectively, $$1.50 < (-f1)/fw < 2.52$$

$$0.4 < (-f1)/fL2 < 0.8$$

$$n2 \times n2 \times v2 < 77.0$$

where f1 denotes a focal length of the first lens group, fw denotes a focal length of the zoom lens in the wide-angle end state, fL2 denotes a focal length of the seconds lens, n2 denotes a refractive index of the second lens, and v2 denotes an Abbe number of the second lens.

In the zoom lens according to the first aspect of the invention, it is preferable that the following conditional expressions is satisfied:

$$1.89 < f2/(-fLn) < 2.85$$

where f2 denotes a focal length of the second lens group, and fLn denotes a focal length of the negative lens out of the fourth lens and the fifth lens.

In the zoom lens according to the first aspect of the invention, it is preferable that the following conditional expression is satisfied:

$$-1.8 < (Rb+Ra)/(Rb-Ra) < 0.1$$

where Rb denotes a radius of curvature of the lens surface, which is closest to the image, of the sixth lens, and Ra denotes a radius of curvature of the lens surface, which is closest to the object, of the sixth lens.

In the zoom lens according to the first aspect of the invention, it is preferable that the following conditional expression is satisfied:

$$0.9 < (-f1)/f2 < 1.4$$

where f2 denotes a focal length of the second lens group.

In the zoom lens according to the first aspect of the invention, it is preferable that the following conditional expression is satisfied:

$$-1.2 < (Rd+Rc)/(Rd-Rc) < -0.1$$

where Rd denotes a radius of curvature of the image side lens surface of the first lens, and Rc denotes a radius of curvature of the object side lens surface of the first lens.

In the zoom lens according to the first aspect of the invention, it is preferable that the following conditional expression is satisfied:

$$0.30 < \Sigma D1/(-f1) < 0.50$$

where $\Sigma D1$ denotes a distance on the optical axis from the object side lens surface of the first lens to the image side lens surface of the second lens.

In the zoom lens according to the first aspect of the invention, it is preferable that the sixth lens has an aspherical surface.

In the zoom lens according to the first aspect of the invention, it is preferable that the sixth lens is a plastic lens.

In the zoom lens according to the first aspect of the invention, it is preferable that the following conditional expression is satisfied:

$$48.0 < v3$$

where v3 denotes an Abbe number of the third lens.

In the zoom lens according to the first aspect of the invention, it is preferable that the third lens has an aspherical surface.

In the zoom lens according to the first aspect of the invention, it is preferable that the fourth lens and the fifth lens constitute a cemented lens.

In the zoom lens according to the first aspect of the invention, it is preferable that focusing is performed from an object at infinity to an object at a finite distance by moving the third lens group along the optical axis.

An optical apparatus according to the first aspect of the present invention is an optical apparatus having a zoom lens for forming an image of an object on a predetermined surface, and the zoom lens is the zoom lens according to the first aspect of the invention.

A zoom lens according to a second aspect of the present invention comprises, in order from the object: a first lens group having negative refractive power; a second lens group having positive refractive power; and a third lens group having positive refractive power, wherein the first lens group is constituted only by one negative spherical lens and one positive lens having an air space there between, the second lens group is constituted by three or less lenses including at least one positive lens and one negative lens, and the following conditional expressions are satisfied:

$$1.4 < n12 < 1.7$$

$$2.05 < f12/(-f1) < 3.50$$

$$2.0 < (-f1)/IH < 3.3$$

where n12 denotes refractive index of the positive lens constituting the first lens group, f12 denotes a focal length of the positive lens constituting the first lens group, f1 denotes a focal length of the first lens group, and IH denotes a maximum image height on an image forming plane in a telephoto end state.

In the zoom lens according to the second aspect of the invention, it is preferable that the following conditional expression is satisfied:

$$0.8 < (-f1)/f2 < 1.8$$

where f2 denotes a focal length of the second lens group.

In the zoom lens according to the second aspect of the invention, it is preferable that the following conditional expression is satisfied:

$$15.0 < vd1 < 35.0$$

where vd1 denotes an Abbe number of the positive lens constituting the first lens group.

In the zoom lens according to the second aspect of the invention, it is preferable that the following conditional expression is satisfied:

$$55.0 < vd21 < 95.0$$

where vd21 denotes an Abbe number of the positive lens closest to the object out of the positive lenses constituting the second lens group.

In the zoom lens according to the second aspect of the invention, it is preferable that the negative spherical lens constituting the first lens group satisfies the following conditional expression:

$$0.60 < -(R12+R11)/(R12-R11) < 1.50$$

where R11 denotes a radius of curvature of the object side lens surface, and R12 denotes a radius of curvature of the image side lens surface.

In the zoom lens according to the second aspect of the invention, it is preferable that the following conditional expression is satisfied:

$$25.0 < vd22 < 55.0$$

where vd22 denotes an Abbe number of the negative lens closest to the image out of the negative lenses constituting the second lens group.

In the zoom lens according to the second aspect of the invention, it is preferable that the third lens group is constituted by one lens.

In the zoom lens according to the second aspect of the invention, it is preferable that the third lens group is constituted by plastic lenses.

In the zoom lens according to the second aspect of the invention, it is preferable that the positive lens constituting the first lens group is a plastic lens.

In the zoom lens according to the second aspect of the invention, it is preferable that an aperture stop is disposed closer to the image side than the first lens group.

In the zoom lens according to the second aspect of the invention, it is preferable that upon zooming from a wide-angle end state to a telephoto end state, the aperture stop moves along with the second lens group.

An optical apparatus according to the second aspect of the invention comprises the zoom lens according to the second aspect of the invention.

A method for manufacturing a zoom lens according to a first aspect of the invention is constructed to manufacture the zoom lens according to the first aspect of the invention.

In the method for manufacturing a zoom lens according to the first aspect of the invention, it is preferable that the following conditional expression is satisfied:

$$1.89 < f2/(-fLn) < 2.85$$

where f2 denotes a focal length of the second lens group, and fLn denotes a focal length of the negative lens out of the fourth lens and the fifth lens.

In the method for manufacturing a zoom lens according to the first aspect of the invention, it is preferable that the following conditional expression is satisfied:

$$-1.8 < (Rb+Ra)/(Rb-Ra) < 0.1$$

where Rb denotes a radius of curvature of the lens surface, which is closest to the image, of the sixth lens, and Ra denotes a radius of curvature of the lens surface, which is closest to the object, of the sixth lens.

In the method for manufacturing a zoom lens according to the first aspect of the invention, it is preferable that the following conditional expression is satisfied:

$$0.9 < (-f1)/f2 < 1.4$$

where f2 denotes a focal length of the second lens group.

In the method for manufacturing a zoom lens according to the first aspect of the invention, it is preferable that the following conditional expression is satisfied:

$$-1.2 < (Rd+Rc)/(Rd-Rc) < -0.1$$

where Rd denotes a radius of curvature of the image side lens surface of the first lens, and Rc denotes a radius of curvature of the object side lens surface of the first lens.

In the method for manufacturing a zoom lens according to the first aspect of the invention, it is preferable that the following conditional expression is satisfied:

$$0.30 < \Sigma D1/(-f1) < 0.50$$

where $\Sigma D1$ denotes a distance on the optical axis from the object side lens surface of the first lens to the image side lens surface of the second lens.

A method for manufacturing a zoom lens according to a second aspect of the invention is constructed to manufacture the zoom lens according to the second aspect of the invention.

In the method for manufacturing a zoom lens according to the second aspect of the invention, it is preferable that the following conditional expression is satisfied:

$$0.8 < (-f1)/f2 < 1.8$$

where f2 denotes a focal length of the second lens group.

In the method for manufacturing a zoom lens according to the second aspect of the invention, it is preferable that the following conditional expression is satisfied:

$$15.0 < vd1 < 35.0$$

where vd1 denotes an Abbe number of the positive lens constituting the first lens group.

In the method for manufacturing a zoom lens according to the second aspect of the invention, it is preferable that the following conditional expression is satisfied:

$$55.0 < vd21 < 95.0$$

where vd21 denotes an Abbe number of the positive lens closest to the object out of the positive lenses constituting the second lens group.

In the method for manufacturing a zoom lens according to the second aspect of the invention, it is preferable that the negative spherical lens constituting the first lens group satisfies the following conditional expression:

$$0.60 < -(R12+R11)/(R12-R11) < 1.50$$

where R11 denotes a radius of curvature of the object side lens surface, and R12 denotes a radius of curvature of the image side lens surface.

According to the present invention, good image forming performance can be implemented with small size and low cost, while having a wide angle of view and high zoom ratio.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1A is a cross-sectional view depicting a zoom lens according to Example 1 in a wide-angle end state, FIG. 1B is a cross-sectional view depicting the zoom lens in an intermediate focal length state, and FIG. 1C is a cross-sectional view depicting the zoom lens in a telephoto end state;

FIG. 3A is a cross-sectional view depicting a zoom lens according to Example 2 in a wide-angle end state, FIG. 3B is a cross-sectional view depicting the zoom lens in an intermediate focal length state, and FIG. 3C is a cross-sectional view depicting the zoom lens in a telephoto end state;

FIG. 5A is a cross-sectional view depicting a zoom lens according to Example 3 in a wide-angle end state, FIG. 5B is a cross-sectional view depicting the zoom lens in an intermediate focal length state, and FIG. 5C is a cross-sectional view depicting the zoom lens in a telephoto end state;

FIGS. 14A-C are graphs showing various aberrations of the zoom lens according to Example 7, where FIG. 14A are graphs showing various aberrations of the zoom lens upon focusing on infinity in the wide-angle end state, FIG. 14B are graphs showing various aberrations of the zoom lens upon focusing on infinity in the intermediate focal length state, and FIG. 14C are graphs showing various aberrations of the zoom lens upon focusing on infinity in the telephoto end state;

FIG. 15 is a diagram depicting a configuration and a zoom locus of the zoom lens according to Example 8;

FIGS. 16A-C are graphs showing various aberrations of the zoom lens according to Example 8, where FIG. 16A are graphs showing various aberrations of the zoom lens upon focusing on infinity in the wide-angle end state, FIG. 16B are graphs showing various aberrations of the zoom lens upon focusing on infinity in the intermediate focal length state, and FIG. 16C are graphs showing various aberrations of the zoom lens upon focusing on infinity in the telephoto end state;

FIG. 20 is a flow chart depicting a method for manufacturing the zoom lens according to the first embodiment.

DESCRIPTION OF THE EMBODIMENTS

Figure 19A:
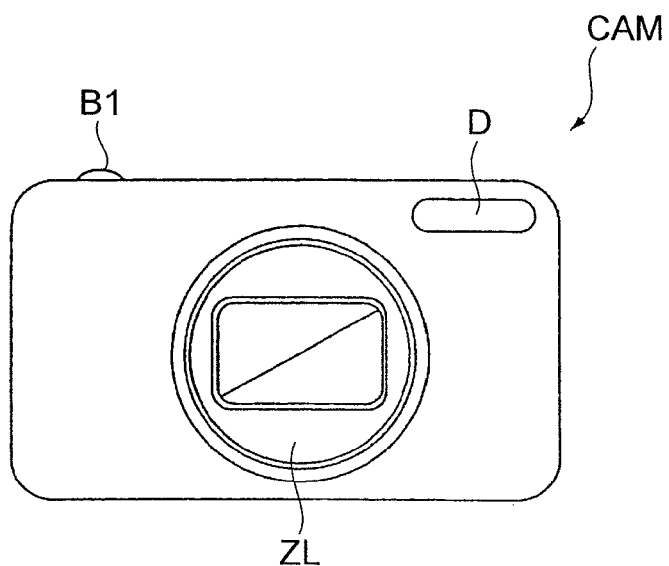
FIG. 19A is a front view of a digital still camera.
Figure 19B:
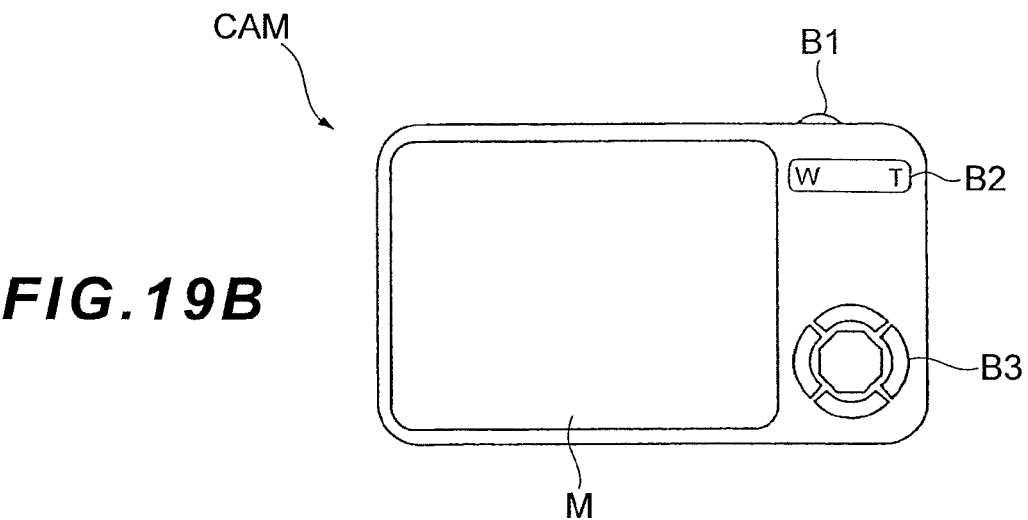
FIG. 19B is a rear view of the digital still camera.

Each embodiment and example will now be described with reference to the drawings. FIG. 19 shows a digital still camera CAM having a zoom lens according to the present invention. FIG. 19A shows a front view of the digital still camera CAM, and FIG. 19B shows a rear view of the digital still camera CAM.

If a power button, which is not illustrated, is pressed on the digital still camera CAM shown in FIG. 19, a shutter, which is not illustrated, of an image capturing lens (ZL) is released, and lights from an object are collected by the image capturing lens (ZL) and form an image on a picture element (e.g. CCD, CMOS), which is disposed on the image plane I (see FIG. 1). The object image formed on the picture element is displayed on a liquid crystal monitor M, which is disposed on the back of the digital still camera CAM. The user determines the composition of the object image while viewing the liquid crystal monitor M, then presses a release button B1 to capture the object image by the picture element, and stores it in memory, which is not illustrated.

The imaging capturing lens is constituted by a later mentioned zoom lens ZL according to an embodiment described later. The digital still camera CAM has an auxiliary light emitting unit D, which emits auxiliary light when the object is dark, a wide (W)—tele (T) button B2 for zooming the image capturing lens (zoom lens ZL) from a wide-angle end state (W) to a telephoto end state (T), and a function button B3 which is used for setting various conditions for the digital still camera CAM.

The zoom lens ZL can be classified into the first embodiment type and the second embodiment type, and the zoom lens according to the first embodiment will be described first. This zoom lens ZL comprises, in order from an object, a first lens group G1 having negative refractive power, a second lens group G2 having positive refractive power, and a third lens group G3 having positive refractive power, for example, as shown in FIG. 1. Upon zooming from a wide-angle end state to a telephoto end state, at least the first lens group G1 and the second lens group G2 move along the optical axis respectively. Between the zoom lens ZL and the image plane I, a filter group FL constituted by a low pass filter and an infrared cut-off filter, for example, is disposed.

The first lens group G1 comprises, in order from the object, a first lens L1 having negative refractive power, and a second lens L2 having positive refractive power, and the second lens L2 is a plastic lens having an aspherical surface. The second lens group G2 comprises, in order from the object, a third lens L3 having positive refractive power, a fourth lens L4 and a fifth lens L5, and one of the fourth lens L4 and a fifth lens L5 is a negative lens, and the other is a positive lens. The third lens group G3 comprises a sixth lens L6 having positive refractive power. In the zoom lens ZL having this configuration, the following conditional expression (1) is satisfied, where f1 denotes a focal length of the first lens group G1, and fw denotes a focal length of the zoom lens ZL in the wide-angle end state.

$$1.50 < (-f1)/fw < 2.52 \quad (1)$$

In the zoom lens ZL according to the present embodiment, the first lens group G1 is constituted only by the negative lens and the positive lens, in order from the object, hence the coma aberration, astigmatism, curvature of field and distortion in the wide-angle end state can be corrected, and spherical aberration in the telephoto end state can be corrected. Constituting the first lens group G1 by a small number of lenses is effective not only to decrease weight and cost of the zoom lens, but also to decrease the thickness of the zoom lens ZL in the retracted state.

Using a plastic lens for the positive lens, that is, the second lens L2, of the first lens group G1, is desirable in terms of decreasing weight and cost. It is preferable that the second lens L2 has an aspherical surface. If a lens surface of the second lens L2 is aspherical, not only coma aberration, astigmatism and curvature of field in the wide-angle end state can be corrected, but also the spherical aberration in the telephoto end state can be corrected.

If the second lens group G2 is constituted only by a positive lens, a positive lens and a negative lens (concave lens), spherical aberration and coma aberration can be corrected. Constituting the second lens group G2 by a small number of lenses is effective not only to decrease weight and cost of the zoom lens, but also to decrease the thickness of the zoom lens ZL in the retracted state.

By satisfying the conditional expression (1), angle of view can be widened and good aberration correction can be performed while decreasing the total length of the optical system. Thus according to the present embodiment, the zoom lens ZL having good image forming performance with compact size and low cost, while having a wide angle of view and high zoom ratio, and an optical apparatus (digital still camera CAM having this zoom lens), can be implemented.

The conditional expression (1) specifies the refractive power of the first lens group G1 to an appropriate range. If the lower limit value of the conditional expression (1) is not reached, correction of distortion becomes difficult, which is not desirable. If the upper limit value of the conditional expression (1) is exceeded, on the other hand, the refractive power of the first lens group G1 decreases, and the Petzval sum increases, which makes it difficult to correct astigmatism and curvature of field. The total length of the optical system upon zooming also increases, which is not desirable. Furthermore, implementing wide angle of view becomes difficult, which is not desirable.

To ensure the effects, it is preferable that the lower limit value of the conditional expression (1) is 1.85. To further ensure the effects, it is preferable that the lower limit value of the conditional expression (1) is 2.20. To ensure the effects, it is preferable that the upper limit value of the conditional expression (1) is 2.48. To further ensure the effects, it is preferable that the upper limit value of the conditional expression (1) is 2.44.

In the zoom lens ZL according to the present embodiment, it is preferable that the following conditional expression (2) is satisfied, where fL2 denotes a focal length of the second lens L2.

$$0.4<(-f1)/fL2<0.8 \quad (2)$$

The conditional expression (2) specifies the refractive power of the second lens L2, which is a plastic lens, to an appropriate range. If the lower limit value of the conditional expression (2) is not reached, correction of spherical aberration becomes difficult, which is not desirable. If the upper limit value of the conditional expression (2) is exceeded, correction of astigmatism and curvature of field becomes difficult. Movement of the focal point and deterioration of performance due to change of temperature of the plastic lens become major problems, which is not desirable. By satisfying the conditional expression (2), good aberration correction can be performed while decreasing influence of the temperature change.

To ensure the effects, it is preferable that the lower limit value of the conditional expression (2) is 0.45. To further ensure the effects, it is preferable that the lower limit value of the conditional expression (2) is 0.5. To ensure the effects, it is preferable that the upper limit value of the conditional expression (2) is 0.73. To further ensure the effects, it is preferable that the upper limit value of the conditional expression (2) is 0.65.

In the second lens L2, it is preferable that the following conditional expression (3) is satisfied, where n2 denotes a refractive index of the second lens L2 at d-line (wavelength $\lambda$=587.6 nm), and $\nu$2 denotes an Abbe number of the second lens L2 at d-line (wavelength $\lambda$=587.6 nm).

$$n2 \times n2 \times \nu2<77.0 \quad (3)$$

The conditional expression (3) specifies the refractive index and Abbe number of the second lens L2 to appropriate ranges. If the upper limit value of the conditional expression (3) is exceeded, it becomes difficult to correct longitudinal chromatic aberration which increases as the zooming rate increases, which is not desirable. Furthermore, curvature of field in the wide-angle end state increases, which is not desirable. By satisfying the conditional expression (3), good aberration correction can be performed.

To ensure the effects, it is preferable that the lower limit value of the conditional expression (3) is 73.0. To further ensure the effects, it is preferable that the lower limit value of the conditional expression (3) is 70.0.

In the zoom lens ZL according to the present embodiment, it is preferable that the following conditional expression (4) is satisfied, where f2 denotes a focal length of the second lens group G2, and fLn denotes a focal length of the negative lens out of the fourth lens L4 and the fifth lens L5.

$$1.89<f2/(-fLn)<2.85 \quad (4)$$

The conditional expression (4) specifies a ratio of the focal length of the negative lens, out of the fourth lens L4 and the fifth lens L5, with respect to the focal length of the second lens group G2. If the lower limit value of the conditional expression (4) is not reached, correction of spherical aberration in the telephoto end state becomes insufficient, which is not desirable. If the upper limit value of the conditional expression (4) is exceeded, on the other hand, correction of spherical aberration in the telephoto end state becomes excessive, which is not desirable. By satisfying the conditional expression (4), good aberration correction can be performed.

To ensure the effects, it is preferable that the lower limit value of the conditional expression (4) is 1.94. To further ensure the effects, it is preferable that the lower limit value of the conditional expression (4) is 1.99. To ensure the effects, it is preferable that the upper limit value of the conditional expression (4) is 2.78. To further ensure the effects, it is preferable that the upper limit value of the conditional expression (4) is 2.70.

In the zoom lens ZL according to the present embodiment, it is preferable that the following conditional expression (5) is satisfied, where Rb is a radius of curvature of the image side lens surface of the sixth lens L6, and Ra denotes a radius of curvature of the object side lens surface of the sixth lens L6.

$$-1.8<(Rb+Ra)/(Rb-Ra)<0.1 \quad (5)$$

The conditional expression (5) specifies an appropriate range in the shape of the third lens group G3. If the lower limit value of the conditional expression (5) is not reached, it becomes difficult to correct coma aberration, astigmatism and curvature of field, which is not desirable. If the upper limit value of the conditional expression (5) is exceeded, on the other hand, it becomes difficult to correct astigmatism, curvature of field and distortion in the wide-angle end state, which is not desirable. By satisfying the conditional expression (5), good aberration correction can be performed.

To ensure the effects, it is preferable that the lower limit value of the conditional expression (5) is $-1.5$. To further ensure the effects, it is preferable that the lower limit value of the conditional expression (5) is $-1.2$. To ensure the effects, it is preferable that the upper limit value of the conditional expression (5) is $-0.4$. To further ensure the effects, it is preferable that the upper limit value of the conditional expression (5) is $-0.7$.

In the zoom lens ZL according to the present embodiment, it is preferable that the following conditional expression (6) is satisfied, where f2 denotes a focal length of the second lens group G2.

$$0.9<(-f1)/f2<1.4 \quad (6)$$

The conditional expression (6) specifies a ratio of the focal length of the first lens group G1 with respect to the focal length of the second lens group G2. If the lower limit value of the conditional expression (6) is not reached, correction of distortion in the wide-angle end state becomes difficult, which is not desirable. If the upper limit value of the conditional expression (6) is exceeded, on the other hand, the refractive power of the second lens group G2 increases, and correction of spherical aberration and coma aberration becomes difficult. By satisfying the conditional expression (6), good aberration correction can be performed.

To ensure the effects, it is preferable that the lower limit value of the conditional expression (6) is 1.0. To further ensure the effects, it is preferable that the lower limit value of the conditional expression (6) is 1.1. To ensure the effects, it is preferable that the upper limit value of the conditional expression (6) is 1.38. To further ensure the effects, it is preferable that the upper limit value of the conditional expression (6) is 1.35.

In the zoom lens ZL according to the present embodiment, it is preferable that the following conditional expression (7) is satisfied, where Rd denotes a radius of curvature of the image side lens surface of the first lens L1, and Rc denotes a radius of curvature of the object side lens surface of the first lens L1.

$$-1.2<(Rd+Rc)/(Rd-Rc)<-0.1 \quad (7)$$

The conditional expression (7) specifies an appropriate range of the shape of the first lens L1. If the lower limit value of the conditional expression (7) is not reached, it becomes difficult to correct coma aberration, astigmatism and curvature of field, which is not desirable. If the upper limit value of the conditional expression (7) is exceeded, on the other hand, correction of distortion in the wide-angle end state becomes difficult, which is not desirable. By satisfying the conditional expression (7), good aberration correction can be performed.

To ensure the effects, it is preferable that the lower limit value of the conditional expression (7) is −1.1. To further ensure the effects, it is preferable that the lower limit value of the conditional expression (7) is −1.05. To ensure the effects, it is preferable that the upper limit value of the conditional expression (7) is −0.4. To further ensure the effects, it is preferable that the upper limit value of the conditional expression (7) is −0.6.

In the zoom lens ZL according to the present embodiment, it is preferable that the following conditional expression (8) is satisfied, where $\Sigma D1$ denotes a distance on the optical axis from the object side lens surface of the first lens L1 to the image side lens surface of the second lens L2.

$$0.30 < \Sigma D1/(-f1) < 0.50 \quad (8)$$

The conditional expression (8) specifies an appropriate range of the thickness of the first lens group G1 on the optical axis. If the lower limit value of the conditional expression (8) is not reached, it becomes difficult to correct astigmatism and curvature of field in the wide-angle end state, which is not desirable. If the upper limit value of the conditional expression (8) is exceeded, on the other hand, correction of spherical aberration in the telephoto end state becomes difficult. Furthermore, the thickness of the zoom lens in the retracted state increases, which is not desirable. By satisfying the conditional expression (8), good aberration correction can be performed while decreasing the thickness of the zoom lens in the retracted state.

It is preferable that the lower limit value of the conditional expression (8) is 0.33. It is more preferable that the lower limit value of the conditional expression (8) is 0.35. To ensure the effects, it is preferable that the upper limit value of the conditional expression (8) is 0.46. To further ensure the effects, it is preferable that the upper limit value of the conditional expression (8) is 0.42.

In the zoom lens ZL according to the present embodiment, it is preferable that the sixth lens L6 has an aspherical surface. By constituting the lens surface of the sixth lens L6 by an aspherical surface, astigmatism and curvature of field can be corrected.

In the zoom lens ZL according to the present embodiment, it is preferable that the sixth lens L6 is a plastic lens. If the sixth lens L6 is a plastic lens, lens can be easily processed and deterioration of optical performance due to processing errors can be prevented, which is desirable. Even if the image plane is shifted, drawing performance is not diminished very much, which is desirable.

In the zoom lens ZL, it is preferable that the following conditional expression (9) is satisfied, where ν3 is an Abbe number of the third lens L3 at d-line (wavelength λ=587.6 nm).

$$48.0 < \nu 3 \quad (9)$$

The conditional expression (9) specifies an Abbe number of the third lens L3 to an appropriate range. If the lower limit value of the conditional expression (9) is not reached, it becomes difficult to correct longitudinal chromatic aberration which increases as the zooming ratio increases, which is not desirable. By satisfying the conditional expression (9), good aberration correction can be performed.

It is preferable that the lower limit value of the conditional expression (9) is 54.0. It is more preferable that the lower limit value of the conditional expression (9) is 60.0.

In the zoom lens ZL according to the present embodiment, it is preferable that the third lens L3 has an aspherical surface. Constituting the lens surface of the third lens L3 by an aspherical surface, spherical aberration and coma aberration can be corrected.

In the zoom lens ZL according to the present embodiment, it is preferable that the fourth lens L4 and the fifth lens L5 constitute a cemented lens. By this configuration, longitudinal chromatic aberration and lateral chromatic aberration can be corrected well.

In the zoom lens ZL according to the present embodiment, it is preferable that focusing is performed from an object at infinity to an object at a finite distance by moving the third lens group G3 along the optical axis. Using the third lens group G3 for focusing can decrease fluctuation of various aberrations, especially curvature of field and astigmatism, upon focusing on an object at a finite distance, while preventing a drop of quantity of peripheral light.

A method for manufacturing the zoom lens ZL having the above mentioned configuration will be described with reference to FIG. 20. First the first lens group G1, the second lens group G2 and the third lens group G3 of the present embodiment are assembled in a cylindrical lens barrel (step S1). Here each lens of the first to the third lens groups G1 to G3 is disposed so that the above mentioned conditional expression (1), conditional expression (2) and conditional expression (3) among others are satisfied respectively. When each lens is assembled in the lens barrel, each lens group may be assembled in the lens barrel one at a time in order along the optical axis, or a part or all of the lens groups may be integratedly held on a holding member, and then assembled in the lens barrel. After assembling each lens group in the lens barrel, it is checked whether the object image is formed in a state where each lens group is assembled in the lens barrel, that is, whether the center of each lens group is aligned (step S2). After checking whether an image is formed, various operations of the zoom lens ZL are checked (step S3).

Examples of various operations are a zoom operation in which lens groups which perform zooming (e.g. the first lens group G1 and the second lens group G2) move along the optical axis, a focusing operation in which a lens group which performs focusing from an object at a long distance to an object at a short distance (e.g. the third lens group G3) moves along the optical axis, and a hand motion blur correction operation in which at least a part of the lenses move so as to have components orthogonal to the optical axis. In the present embodiment, upon zooming from the wide-angle end state to the telephoto end state, at least the first lens group G1 and the second lens group G2 move along the optical axis, so that the distance between the first lens group G1 and the second lens group G2 decreases, and the distance between the second lens group G2 and the third lens group G3 increases. The sequence of checking the various operations is arbitrary. According to this manufacturing method, a zoom lens ZL having good image forming performance with compact size and low cost while having a wide-angle of view and high zoom ratio, can be implemented.

EXAMPLES

Example 1

Each example of the first embodiment will now be described with reference to the drawings. Example 1 will be described first using FIG. 1, FIG. 2 and Table 1. FIG. 1A is a cross-sectional view depicting a zoom lens according to Example 1 in a wide-angle end state, FIG. 1B is a cross-sectional view depicting the zoom lens in an intermediate focal length state, and FIG. 1C is a cross-sectional view depicting the zoom lens in a telephoto end state. The zoom lens ZL according to Example 1 comprises, in order from an object, a first lens group G1 having negative refractive power, a second lens group G2 having positive refractive power, and a third lens group G3 having positive refractive power. The first lens group G1 and the second lens group G2 move along the optical axis respectively upon zooming from the wide-angle end state (W) to the telephoto end state (T), so that the distance between the first lens group G1 and the second lens group G2 decreases, and the distance between the second lens group G2 and the third lens group G3 increases. An aperture stop S is disposed between the first lens group G1 and the second lens group G2.

The first lens group G1 comprises, in order from the object, a first lens L1 which is a biconcave negative lens, and a second lens L2 which is a positive meniscus lens having a convex surface facing the object, and both lens surfaces of the second lens L2 are aspherical. The second lens group G2 comprises, in order from the object, a third lens L3 which is a biconvex positive lens, a fourth lens L4 which is a positive meniscus lens having a convex surface facing the object, and a fifth lens L5 which is a negative meniscus lens having a convex surface facing the object, and both lens surfaces of the third lens L3 are aspherical. The fourth lens L4 and the fifth lens L5 are cemented to a cemented lens. The third lens group G3 comprises only a sixth lens L6, which is a biconvex positive lens, and a lens surface of the sixth lens L6 facing an image plane I is aspherical. The second lens L2 and the sixth lens L6 are plastic lenses. Focusing from an object at infinity to an object at a finite distance is performed by moving the third lens group G3 along the optical axis.

The aperture stop S is disposed near the object side of the third lens L3, which is located closest to the object in the second lens group G2, and moves along with the second lens group G2 upon zooming from the wide-angle end state to the telephoto end state. A filter group FL disposed between the third lens group G3 and the image plane I is constituted by a low pass filter, infrared cut-off filter or the like.

Table 1 to Table 6 shown below are tables listing each data of the zoom lenses according to Example 1 to Example 6. In [General Data] of each table, f is a focal length, FNo is an F number, 2ω is an angle of view (maximum incident angle: unit is "°"), Y is a maximum image height, BF is back focus (converted to air), and TL is a total lens length (converted to air). In [Lens Data], the surface number is a sequence of the lens surface counted from the object, r is a radius of curvature of the lens surface, d is a distance to the next lens surface, nd is a refractive index at d-line (wavelength λ=587.6 nm), and vd is an Abbe number at d-line (wavelength λ=587.6 nm). "*" attached at the right of the surface number indicates that this lens surface is aspherical. "∞" in the radius of curvature indicates a plane, and the refractive index of air nd=1.000000 is omitted.

In [Aspherical Data], an aspherical coefficient is given by the following conditional expression (10), where y denotes the height in the direction perpendicular to the optical axis, X(y) denotes a displacement amount at the height y in the optical axis direction, R denotes a radius of curvature (paraxial radius of curvature) of a reference spherical surface, κ denotes a conical coefficient, and An denotes an aspherical coefficient of degree n (n=4, 6, 8, 10). In each example, the aspherical coefficient A2 of degree 2 is "0", which is omitted here. In [Aspherical Data], "E-n" means "×10$^{-n}$".

$$X(y)=(y^2/R)/\{1+(1-\kappa \times y^2/R^2)^{1/2}\}+A4 \times y^4+A6 \times y^6+A8 \times y^8+A10 \times y^{10} \tag{10}$$

In [Variable Distance Data], a focal length f from the wide-angle end state to the telephoto end state and a value of each variable length are shown. In [Conditional Expression Correspondence Value], values corresponding to each conditional expression are shown, and here f1 is a focal length of the first lens group G1, f2 is a focal length of the second lens group G2, fw is a focal length of the zoom lens ZL in the wide-angle end state, fL2 is a focal length of the second lens L2, fLn is a focal length of the negative lens out of the fourth lens L4 and the fifth lens L5, and ΣD1 is a distance on the optical axis from the object side lens surface of the first lens L1 to the image side lens surface of the second lens L2. "mm" is normally used for the unit of the focal length f, radius of curvature r, surface distance d and other lengths listed in all of data values herein below, but the unit is not limited to "mm" since an equivalent optical performance is obtained even if an optical system is proportionally expanded or proportionally reduced. The same reference symbols as this example are also used for the data values of Example 2 to Example 6 to be described later.

Table 1 shows each data of Example 1. The surface numbers 1 to 16 in Table 1 correspond to the surfaces 1 to 16 in FIG. 1, and the group numbers G1 to G3 in Table 1 correspond to each lens group G1 to G3 in FIG. 1. In Example 1, each lens surface of the third surface, fourth surface, sixth surface, seventh surface and twelfth surface is formed to be aspherical.

TABLE 1

[General Data]
zoom ratio = 4.71

| wide-angle end | intermediate focal length | telephoto end |
|---|---|---|
| f = 4.11 | 8.92 | 19.37 |
| FNO = 2.75 | 4.14 | 7.16 |
| 2ω = 80.14 | 40.36 | 19.06 |
| Y = 2.90 | 3.25 | 3.25 |
| BF = 2.82 | 3.00 | 3.46 |
| TL = 27.33 | 24.49 | 32.01 |

[Lens Data]

| surface number | r | d | nd | vd |
|---|---|---|---|---|
| 1 | −53.7096 | 0.6500 | 1.75500 | 52.34 |
| 2 | 4.5989 | 1.1000 | | |
| 3* | 9.5753 | 2.0000 | 1.60740 | 27.00 |
| 4* | 227.1210 | (d4) | | |
| 5 | ∞ | −0.4000 | | (aperture stop) |
| 6* | 4.7065 | 1.6000 | 1.49589 | 82.24 |
| 7* | −9.3977 | 0.1000 | | |
| 8 | 4.4565 | 1.4500 | 1.83481 | 42.73 |
| 9 | 42.7350 | 0.4000 | 1.90366 | 31.27 |
| 10 | 2.7198 | (d10) | | |
| 11 | 200.0000 | 1.7000 | 1.53153 | 55.95 |
| 12* | −8.3030 | (d12) | | |
| 13 | ∞ | 0.2100 | 1.51680 | 63.88 |
| 14 | ∞ | 0.3000 | | |
| 15 | ∞ | 0.5000 | 1.51680 | 63.88 |
| 16 | ∞ | 0.6000 | | |

TABLE 1-continued

[Aspherical Data]

third surface k = 5.4923, A4 = −3.00120E−04, A6 = −8.05140E−05,
A8 = 5.12070E−06, A10 = −8.89660E−08
fourth surface k = 1.0000, A4 = −6.76820E−04, A6 = −3.72700E−05,
A8 = 2.11400E−06, A10 = 3.04940E−08
sixth surface k = 0.0395, A4 = −1.06920E−04, A6 = 0.00000E+00,
A8 = 0.00000E+00, A10 = 0.00000E+00
seventh surface k = −4.5000, A4 = 0.00000E+00, A6 = 0.00000E+00,
A8 = 0.00000E+00, A10 = 0.00000E+00
twelfth surface k = 1.0000, A4 = 7.62620E−04, A6 = −3.12830E−05,
A8 = 9.28290E−07, A10 = 0.00000E+00

[Variable Distance Data]

| wide-angle end | intermediate focal length | telephoto end |
|---|---|---|
| f = 4.11 | 8.92 | 19.37 |
| d4 = 12.195 | 4.524 | 0.971 |
| d10 = 3.709 | 8.363 | 18.975 |
| d12 = 1.456 | 1.636 | 2.092 |

[Zoom Lens Group Data]

| group no. | first surface of group | focal length of group |
|---|---|---|
| G1 | 1 | −9.40026 |
| G2 | 6 | 7.59000 |
| G3 | 11 | 15.04092 |

[Conditional Expression Correspondence Value]

f1 = −9.40026
f2 = 7.59000
fw = 4.11000
fL2 = 16.40125
fLn = −3.22968
ΣD1 = 3.75
| Conditional Expression (1) | (−f1)/fw = 2.28717 |
| Conditional Expression (2) | (−f1)/fL2 = 0.57314 |
| Conditional Expression (3) | n2 × n2 × ν2 = 69.76084 |
| Conditional Expression (4) | f2/(−fLn) = 2.35008 |
| Conditional Expression (5) | (Rb + Ra)/(Rb − Ra) = −0.92028 |
| Conditional Expression (6) | (−f1)/f2 = 1.23851 |
| Conditional Expression (7) | (Rd + Rc)/(Rd − Rc) = −0.84226 |
| Conditional Expression (8) | ΣD1/(−f1) = 0.39893 |
| Conditional Expression (9) | ν3 = 82.24 |

In this way, all of the conditional expressions (1) to (9) are satisfied in this example.

Figure 2B:
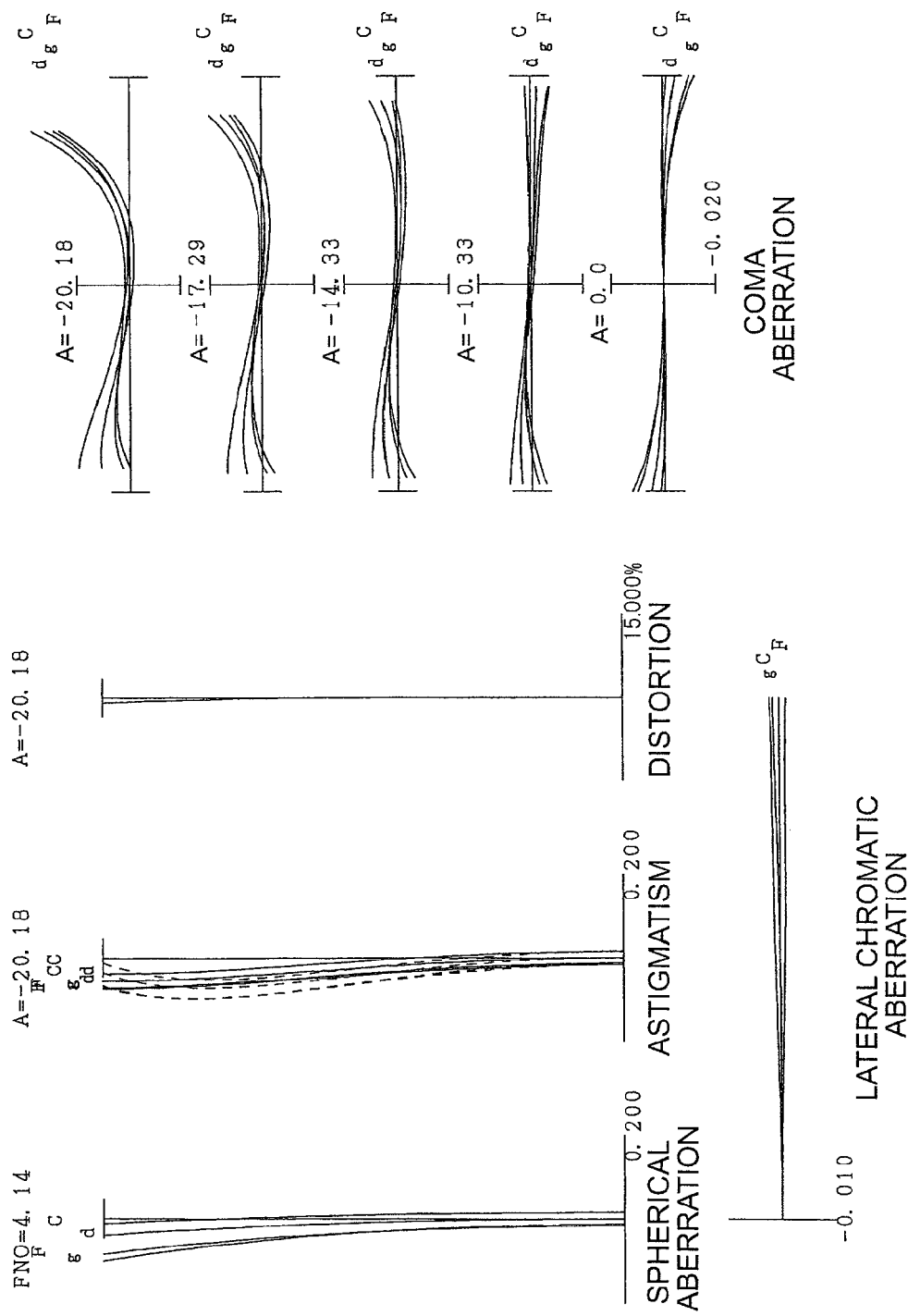
FIG. 2A are graphs showing various aberrations of the zoom lens according to Example 1 upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.
Figure 2C:
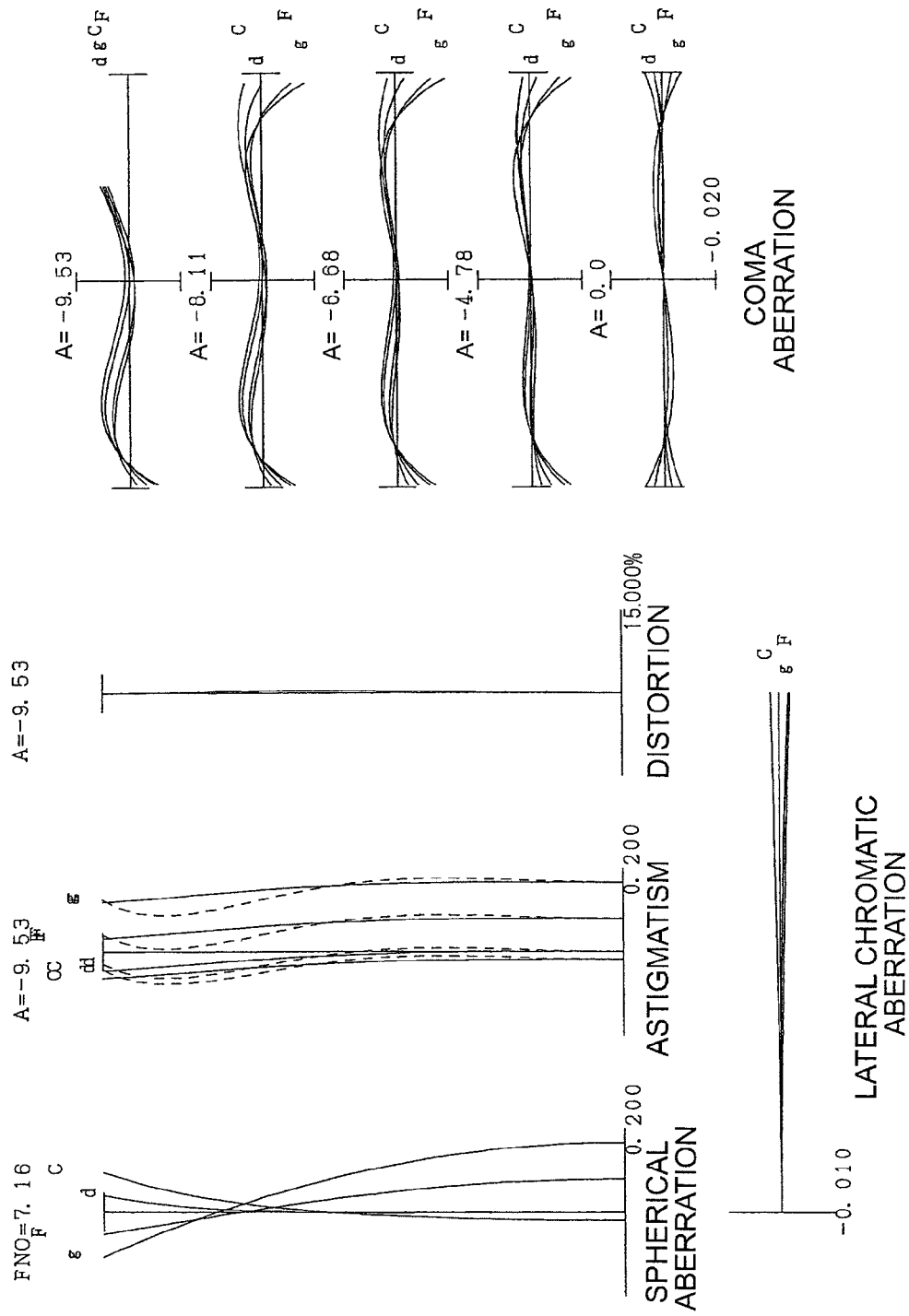

FIG. 2A to FIG. 2C are graphs showing various aberrations of the zoom lens ZL according to Example 1. FIG. 2A are graphs showing various aberrations of the zoom lens upon focusing on infinity in the wide-angle end state (f=4.11 mm), FIG. 2B are graphs showing various aberrations of the zoom lens upon focusing on infinity in the intermediate focal length state (f=8.92 mm), and FIG. 2C are graphs showing various aberrations of the zoom lens upon focusing on infinity in the telephoto end state (f=19.37 mm). In each graph showing aberrations, FNo denotes an F number, and A denotes a half angle of view with respect to each image height. In each graph showing aberrations, d denotes an aberrations at d-line (λ=587.6 nm), g at g-line (λ=435.8 nm), C at C-line (λ=656.3 nm) and F at F-line (λ=486.1 nm) respectively. In the graph showing astigmatism, the solid line indicates a sagittal image surface, and the broken line indicates the meridional image surface. The description on the graphs showing aberrations is the same for the other examples.

In Example 1, as the respective graphs on aberrations show, various aberrations are corrected well in each focal length state from the wide-angle end state to the telephoto end state, and excellent optical performance is exhibited. As a result, excellent optical performance can be ensured for the digital still camera CAM as well, by installing the zoom lens ZL of Example 1.

Example 2

Example 2 will now be described using FIG. 3, FIG. 4 and Table 2. FIG. 3A is a cross-sectional view depicting a zoom lens according to Example 2 in a wide-angle end state, FIG. 3B is a cross-sectional view depicting the zoom lens in an intermediate focal length state, and FIG. 3C is a cross-sectional view depicting the zoom lens in a telephoto end state. The zoom lens of Example 2 has the same configuration as the zoom lens of Example 1, except for a part of the shape of the first lens group G1, therefore each component is denoted with the same reference symbol as Example 1, and detailed description thereof is omitted. The first lens group G1 of Example 2 comprises, in order from the object, a first lens L1 which is a negative meniscus lens having a convex surface facing the object, and a second lens L2 which is a positive meniscus lens having a convex surface facing the object, and both lens surfaces of the second lens L2 are aspherical.

Table 2 shows each data of Example 2. The surface numbers 1 to 16 in Table 2 correspond to the surfaces 1 to 16 in FIG. 3, and the group numbers G1 to G3 in Table 2 correspond to each lens group G1 to G3 in FIG. 3. In Example 2, each lens surface of the third surface, fourth surface, sixth surface, seventh surface and twelfth surface is formed to be aspherical.

TABLE 2

[General Data]
zoom ratio = 4.71

| wide-angle end | intermediate focal length | telephoto end |
|---|---|---|
| f = 3.91 | 8.49 | 18.43 |
| FNO = 2.85 | 4.24 | 7.25 |
| 2ω = 84.48 | 42.08 | 19.92 |
| Y = 2.90 | 3.25 | 3.25 |
| BF = 2.88 | 2.93 | 3.02 |
| TL = 26.27 | 23.33 | 29.85 |

[Lens Data]

| surface number | r | d | nd | νd |
|---|---|---|---|---|
| 1 | 300.1141 | 0.6000 | 1.75500 | 52.34 |
| 2 | 4.6753 | 1.1000 | | |
| 3* | 6.6199 | 1.8500 | 1.63280 | 23.35 |
| 4* | 13.2374 | (d4) | | |
| 5 | ∞ | −0.2000 | (aperture stop) | |
| 6* | 7.0117 | 1.2500 | 1.59201 | 67.05 |
| 7* | −12.9927 | 0.1000 | | |
| 8 | 3.5408 | 1.3000 | 1.81600 | 46.63 |
| 9 | 14.2745 | 0.4000 | 1.79504 | 28.69 |
| 10 | 2.3832 | (d10) | | |
| 11 | 1000.0000 | 1.9000 | 1.53110 | 55.91 |
| 12* | −6.9659 | (d12) | | |
| 13 | ∞ | 0.2100 | 1.51680 | 63.88 |
| 14 | ∞ | 0.3000 | | |
| 15 | ∞ | 0.5000 | 1.51680 | 63.88 |
| 16 | ∞ | 0.6000 | | |

TABLE 2-continued

[Aspherical Data]

third surface

κ = 1.9047, A4 = −7.31917E−04, A6 = −4.48631E−05,
A8 = 4.75920E−06, A10 = −5.79203E−08 fourth surface

κ = 3.2860, A4 = −1.14753E−03, A6 = −8.71361E−06,
A8 = 4.45605E−06, A10 = −8.73198E−08 sixth surface

κ = −3.6643, A4 = 9.48677E−04, A6 = −2.49585E−05,
A8 = 0.00000E+00, A10 = 0.00000E+00 seventh surface

κ = −1.3464, A4 = 0.00000E+00, A6 = 0.00000E+00,
A8 = 0.00000E+00, A10 = 0.00000E+00 twelfth surface

κ = −1.5170, A4 = 3.82584E−04, A6 = −4.56444E−05,
A8 = 1.33199E−06, A10 = 0.00000E+00

[Variable Distance Data]

| wide-angle end | intermediate focal length | telephoto end |
|---|---|---|
| f = 3.91 | 8.49 | 18.43 |
| d4 = 11.785 | 4.318 | 0.879 |
| d10 = 3.307 | 7.786 | 17.646 |
| d12 = 1.512 | 1.557 | 1.657 |

[Zoom Lens Group Data]

| group no. | first surface of group | focal length of group |
|---|---|---|
| G1 | 1 | −9.50000 |
| G2 | 6 | 7.29182 |
| G3 | 11 | 13.03376 |

[Conditional Expression Correspondence Value]

f1 = −9.50000
f2 = 7.29182
fw = 3.91000
fL2 = 18.88077
fLn = −3.65272
ΣD1 = 3.55000
Conditional Expression (1)  (−f1)/fw = 2.42967
Conditional Expression (2)  (−f1)/fL2 = 0.50316
Conditional Expression (3)  n2 × n2 × ν2 = 62.25194
Conditional Expression (4)  f2/(−fLn) = 1.99627
Conditional Expression (5)  (Rb + Ra)/(Rb − Ra) = −0.98616
Conditional Expression (6)  (−f1)/f2 = 1.30283
Conditional Expression (7)  (Rd + Rc)/(Rd − Rc) = −1.03165
Conditional Expression (8)  ΣD1/(−f1) = 0.37368
Conditional Expression (9)  ν3 = 67.05

In this way, all of the conditional expressions (1) to (9) are satisfied in this example.

Figure 4A:
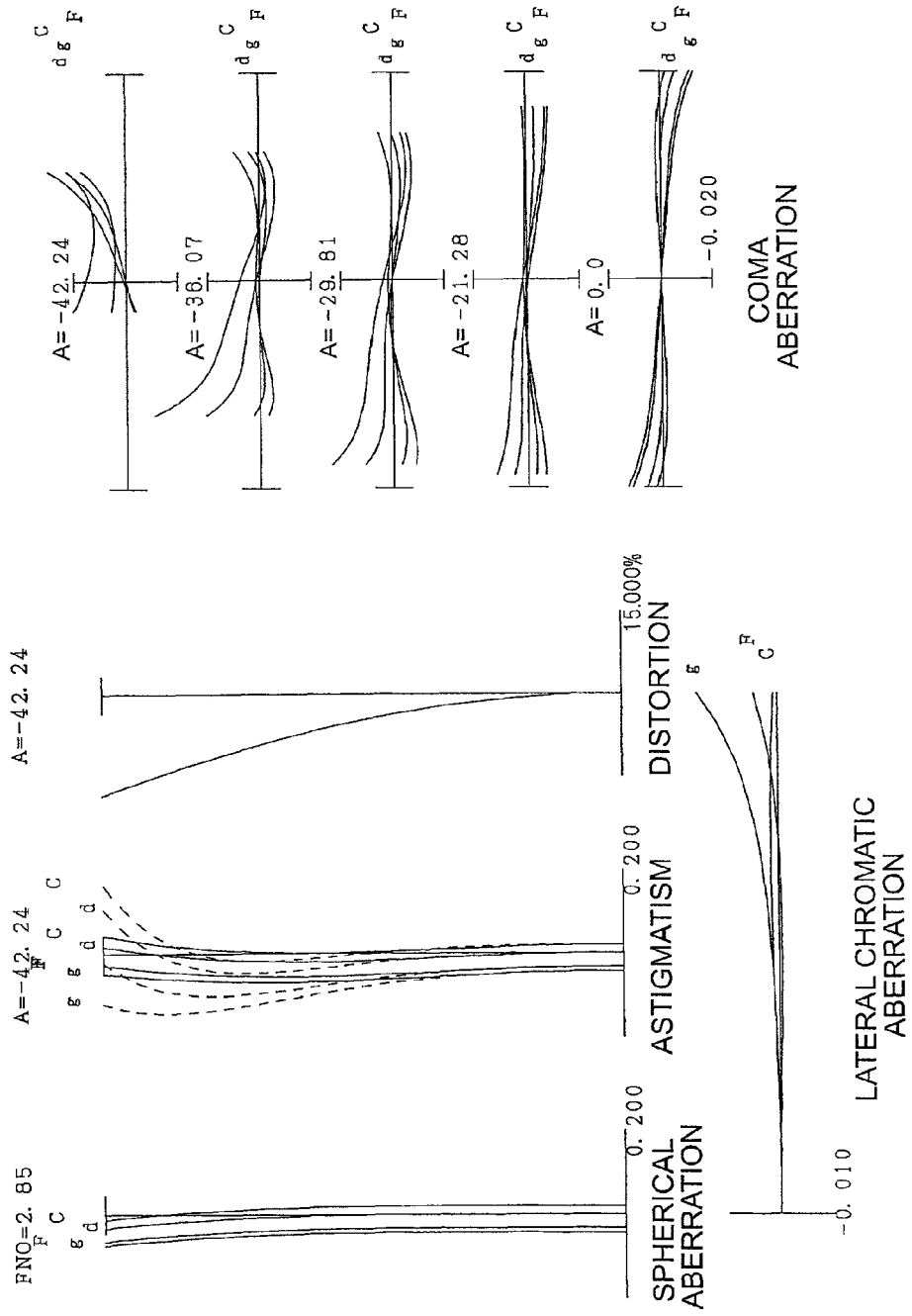
FIG. 4A are graphs showing various aberrations of the zoom lens according to Example 2 upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.
Figure 4C:
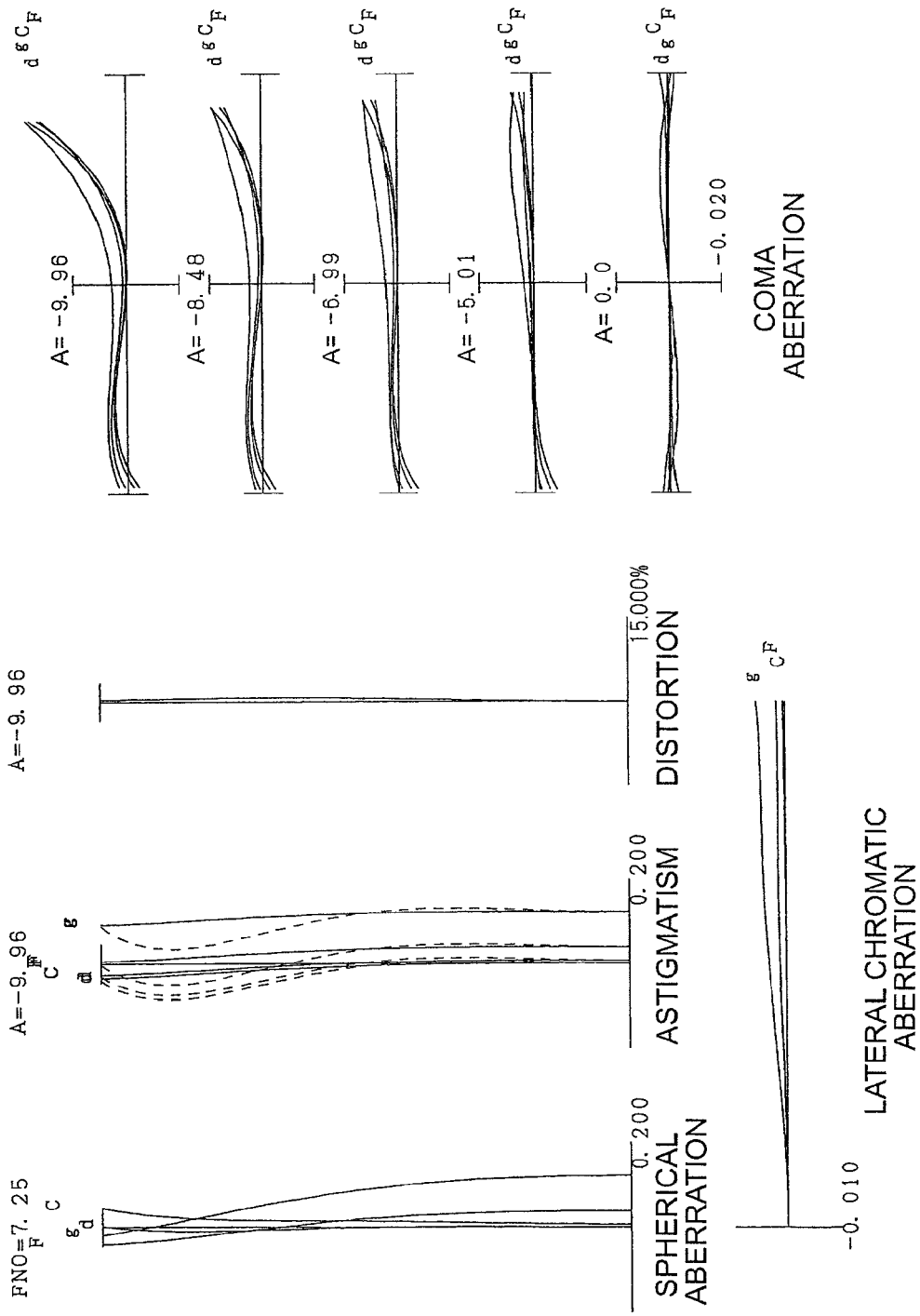

FIG. 4A to FIG. 4C are graphs showing various aberrations of the zoom lens ZL according to Example 2. FIG. 4A are graphs showing various aberrations of the zoom lens upon focusing on infinity in the wide-angle end state (f=3.91 mm), FIG. 4B are graphs showing various aberrations of the zoom lens upon focusing on infinity in the intermediate focal length state (f=8.49 mm), and FIG. 4C are graphs showing various aberrations of the zoom lens upon focusing on infinity in the telephoto end state (f=18.43 mm). In Example 2, as the respective graphs on aberrations show, various aberrations are corrected well in each focal length state from the wide-angle end state to the telephoto end state, and excellent optical performance is exhibited. As a result, excellent optical performance can be ensured for the digital still camera CAM as well, by installing the zoom lens ZL of Example 2.

Example 3

Example 3 will now be described using FIG. 5 to FIG. 6 and Table 3. FIG. 5A is a cross-sectional view depicting a zoom lens according to Example 3 in a wide-angle end state, FIG. 5B is a cross-sectional view depicting the zoom lens in an intermediate focal length state, and FIG. 5C is a cross-sectional view depicting the zoom lens in a telephoto end state. The zoom lens of Example 3 has the same configuration as the zoom lens of Example 1, therefore each component is denoted with the same reference symbol as Example 1, and detailed description thereof is omitted.

Table 3 shows each data of Example 3. The surface numbers 1 to 16 in Table 3 correspond to the surfaces 1 to 16 in FIG. 5, and the group numbers G1 to G3 in Table 3 correspond to each lens group G1 to G3 in FIG. 5. In Example 3, each lens surface of the third surface, fourth surface, sixth surface, seventh surface and twelfth surface is formed to be aspherical.

TABLE 3

[General Data]
zoom ratio = 4.71

| | wide-angle end | intermediate focal length | telephoto end |
|---|---|---|---|
| f = | 4.11 | 8.92 | 19.37 |
| FNO = | 2.78 | 4.19 | 7.27 |
| 2ω = | 78.24 | 40.52 | 19.06 |
| Y = | 2.80 | 3.25 | 3.25 |
| BF = | 2.82 | 3.00 | 3.48 |
| TL = | 27.39 | 24.83 | 32.66 |

[Lens Data]

| surface number | r | d | nd | νd |
|---|---|---|---|---|
| 1 | −52.0251 | 0.7000 | 1.75500 | 52.34 |
| 2 | 4.5670 | 1.1000 | | |
| 3* | 9.5432 | 1.9000 | 1.60740 | 27.00 |
| 4* | 139.5530 | (d4) | | |
| 5 | ∞ | −0.4000 | | (aperture stop) |
| 6* | 4.5356 | 1.4500 | 1.49589 | 82.24 |
| 7* | −9.4539 | 0.1000 | | |
| 8 | 4.5045 | 1.4000 | 1.83481 | 42.73 |
| 9 | 20.7499 | 0.4000 | 1.90366 | 31.27 |
| 10 | 2.7081 | (d10) | | |
| 11 | 1000.0000 | 1.7000 | 1.53153 | 55.95 |
| 12* | −8.3201 | (d12) | | |
| 13 | ∞ | 0.2100 | 1.51680 | 63.88 |
| 14 | ∞ | 0.3000 | | |
| 15 | ∞ | 0.5000 | 1.51680 | 63.88 |
| 16 | ∞ | 0.6000 | | |

[Aspherical Data]

third surface

κ = 5.7302, A4 = −4.55676E−04, A6 = −8.70426E−05,
A8 = 5.22458E−06, A10 = −1.40954E−07 fourth surface

κ = 1.0000, A4 = −7.90538E−04, A6 = −4.08518E−05,
A8 = 2.11308E−06, A10 = 8.73038E−09 sixth surface

κ = 0.0048, A4 = −8.48165E−05, A6 = 0.00000E+00,
A8 = 0.00000E+00, A10 = 0.00000E+00 seventh surface

κ = −4.6337, A4 = 0.00000E+00, A6 = 0.00000E+00,
A8 = 0.00000E+00, A10 = 0.00000E+00

TABLE 3-continued twelfth surface

κ = 1.0000, A4 = 7.94093E−04, A6 = −3.86107E−05,
A8 = 1.29274E−06, A10 = 0.00000E+00

[Variable Distance Data]

| wide-angle end | intermediate focal length | telephoto end |
|---|---|---|
| f = 4.11 | 8.92 | 19.37 |
| d4 = 12.279 | 4.775 | 1.295 |
| d10 = 3.943 | 8.705 | 19.542 |
| d12 = 1.447 | 1.628 | 2.109 |

[Zoom Lens Group Data]

| group no. | first surface of group | focal length of group |
|---|---|---|
| G1 | 1 | −9.10000 |
| G2 | 6 | 7.59000 |
| G3 | 11 | 15.53304 |

[Conditional Expression Correspondence Value]

| | |
|---|---|
| f1 = −9.10000 | |
| f2 = 7.59000 | |
| fw = 4.11000 | |
| fL2 = 16.77212 | |
| fLn = −3.48322 | |
| ΣD1 = 3.70000 | |
| Conditional Expression (1) | (−f1)/fw = 2.21411 |
| Conditional Expression (2) | (−f1)/fL2 = 0.54257 |
| Conditional Expression (3) | n2 × n2 × ν2 = 69.76084 |
| Conditional Expression (4) | f2/(−fLn) = 2.17902 |
| Conditional Expression (5) | (Rb + Ra)/(Rb − Ra) = −0.98350 |
| Conditional Expression (6) | (−f1)/f2 = 1.19895 |
| Conditional Expression (7) | (Rd + Rc)/(Rd − Rc) = −0.83860 |
| Conditional Expression (8) | ΣD1/(−f1) = 0.40659 |
| Conditional Expression (9) | ν3 = 82.24 |

In this way, all of the conditional expressions (1) to (9) are satisfied in this example.

Figure 6C:
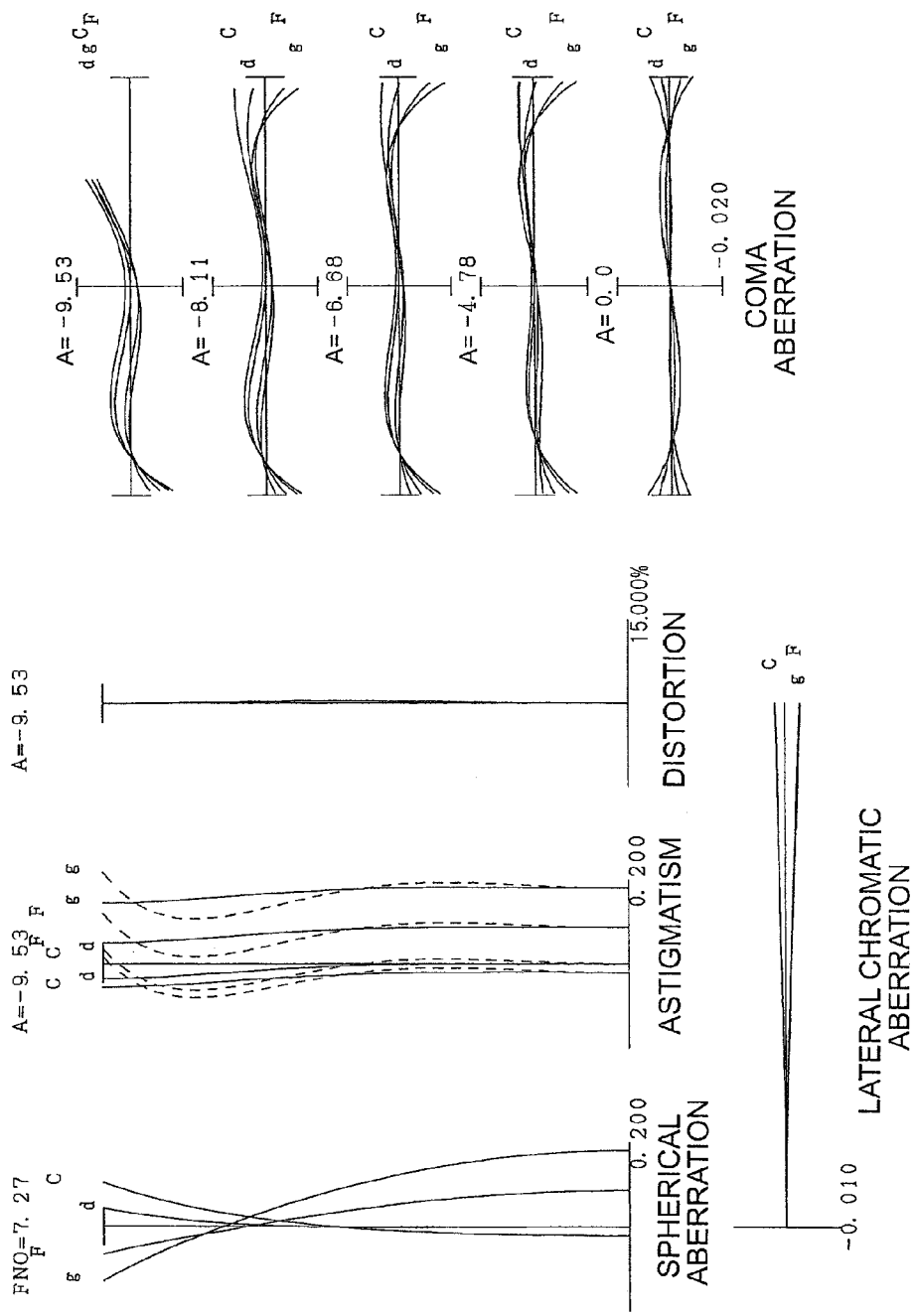
FIG. 6A are graphs showing various aberrations of the zoom lens according to Example 3 upon focusing on infinity in the wide-angle end state, FIG. 6B are graphs showing various aberrations of the zoom lens upon focusing on infinity in the intermediate focal length state, and FIG. 6C are graphs showing various aberrations of the zoom lens upon focusing on infinity in the telephoto end state.

FIG. 6A to FIG. 6C are graphs showing various aberrations of the zoom lens ZL according to Example 3. FIG. 6A are graphs showing various aberrations of the zoom lens upon focusing on infinity in the wide-angle end state (f=4.11 mm), FIG. 6B are graphs showing various aberrations of the zoom lens upon focusing on infinity in the intermediate focal length state (f=8.92 mm), and FIG. 6C are graphs showing various aberrations of the zoom lens upon focusing on infinity in the telephoto end state (f=19.37 mm). In Example 3, as the respective graphs on aberrations show, various aberrations are corrected well in each focal length state from the wide-angle end state to the telephoto end state, and excellent optical performance is exhibited. As a result, excellent optical performance can be ensured for the digital still camera CAM as well, by installing the zoom lens ZL of Example 3.

Example 4

Figure 7A:
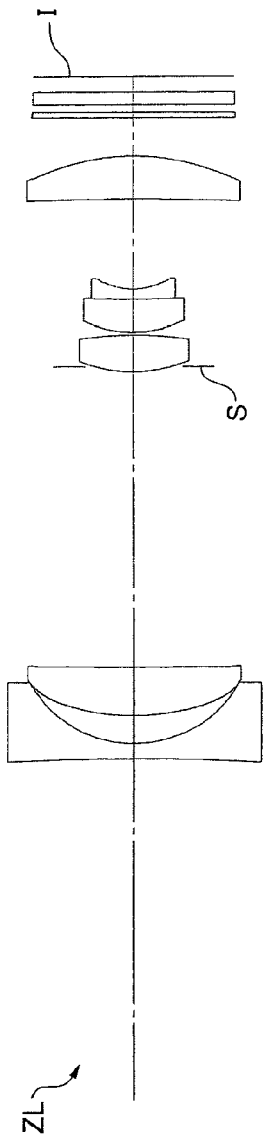
FIG. 7A is a cross-sectional view depicting a zoom lens according to Example 4 in a wide-angle end state.
Figure 7B:
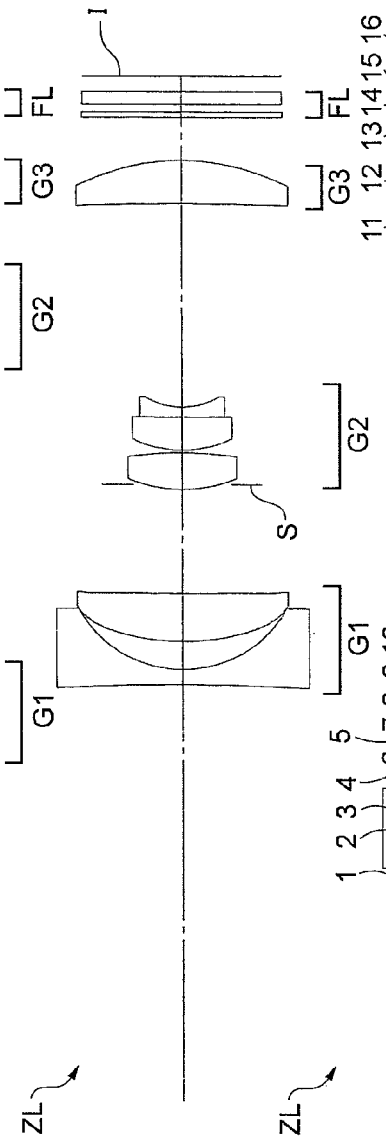
FIG. 7B is a cross-sectional view depicting the zoom lens in an intermediate focal length state.
Figure 7C:
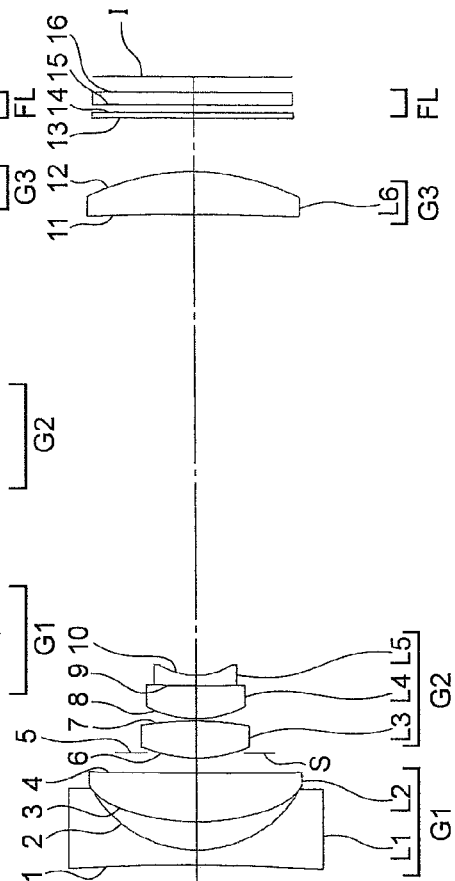
FIG. 7C is a cross-sectional view depicting the zoom lens in a telephoto end state.
Figure 8A:
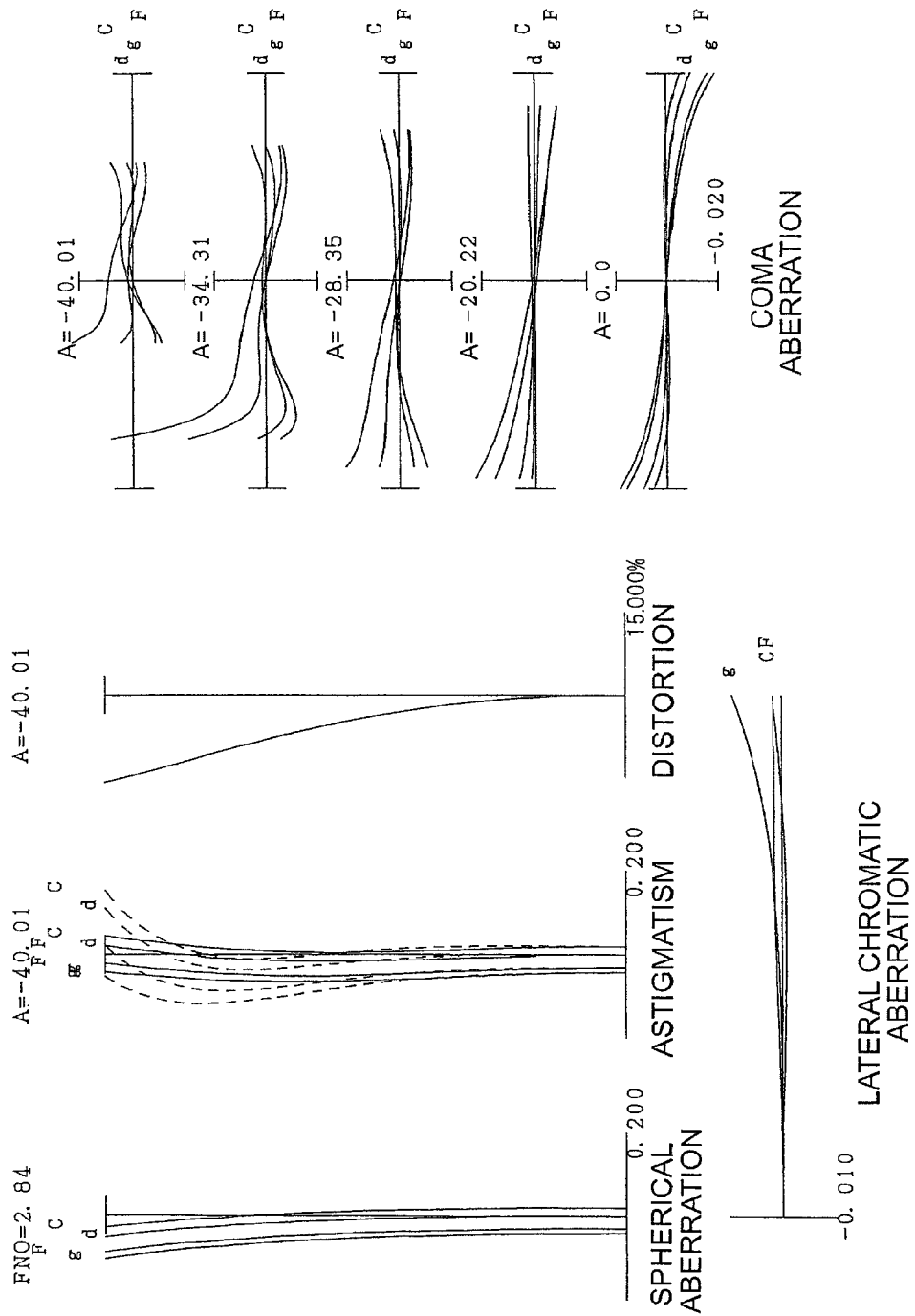
FIG. 8A are graphs showing various aberrations of the zoom lens according to Example 4 upon focusing on infinity in the wide-angle end state, FIG. 8B are graphs showing various aberrations of the zoom lens upon focusing on infinity in the intermediate focal length state, and FIG. 8C are graphs showing various aberrations of the zoom lens upon focusing on infinity in the telephoto end state.
Figure 8B:
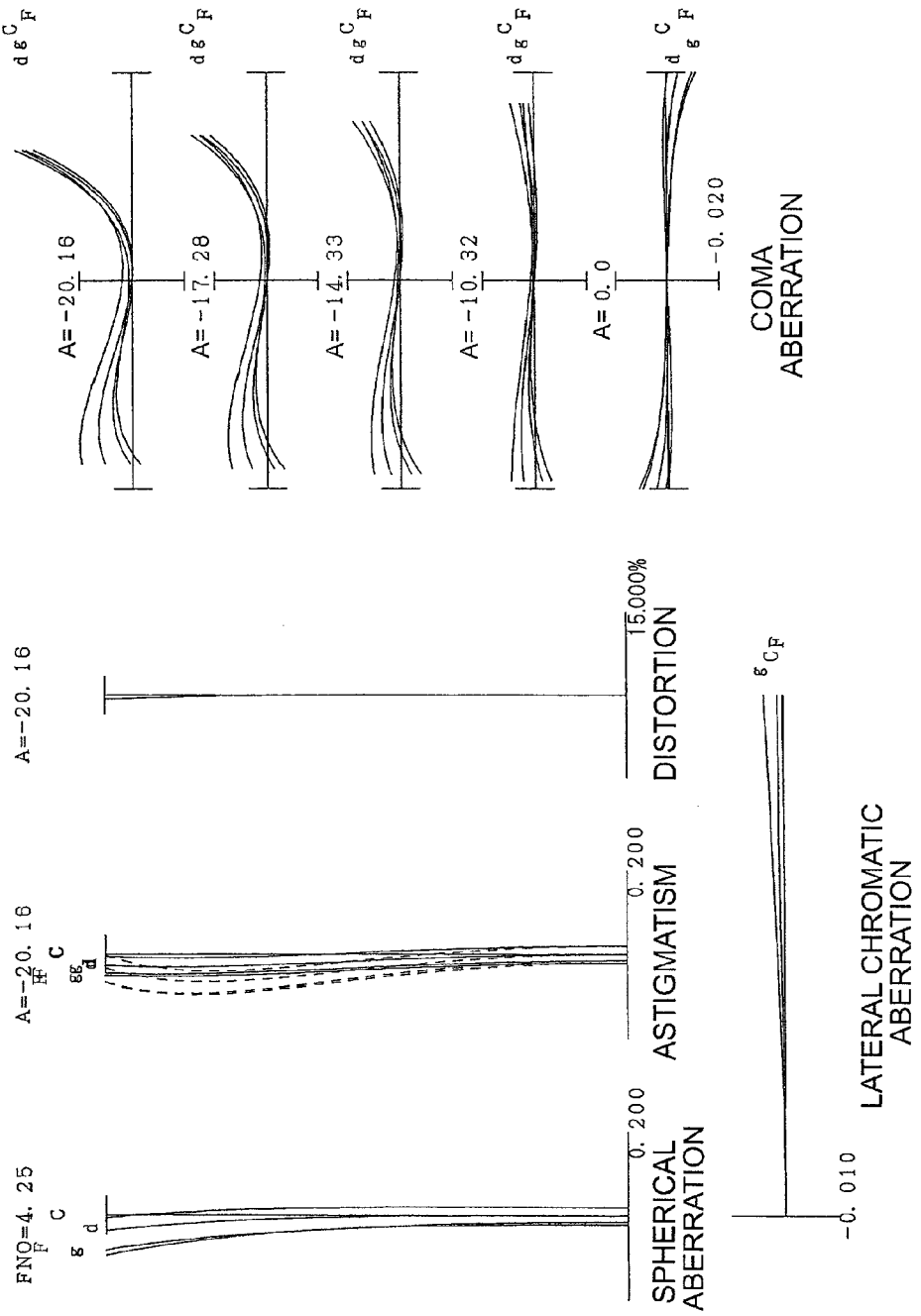
Figure 8C:
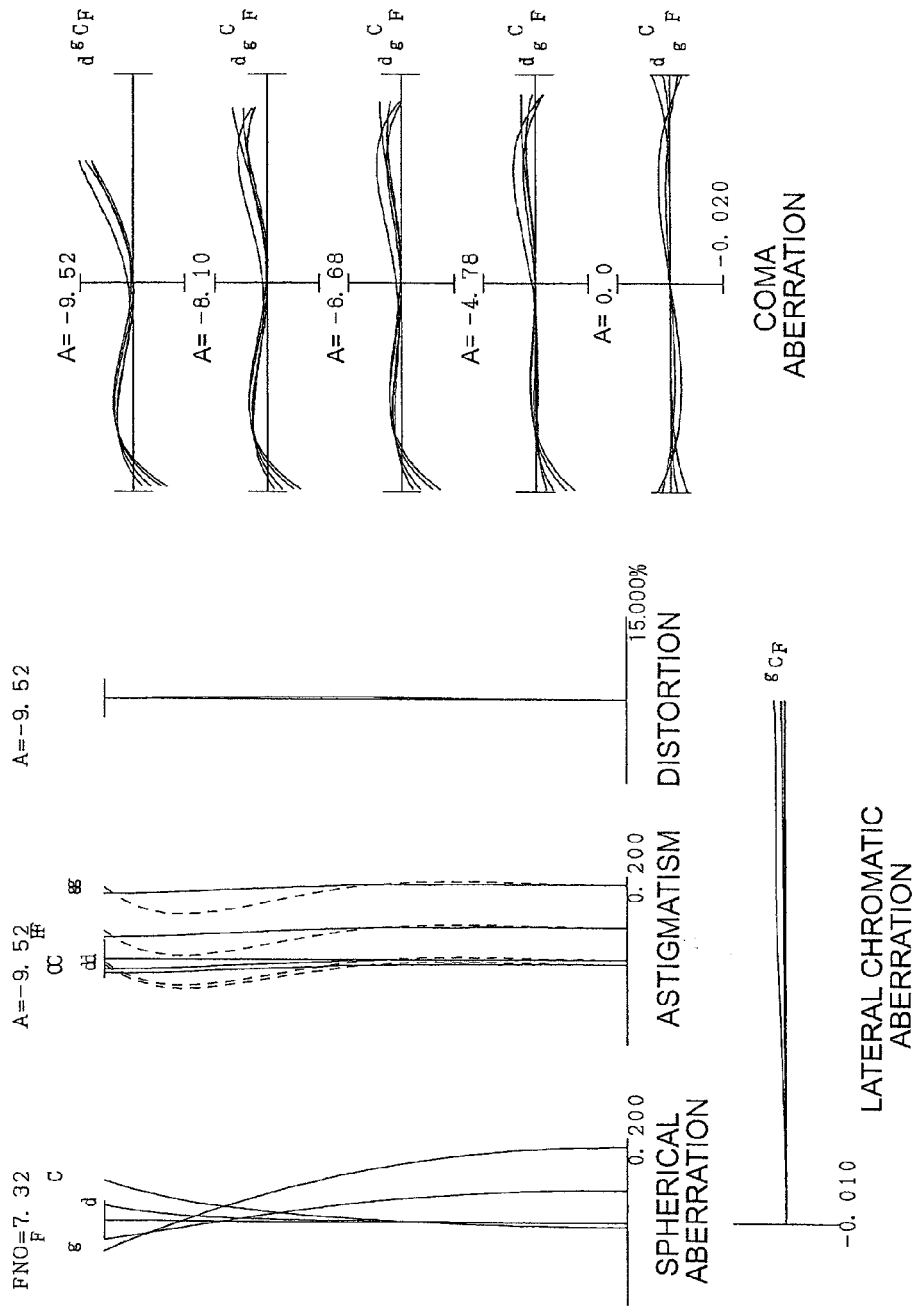

Example 4 will now be described using FIG. 7 to FIG. 8 and Table 4. FIG. 7A is a cross-sectional view depicting a zoom lens according to Example 4 in a wide-angle end state, FIG. 7B is a cross-sectional view depicting the zoom lens in an intermediate focal length state, and FIG. 7C is a cross-sectional view depicting the zoom lens in a telephoto end state. The zoom lens of Example 4 has the same configuration as the zoom lens of Example 1, except for a part of the shape of the third lens group G3, therefore each component is denoted with the same reference symbol as Example 1, and detailed description thereof is omitted. The third lens group G3 of Example 4 comprises only a sixth lens L6 which is a positive meniscus lens having a convex surface facing the image surface I, and the lens surface of the sixth lens L6 facing the image plane I is aspherical.

Table 4 shows each data of Example 4. The surface numbers 1 to 16 in Table 4 correspond to the surfaces 1 to 16 in FIG. 7, and the group numbers G1 to G3 in Table 4 correspond to each lens group G1 to G3 in FIG. 7. In Example 4, each lens surface of the third surface, fourth surface, sixth surface, seventh surface and twelfth surface is formed to be aspherical.

TABLE 4

[General Data]
zoom ratio = 4.71

| wide-angle end | intermediate focal length | telephoto end |
|---|---|---|
| f = 4.11 | 8.92 | 19.37 |
| FNO = 2.84 | 4.25 | 7.32 |
| 2ω = 80.02 | 40.32 | 19.04 |
| Y = 2.90 | 3.25 | 3.25 |
| BF = 2.88 | 3.06 | 3.47 |
| TL = 26.67 | 23.73 | 30.79 |

[Lens Data]

| surface number | r | d | nd | νd |
|---|---|---|---|---|
| 1 | −88.0628 | 0.6000 | 1.75500 | 52.34 |
| 2 | 4.5071 | 1.1000 | | |
| 3* | 8.3914 | 1.9000 | 1.60740 | 27.00 |
| 4* | 48.1025 | (d4) | | |
| 5 | ∞ | −0.2000 | | (aperture stop) |
| 6* | 4.9940 | 1.4500 | 1.59252 | 67.87 |
| 7* | −12.2866 | 0.1000 | | |
| 8 | 4.1282 | 1.3000 | 1.80400 | 46.60 |
| 9 | 47.5532 | 0.4000 | 1.90366 | 31.27 |
| 10 | 2.5782 | (d10) | | |
| 11 | −109.7494 | 1.7000 | 1.53153 | 55.95 |
| 12* | −7.7569 | (d12) | | |
| 13 | ∞ | 0.2100 | 1.51680 | 63.88 |
| 14 | ∞ | 0.3000 | | |
| 15 | ∞ | 0.5000 | 1.51680 | 63.88 |
| 16 | ∞ | 0.6000 | | |

[Aspherical Data]

third surface

κ = 3.7505, A4 = −5.23556E−04, A6 = −6.38822E−05,
A8 = 4.09147E−06, A10 = 8.34490E−08 fourth surface

κ = 1.0000, A4 = −8.82339E−04, A6 = −2.97720E−05,
A8 = 2.56702E−06, A10 = 1.00043E−07 sixth surface

κ = 0.2498, A4 = −1.27311E−04, A6 = 0.00000E+00,
A8 = 0.00000E+00, A10 = 0.00000E+00 seventh surface

κ = −9.5626, A4 = 0.00000E+00, A6 = 0.00000E+00,
A8 = 0.00000E+00, A10 = 0.00000E+00 twelfth surface

κ = 1.0000, A4 = 8.20445E−04, A6 = −3.35483E−05,
A8 = 1.10407E−06, A10 = 0.00000E+00

[Variable Distance Data]

| wide-angle end | intermediate focal length | telephoto end |
|---|---|---|
| f = 4.11 | 8.92 | 19.37 |
| d4 = 11.899 | 4.311 | 0.809 |
| d10 = 3.546 | 8.010 | 18.161 |
| d12 = 1.508 | 1.689 | 2.099 |

TABLE 4-continued

[Zoom Lens Group Data]

| group no. | first surface of group | focal length of group |
|---|---|---|
| G1 | 1 | −9.40000 |
| G2 | 6 | 7.40302 |
| G3 | 11 | 15.61305 |

[Conditional Expression Correspondence Value]

f1 = −9.40000
f2 = 7.40302
fw = 4.11000
fL2 = 16.43751
fLn = −3.02944
ΣD1 = 3.60000
Conditional Expression (1)  (−f1)/fw = 2.28710
Conditional Expression (2)  (−f1)/fL2 = 0.57186
Conditional Expression (3)  n2 × n2 × ν2 = 69.76084
Conditional Expression (4)  f2/(−fLn) = 2.44369
Conditional Expression (5)  (Rb + Ra)/(Rb − Ra) = −1.15211
Conditional Expression (6)  (−f1)/f2 = 1.26975
Conditional Expression (7)  (Rd + Rc)/(Rd − Rc) = −0.90262
Conditional Expression (8)  ΣD1/(−f1) = 0.38298
Conditional Expression (9)  ν3 = 67.87

In this way, all of the conditional expressions (1) to (9) are satisfied in this example.

FIG. 7A to FIG. 7C are graphs showing various aberrations of the zoom lens ZL according to Example 4. FIG. 7A are graphs showing various aberrations of the zoom lens upon focusing on infinity in the wide-angle end state (f=4.11 mm), FIG. 7B are graphs showing various aberrations of the zoom lens upon focusing on infinity in the intermediate focal length state (f=8.92 mm), and FIG. 7C are graphs showing various aberrations of the zoom lens upon focusing on infinity in the telephoto end state (f=19.37 mm). In Example 4, as the respective graphs on aberrations show, various aberrations are corrected well in each focal length state from the wide-angle end state to the telephoto end state, and excellent optical performance is exhibited. As a result, excellent optical performance can be ensured for the digital still camera CAM as well, by installing the zoom lens ZL of Example 4.

Example 5

Figure 9A:
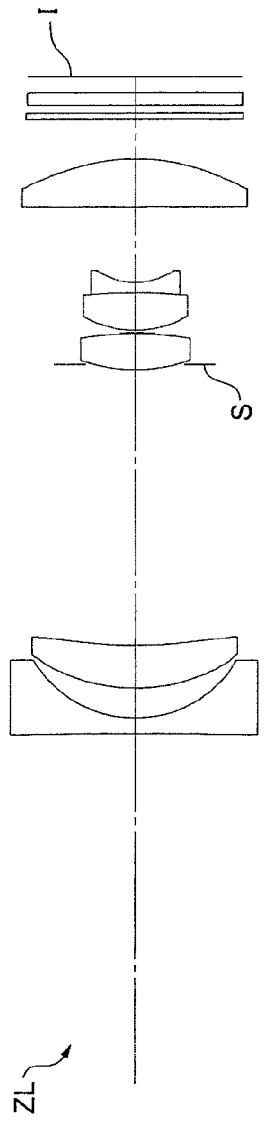
FIG. 9A is a cross-sectional view depicting a zoom lens according to Example 5 in a wide-angle end state.
Figure 9B:
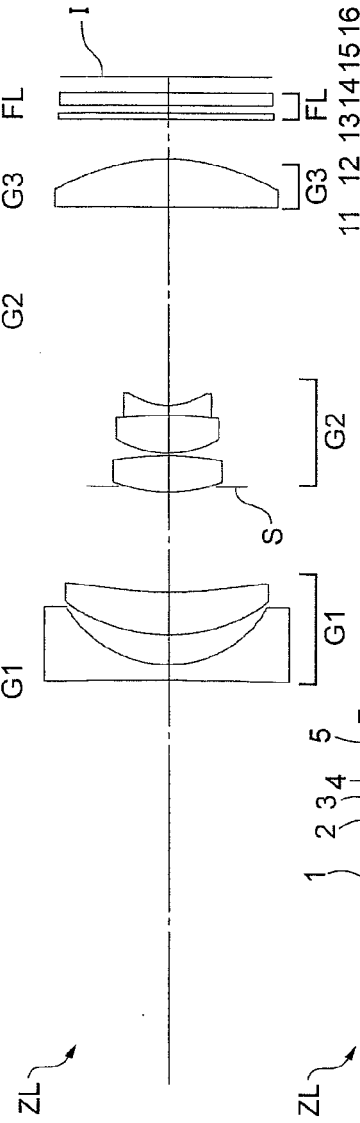
FIG. 9B is a cross-sectional view depicting the zoom lens in an intermediate focal length state.
Figure 9C:
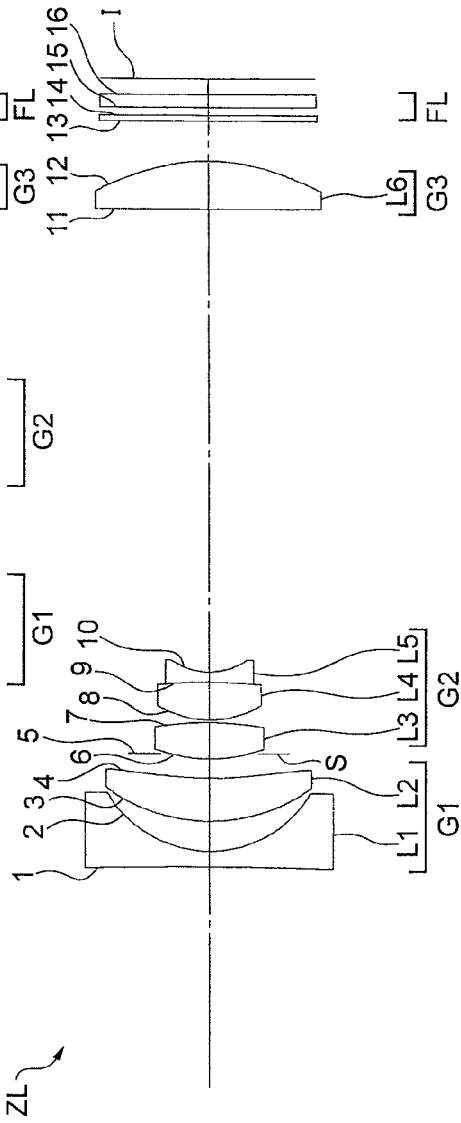
FIG. 9C is a cross-sectional view depicting the zoom lens in a telephoto end state.

Example 5 will now be described using FIG. 9 to FIG. 10 and Table 5. FIG. 9A is a cross-sectional view depicting a zoom lens according to Example 5 in a wide-angle end state, FIG. 9B is a cross-sectional view depicting the zoom lens in an intermediate focal length state, and FIG. 9C is a cross-sectional view depicting the zoom lens in a telephoto end state. The zoom lens of Example 5 has the same configuration as the zoom lens of Example 1, except for a part of the shape of the second lens group G2, therefore each component is denoted with the same reference symbol as Example 1, and detailed description thereof is omitted. The second lens group G2 of Example 5 comprises, in order from the object, a third lens L3 which is a biconvex positive lens, a fourth lens L4 which is a biconvex positive lens, and a fifth lens L5 which is a biconcave negative lens, and the lens surface of the third lens L3 facing the object is aspherical. Further, the fourth lens L4 and the fifth lens L5 are cemented to a cemented lens.

Table 5 shows each data of Example 5. The surface numbers 1 to 16 in Table 5 correspond to the surfaces 1 to 16 in FIG. 9, and the group numbers G1 to G3 in Table 5 correspond to each lens group G1 to G3 in FIG. 9. In Example 5, each lens surface of the third surface, fourth surface, sixth surface and twelfth surface is formed to be aspherical.

TABLE 5

[General Data]
zoom ratio = 4.71

| | wide-angle end | intermediate focal length | telephoto end |
|---|---|---|---|
| f = | 4.12 | 8.94 | 19.40 |
| FNO = | 2.68 | 4.09 | 7.16 |
| 2ω = | 80.08 | 39.9 | 19.08 |
| Y = | 2.90 | 3.25 | 3.25 |
| BF = | 2.91 | 2.91 | 2.91 |
| TL = | 25.06 | 22.98 | 30.05 |

[Lens Data]

| surface number | r | d | nd | νd |
|---|---|---|---|---|
| 1 | −182.1496 | 0.6000 | 1.69680 | 55.52 |
| 2 | 4.3497 | 1.1500 | | |
| 3* | 6.5115 | 1.6500 | 1.60740 | 27.00 |
| 4* | 14.2205 | (d4) | | |
| 5 | ∞ | −0.2000 | | (aperture stop) |
| 6* | 5.4468 | 1.4000 | 1.59201 | 67.05 |
| 7 | −11.5330 | 0.1000 | | |
| 8 | 3.7043 | 1.4500 | 1.69680 | 55.52 |
| 9 | −17.8839 | 0.4000 | 1.80100 | 34.96 |
| 10 | 2.4415 | (d10) | | |
| 11 | 1000.0000 | 1.8500 | 1.53110 | 55.91 |
| 12* | −6.9478 | (d12) | | |
| 13 | ∞ | 0.2100 | 1.51680 | 63.88 |
| 14 | ∞ | 0.3000 | | |
| 15 | ∞ | 0.5000 | 1.51680 | 63.88 |
| 16 | ∞ | 0.6000 | | |

[Aspherical Data]

third surface

κ = 2.0284, A4 = −4.99236E−04, A6 = 1.29842E−05,
A8 = −7.35509E−06, A10 = 3.77110E−07 fourth surface

κ = −4.4453, A4 = −4.69828E−04, A6 = 2.45045E−05,
A8 = −1.00766E−05, A10 = 5.59250E−07 sixth surface

κ = 0.0983, A4 = −3.92054E−04, A6 = 4.86503E−06,
A8 = −2.76862E−06, A10 = 0.00000E+00 twelfth surface

κ = −6.5208, A4 = −1.32246E−03, A6 = 1.48100E−05,
A8 = 1.77832E−06, A10 = −6.60718E−08

[Variable Distance Data]

| | wide-angle end | intermediate focal length | telephoto end |
|---|---|---|---|
| f = | 4.12 | 8.94 | 19.40 |
| d4 = | 10.838 | 4.059 | 0.934 |
| d10 = | 2.910 | 7.609 | 17.806 |
| d12 = | 1.542 | 1.542 | 1.542 |

[Zoom Lens Group Data]

| group no. | first surface of group | focal length of group |
|---|---|---|
| G1 | 1 | −9.40000 |
| G2 | 6 | 7.10682 |
| G3 | 11 | 13.00000 |

TABLE 5-continued

[Conditional Expression Correspondence Value]

f1 = −9.40000
f2 = 7.10682
fw = 4.12
fL2 = 18.29561
fLn = −2.65863
ΣD1 = 3.40000
Conditional Expression (1)    (−f1)/fw = 2.28155
Conditional Expression (2)    (−f1)/fL2 = 0.51378
Conditional Expression (3)    n2 × n2 × ν2 = 69.76084
Conditional Expression (4)    f2/(−fLn) = 2.67311
Conditional Expression (5)    (Rb + Ra)/(Rb − Ra) = −0.98620
Conditional Expression (6)    (−f1)/f2 = 1.32267
Conditional Expression (7)    (Rd + Rc)/(Rd − Rc) = −0.95335
Conditional Expression (8)    ΣD1/(−f1) = 0.36170
Conditional Expression (9)    ν3 = 67.05

In this way, all of the conditional expressions (1) to (9) are satisfied in this example.

Figure 10A:
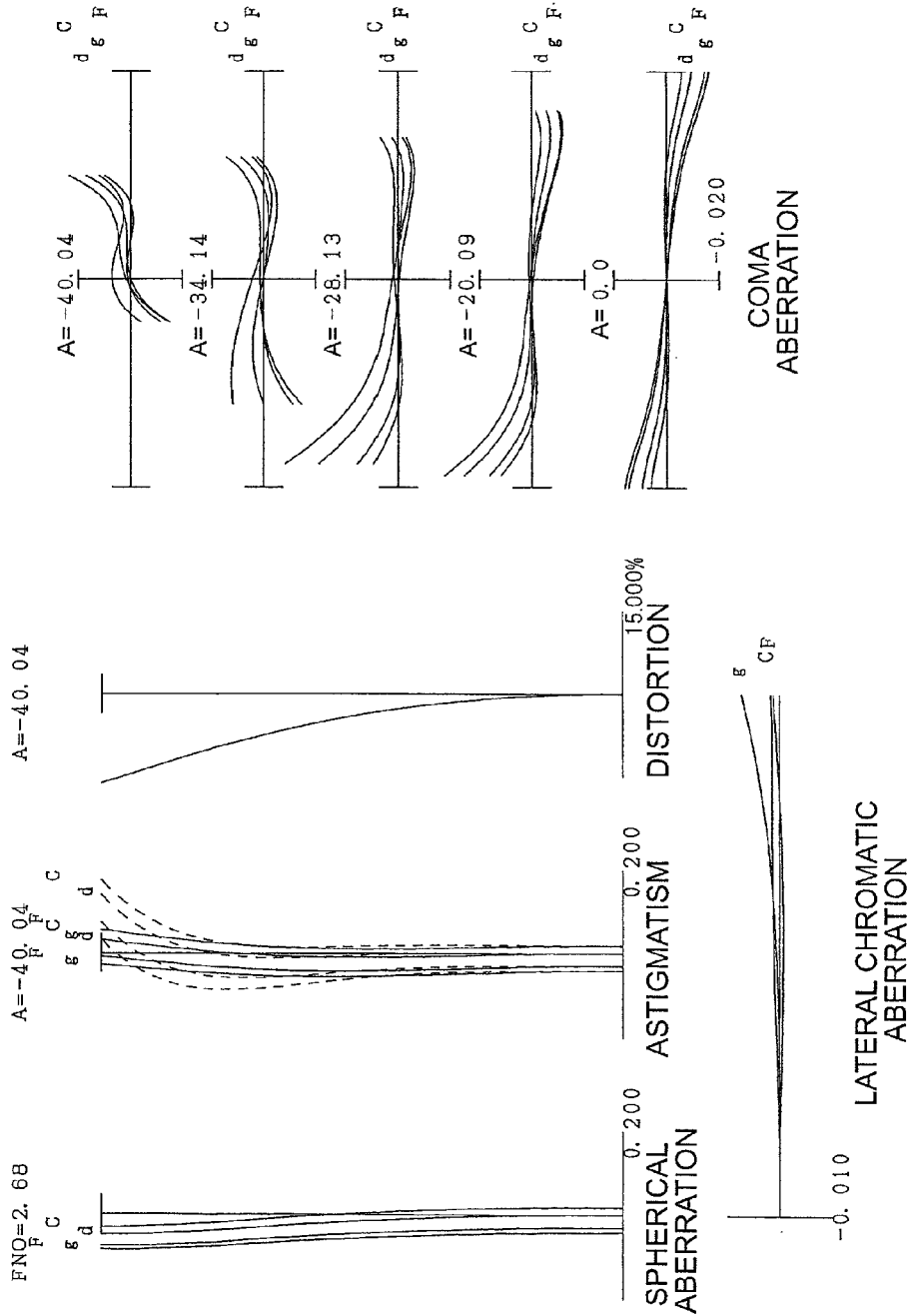
FIG. 10A are graphs showing various aberrations of the zoom lens according to Example 5 upon focusing on infinity in the wide-angle end state, FIG. 10B are graphs showing various aberrations of the zoom lens upon focusing on infinity in the intermediate focal length state, and FIG. 10C are graphs showing various aberrations of the zoom lens upon focusing on infinity in the telephoto end state.
Figure 10B:
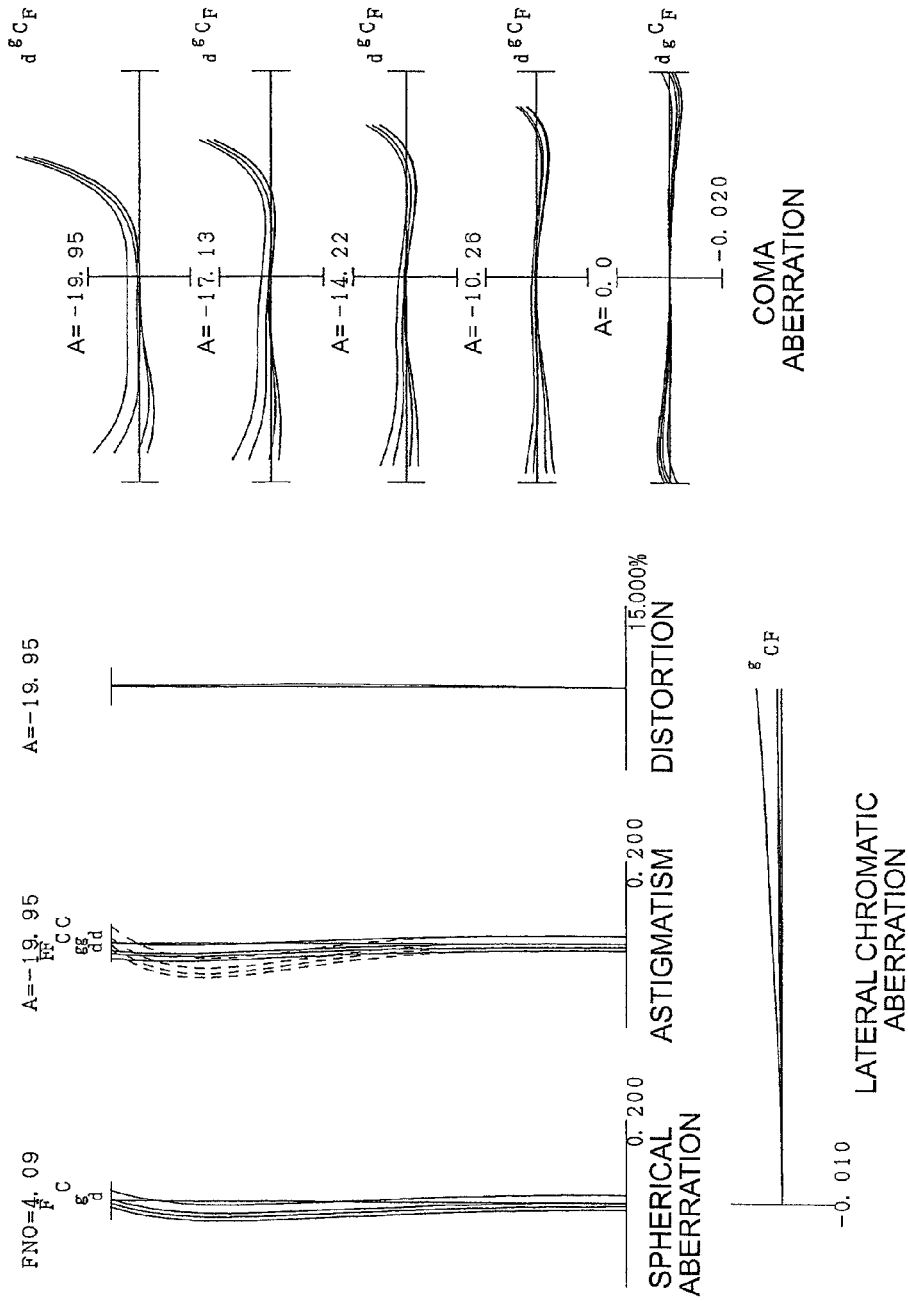
Figure 10C:
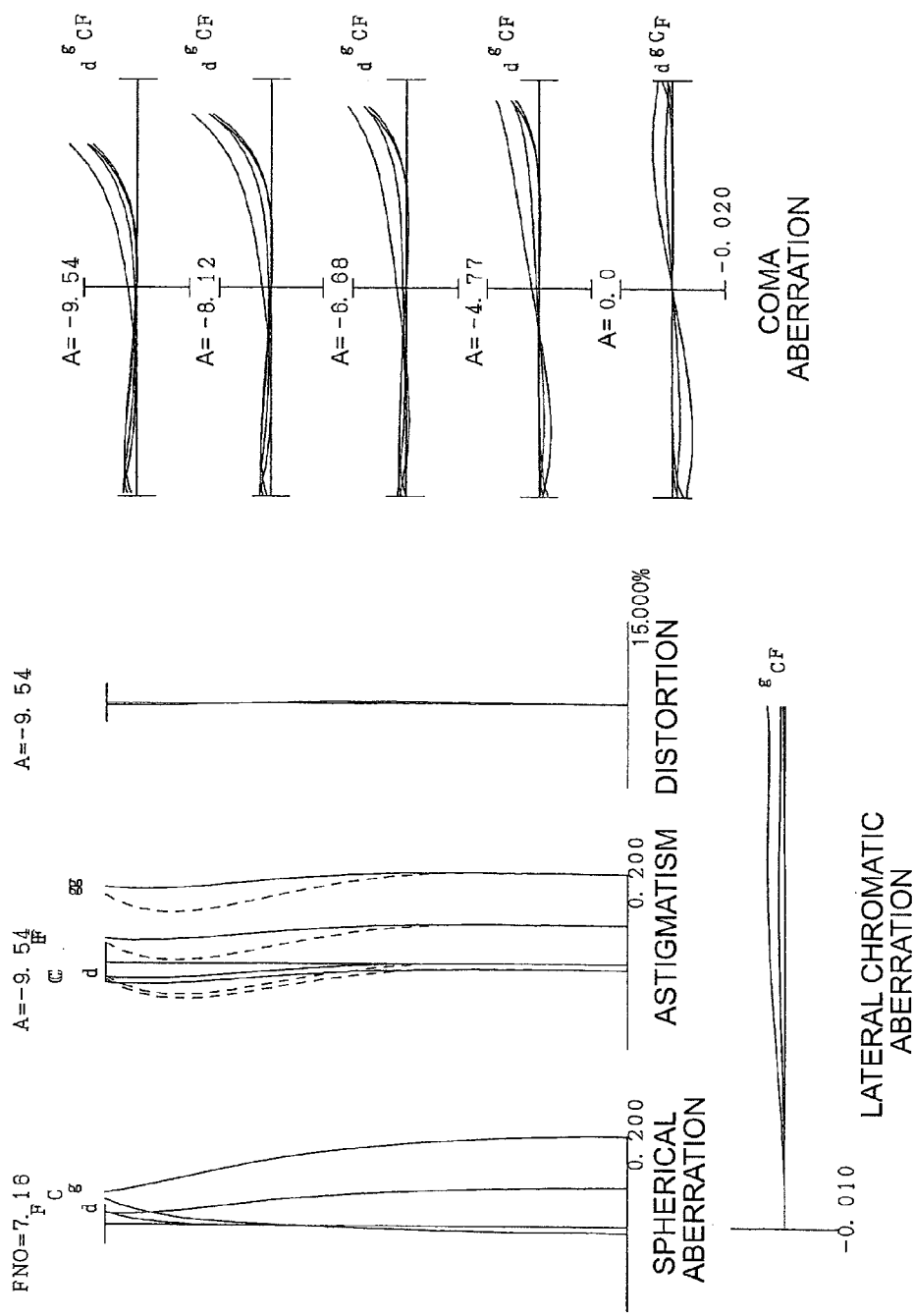

FIG. 10A to FIG. 10C are graphs showing various aberrations of the zoom lens ZL according to Example 5. FIG. 10A are graphs showing various aberrations of the zoom lens upon focusing on infinity in the wide-angle end state (f=4.12 mm), FIG. 10B are graphs showing various aberrations of the zoom lens upon focusing on infinity in the intermediate focal length state (f=8.94 mm), and FIG. 10C are graphs showing various aberrations of the zoom lens upon focusing on infinity in the telephoto end state (f=19.40 mm). In Example 5, as the respective graphs on aberrations show, various aberrations are corrected well in each focal length state from the wide-angle end state to the telephoto end state, and excellent optical performance is exhibited. As a result, excellent optical performance can be ensured for the digital still camera CAM as well, by installing the zoom lens ZL of Example 5.

Example 6

Figure 11A:
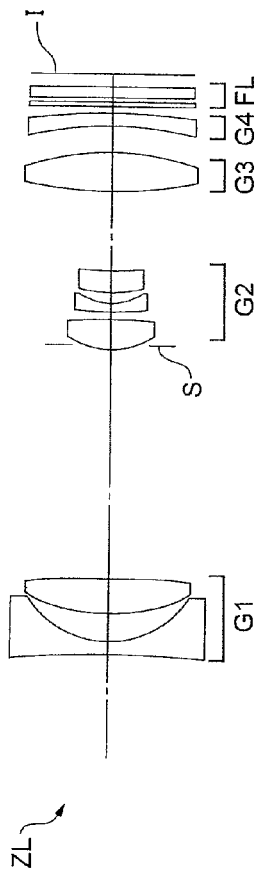
FIG. 11A is a cross-sectional view depicting a zoom lens according to Example 6 in a wide-angle end state.
Figure 11B:
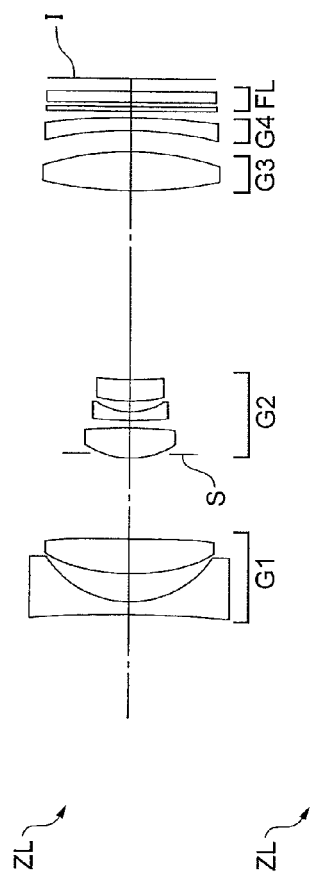
FIG. 11B is a cross-sectional view depicting the zoom lens in an intermediate focal length state.
Figure 11C:
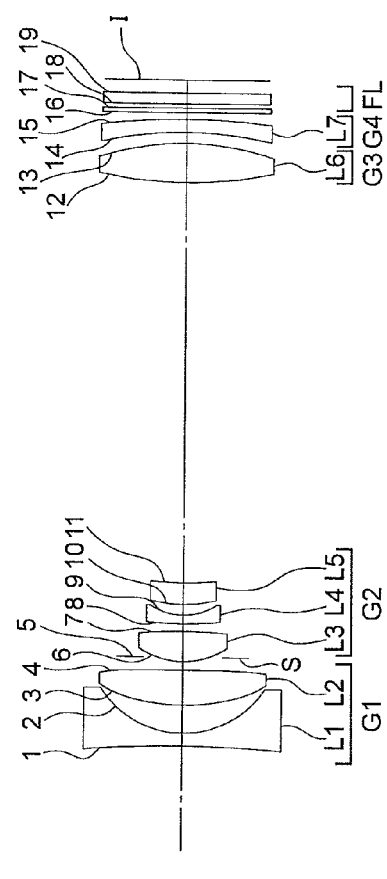
FIG. 11C is a cross-sectional view depicting the zoom lens in a telephoto end state.

The abovementioned Example 6 will be described below using FIG. 11 to FIG. 12 and Table 6. FIG. 11A is a cross-sectional view depicting a zoom lens according to Example 6 in a wide-angle end state, FIG. 11B is a cross-sectional view depicting the zoom lens in an intermediate focal length state, and FIG. 11C is a cross-sectional view depicting the zoom lens in a telephoto end state. The zoom lens according to Example 6 comprises, in order from an object, a first lens group G1 having negative refractive power, a second lens group G2 having positive refractive power, a third lens group G3 having positive refractive power, and a fourth lens group G4 having negative refractive power. The first lens group G1, the second lens group G2 and the third lens group G3 move along the optical axis respectively upon zooming from the wide-angle end state (W) to the telephoto end state (T), so that the distance between the first lens group G1 and the second lens group G2 decreases, the distance between the second lens group G2 and the third lens group G3 increases, and the distance between the third lens group G3 and the fourth lens group G4 decreases. An aperture stop S is disposed between the first lens group G1 and the second lens group G2.

The first lens group G1 comprises, in order from the object, a first lens L1 which is a biconcave negative lens, and a second lens L2 which is a positive meniscus lens having a convex surface facing the object, and both lens surfaces of the second lens L2 are aspherical. The second lens group G2 comprises, in order from the object, a third lens L3 which is a biconvex positive lens, a fourth lens L4 which is a negative meniscus lens having a convex surface facing the object, and a fifth lens L5 which is a positive meniscus lens having a convex surface facing the object, and the lens surface of the third lens L3 facing the object is aspherical. The third lens group G3 comprises only a sixth lens L6, which is a biconvex positive lens, and a lens surface of the sixth lens L6 facing an image plane I is aspherical. The fourth lens group G4 comprises only a seventh lens L7, which is a negative meniscus lens having a convex surface facing the image plane I. The second lens L2 and the sixth lens L6 are plastic lenses. Focusing from an object at infinity to an object at a finite distance is performed by moving the third lens group G3 along the optical axis.

The aperture stop S is disposed near the object side of the third lens L3, which is located closest to the object in the second lens group G2, and moves along with the second lens group G2 upon zooming from the wide-angle end state to the telephoto end state. A filter group FL disposed between the fourth lens group G4 and the image plane I is constituted by a low pass filter, infrared cut-off filter or the like.

Table 6 shows each data of Example 6. The surface numbers 1 to 19 in Table 6 correspond to the surfaces 1 to 19 in FIG. 11, and the group numbers G1 to G4 in Table 6 correspond to each lens group G1 to G4 in FIG. 11. In Example 6, each lens surface of the third surface, fourth surface, sixth surface and thirteenth surface is formed to be aspherical.

TABLE 6

[General Data]
zoom ratio = 4.24

| wide-angle end | intermediate focal length | telephoto end |
|---|---|---|
| f = 4.20 | 8.65 | 17.80 |
| FNO = 2.93 | 4.29 | 7.39 |
| 2ω = 79.00 | 42.28 | 20.74 |
| Y = 2.90 | 3.25 | 3.25 |
| BF = 1.57 | 1.57 | 1.57 |
| TL = 26.64 | 24.59 | 30.53 |

[Lens Data]

| surface number | r | d | nd | νd |
|---|---|---|---|---|
| 1 | −53.6797 | 0.6000 | 1.72916 | 54.61 |
| 2 | 4.4070 | 1.3000 | | |
| 3* | 10.1496 | 1.6000 | 1.60740 | 27.00 |
| 4* | 401.3754 | (d4) | | |
| 5 | ∞ | −0.2000 | | (aperture stop) |
| 6* | 3.3492 | 1.4000 | 1.69350 | 53.18 |
| 7 | −25.3374 | 0.3500 | | |
| 8 | 15.8658 | 0.4000 | 1.72825 | 28.38 |
| 9 | 2.6358 | 0.5000 | | |
| 10 | 6.2878 | 1.0000 | 1.77250 | 49.62 |
| 11 | 15.4609 | (d11) | | |
| 12 | 19.2128 | 1.8000 | 1.53110 | 55.91 |
| 13* | −11.7544 | (d13) | | |
| 14 | −16.9195 | 0.6000 | 1.68893 | 31.16 |
| 15 | −29.7442 | (d15) | | |
| 16 | ∞ | 0.2100 | 1.51680 | 63.88 |
| 17 | ∞ | 0.2000 | | |
| 18 | ∞ | 0.5000 | 1.51680 | 63.88 |
| 19 | ∞ | 0.6000 | | |

[Aspherical Data]

third surface

κ = 2.9663, A4 = 7.57948E−04, A6 = −5.54924E−06,
A8 = −5.41331E−06, A10 = 3.88224E−07
fourth surface κ = 5.0000, A4 = 4.03158E−05, A6 = −7.41052E−05,
A8 = −7.73247E−07, A10 = 1.43586E−07

TABLE 6-continued sixth surface

κ = 0.8784, A4 = −1.77737E−03, A6 = −1.44113E−04,
A8 = −5.74580E−06, A10 = 0.00000E+00 thirteenth surface

κ = 5.5518, A4 = 8.74312E−04, A6 = −5.81090E−05,
A8 = 4.65809E−06, A10 = −9.31475E−08

[Variable Distance Data]

| | wide-angle end | intermediate focal length | telephoto end |
|---|---|---|---|
| f = | 4.20 | 8.65 | 17.80 |
| d4 = | 10.853 | 3.959 | 0.604 |
| d11 = | 3.649 | 8.732 | 18.498 |
| d13 = | 1.216 | 0.974 | 0.509 |
| d15 = | 0.303 | 0.303 | 0.303 |

[Zoom Lens Group Data]

| group no. | first surface of group | focal length of group |
|---|---|---|
| G1 | 1 | −9.28182 |
| G2 | 6 | 7.93978 |
| G3 | 12 | 14.01388 |
| G4 | 14 | −58.06828 |

[Conditional Expression Correspondence Value]

f1 = −9.28182
f2 = 7.93978
fw = 4.20000
fL2 = 17.11699
fLn = −4.39645
ΣD1 = 3.50000

| Conditional Expression (1) | (−f1)/fw = 2.209957 |
| Conditional Expression (2) | (−f1)/fL2 = 0.5422577 |
| Conditional Expression (3) | n2 × n2 × ν2 = 69.76083852 |
| Conditional Expression (4) | f2/(−fLn) = 1.80595 |
| Conditional Expression (5) | (Rb + Ra)/(Rb − Ra) = −0.24085 |
| Conditional Expression (6) | (−f1)/f2 = 1.16903 |
| Conditional Expression (7) | (Rd + Rc)/(Rd − Rc) = −0.84826 |
| Conditional Expression (8) | ΣD1/(−f1) = 0.37708 |
| Conditional Expression (9) | ν3 = 53.18000 |

In this way, all of the conditional expressions (1) to (9) are satisfied in this example.

Figure 12A:
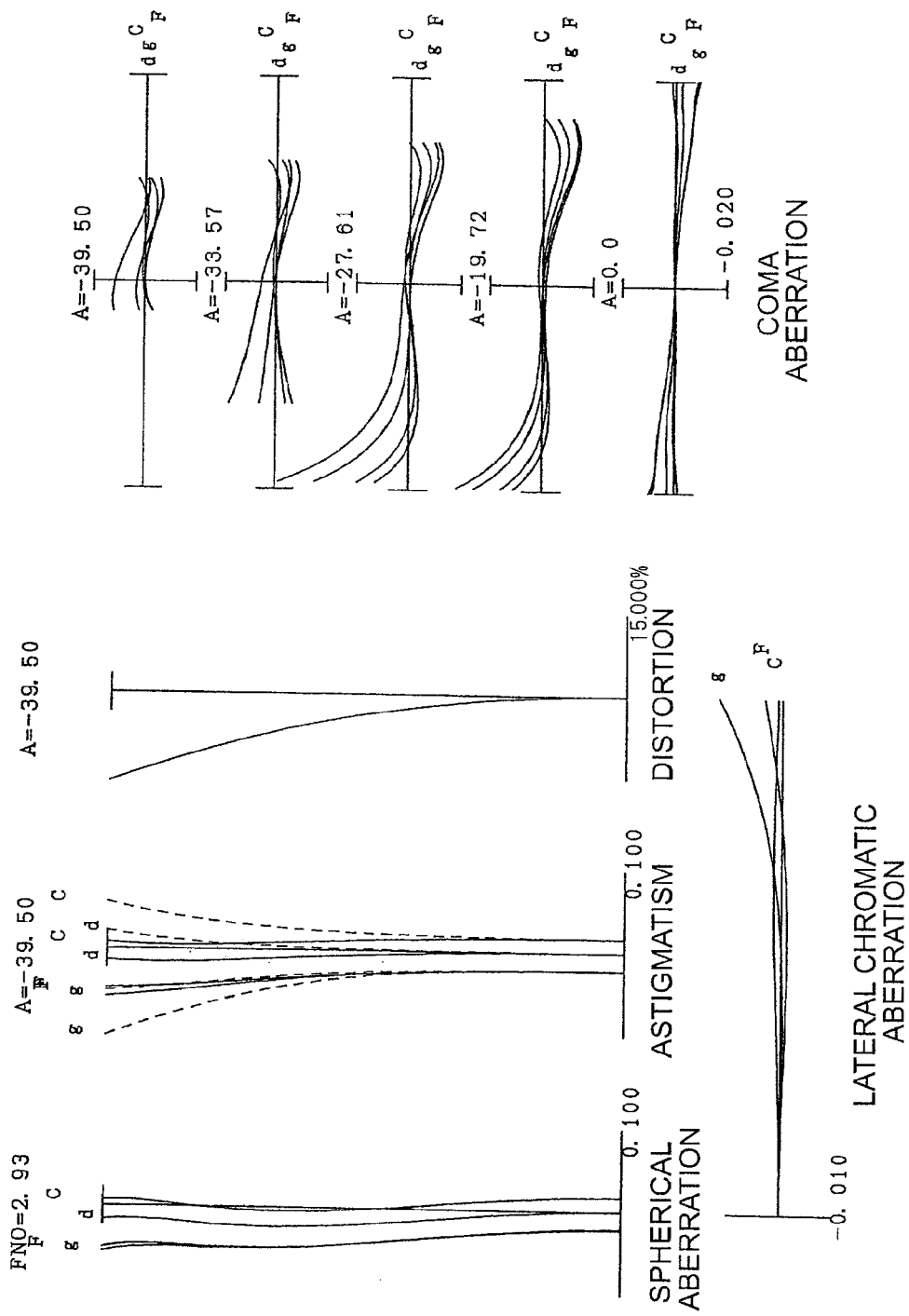
FIG. 12A are graphs showing various aberrations of the zoom lens according to Example 6 upon focusing on infinity in the wide-angle end state, FIG. 12B are graphs showing various aberrations of the zoom lens upon focusing on infinity in the intermediate focal length state, and FIG. 12C are graphs showing various aberrations of the zoom lens upon focusing on infinity in the telephoto end state.
Figure 12B:
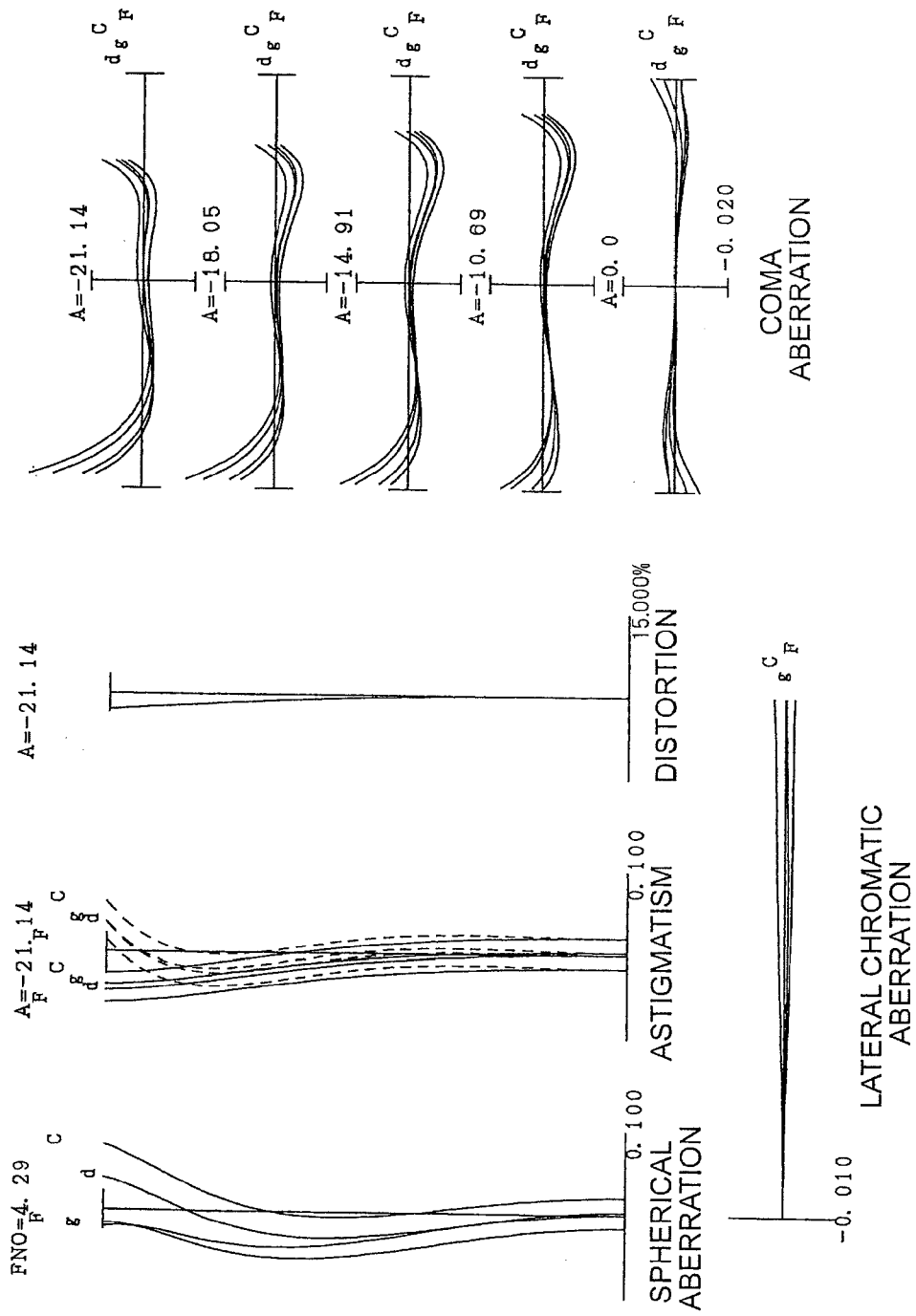
Figure 12C:
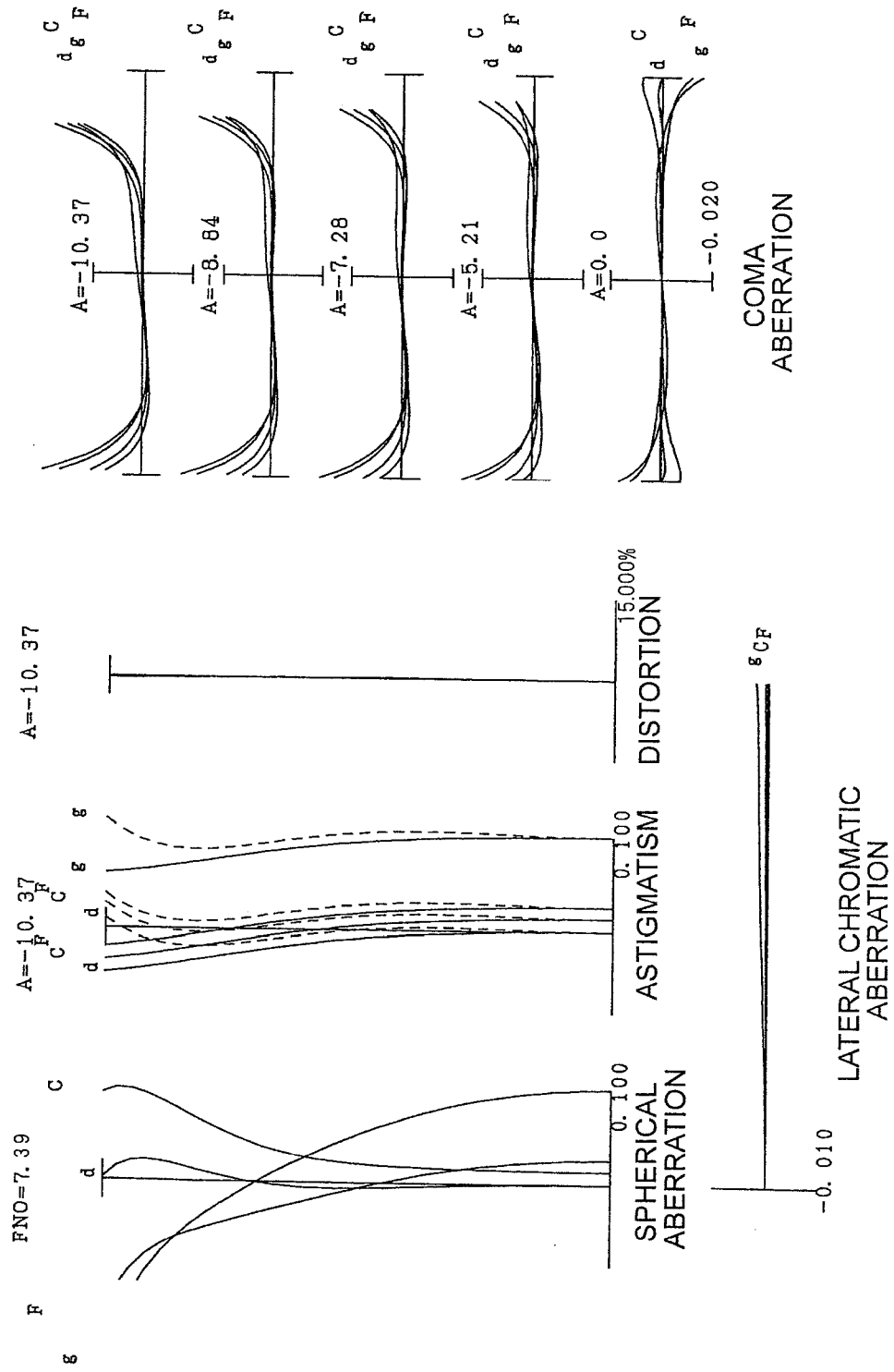

FIG. 12A to FIG. 12C are graphs showing various aberrations of the zoom lens ZL according to Example 6. FIG. 12A are graphs showing various aberrations of the zoom lens upon focusing on infinity in the wide-angle end state (f=4.20 mm), FIG. 12B are graphs showing various aberrations of the zoom lens upon focusing on infinity in the intermediate focal length state (f=8.65 mm), and FIG. 12C are graphs showing various aberrations of the zoom lens upon focusing on infinity in the telephoto end state (f=17.80 mm). In Example 6, as the respective graphs on aberrations show, various aberrations are corrected well in each focal length state from the wide-angle end state to the telephoto end state, and excellent optical performance is exhibited. As a result, excellent optical performance can be ensured for the digital still camera CAM as well, by installing the zoom lens ZL of Example 6.

According to each example, a zoom lens and optical apparatus (digital still camera) having good image forming performance with compact size and low cost, while having a wide-angle of view and high zoom ratio can be implemented.

In the zoom lens (zooming optical system) according to the present invention, it is preferable that the first lens group has one positive lens component and one negative lens component. It is preferable that the second lens group has two positive lens components and one negative lens component. The third lens group has one positive lens component.

A second embodiment will now be described. The zoom lens according to the second embodiment comprises, in order from an object, a first lens group having negative refractive power, a second lens group having positive refractive power, and a third lens group having positive refractive power, wherein a half angle of view in the wide-angle end state exceeds 40°, the first lens group is constituted only by one negative spherical lens and one positive lens with an air space there between, the second lens group is constituted by three or less lenses including at least one positive lens and one negative lens, and the following conditional expressions (11) to (13) are satisfied, where n12 denotes refractive index of the positive lens constituting the first lens group, f12 denotes a focal length of the positive lens constituting the first lens group, f1 denotes a focal length of the first lens group, and IH denotes a highest image height on the image forming plane in the telephoto end state.

$$1.4 < n12 < 1.7 \qquad (11)$$

$$2.05 < f12/(-f1) < 3.50 \qquad (12)$$

$$2.0 < (-f1)/IH < 3.3 \qquad (13)$$

By having a plurality of lens groups like this, an optical system having a high zoom ratio can be easily constructed. Since the first lens group is constituted by two lenses, that is, one negative spherical lens and one positive lens with an air space there between, not only can optical system be compact, but also generation of flares and ghosts can be decreased, and good optical performance can be implemented because a number of constituting lens surfaces is small. Using a spherical negative lens (not using an aspherical negative lens) in the first lens group can contribute considerably to a decrease in manufacturing cost. The second lens group is constituted by three or less lenses, including at least one positive lens and one negative lens, therefore a number of constituting lenses can be decreased, and generation of flares and ghosts is prevented, and good optical performance can be maintained while decreasing the size.

The conditional expression (11) specifies refractive power of the positive lens constituting the first lens group. In the zoom lens according to the present embodiment, astigmatism can be corrected well while dramatically decreasing the manufacturing cost, since the positive lens constituting the first lens group not only satisfies the conditional expression (11), and is an aspherical lens, but also satisfies the conditional expression (12) mentioned below.

To ensure the effects of the present embodiment, it is preferable that the upper limit value of the conditional expression (11) is 1.65. To ensure the effects of the present embodiment, it is preferable that the lower limit value of the conditional expression (11) is 1.55.

The conditional expression (12) specifies a ratio of the focal length of the positive lens constituting the first lens group and the focal length of the first lens group. If the upper limit value of the conditional expression (12) is exceeded, chromatic aberration becomes worse. If the lower limit value of the conditional expression (12) is not reached, correction of coma aberration becomes difficult.

To ensure the effects of the present embodiment, it is preferable that the upper limit value of the conditional expression (12) is 3.00. To further ensure the effects of the present embodiment, it is preferable that the upper limit value of the conditional expression (12) is 2.50. To ensure the effects of the present embodiment, it is preferable that the lower limit value of the conditional expression (12) is 2.10. To further ensure the effects of the present embodiment, it is preferable that the lower limit value of the conditional expression (12) is 2.14.

The conditional expression (13) specifies a ratio of the highest image height on the image forming plane in the telephoto end state and the focal length of the first lens group. If the lower limit value of the conditional expression (13) is not reached, astigmatism becomes worse. If the upper limit value of the conditional expression (13) is exceeded, coma aberration becomes worse.

To ensure the effects of the present embodiment, it is preferable that the upper limit value of the conditional expression (13) is 3.0. To ensure the effects of the present embodiment, it is preferable that the lower limit value of the conditional expression (13) is 2.1.

In the zoom lens according to the present embodiment, it is preferable that the following conditional expression (14) is satisfied, where f2 denotes a focal length of the second lens group.

$$0.8<(-f1)/f2<1.8 \tag{14}$$

The conditional expression (14) specifies a ratio between the focal length of the first lens group and the focal length of the second lens group. If the upper limit value of the conditional expression (14) is exceeded or if the lower limit value thereof is not reached, coma aberration and astigmatism become worse, and the moving distance of each lens group increases, which is not desirable in terms of downsizing. If the conditional expression (14) is satisfied, the zoom ratio can be increased to four times or more and a wide-angle of view can be implemented, without increasing the overall size of the zoom lens very much.

To ensure the effects of the present embodiment, it is preferable that the upper limit value of the conditional expression (14) is 1.4. To ensure the effects of the present embodiment, it is preferable that the lower limit value of the conditional expression (14) is 1.0.

In the zoom lens according to the present embodiment, it is preferable that the following conditional expression (15) is satisfied, where vd1 denotes an Abbe number of the positive lens constituting the first lens group.

$$15.0<vd1<35.0 \tag{15}$$

The conditional expression (15) specifies an Abbe number of the positive lens constituting the first lens group. If the upper limit value of the conditional expression (15) is exceeded or if the lower limit value thereof is not reached, correction of coma aberration and chromatic aberration becomes difficult.

To ensure the effects of the present embodiment, it is preferable that the upper limit value of the conditional expression (15) is 30.0. To ensure the effects of the present embodiment, it is preferable that the lower limit value of the conditional expression (15) is 20.0.

In the zoom lens according to the present embodiment, it is preferable that the second lens group has a positive lens disposed closest to the object, and the following conditional expression (16) is satisfied, where vd21 denotes an Abbe number of the positive lens constituting the second lens group.

$$55.0<vd21<95.0 \tag{16}$$

The conditional expression (16) specifies an Abbe number of the positive lens disposed closest to the object in the second lens group. If the upper limit value of the conditional expression (16) is exceeded or if the lower limit value thereof is not reached, correction of longitudinal chromatic aberration becomes difficult. If the conditional expression (16) is satisfied, the longitudinal chromatic aberration can be corrected well, even if the zoom ratio is four times or more.

To ensure the effects of the present embodiment, it is preferable that the upper limit value of the conditional expression (16) is 85.0. To ensure the effects of the present embodiment, it is preferable that the lower limit value of the conditional expression (16) is 65.0.

In the zoom lens according to the present embodiment, it is preferable that the lens disposed closest to the object in the first lens group satisfies the following conditional expression (17), where R11 denotes radius of curvature of the object side lens surface, and R12 denotes radius of curvature of the image side lens surface.

$$0.60<-(R12+R11)/(R12-R11)<1.50 \tag{17}$$

The conditional expression (17) specifies a form factor of the lens disposed closest to the object in the first lens group. If the upper limit value of the conditional expression (17) is exceed or if the lower limit value thereof is not reached, correction of coma aberration becomes difficult.

To ensure the effects of the present embodiment, it is preferable that the upper limit value of the conditional expression (17) is 1.30. To ensure the effects of the present embodiment, it is preferable that the lower limit value of the conditional expression (17) is 0.80.

In the zoom lens according to the present embodiment, it is preferable that the second lens group has a negative lens disposed closest to the image, and the following conditional expression (18) is satisfied, where vd22 denotes an Abbe number of the negative lens constituting the second lens group.

$$25.0<vd22<55.0 \tag{18}$$

The conditional expression (18) specifies an Abbe number of the positive lens disposed closest to the object in the second lens group. If the upper limit value of the conditional expression (18) is exceeded or if the lower limit value thereof is not reached, correction of longitudinal chromatic aberration becomes difficult. If the conditional expression (18) is satisfied, the longitudinal chromatic aberration can be corrected well, even if the zoom ratio is four times or more.

To ensure the effects of the present embodiment, it is preferable that the upper limit value of the conditional expression (18) is 45.0. To ensure the effects of the present embodiment, it is preferable that the lower limit value of the conditional expression (18) is 30.0.

In the zoom lens according to the present embodiment, it is preferable that the third lens group is constituted by one lens. Decreasing a number of constituting lenses can contribute to downsizing, and prevent generation of flares and ghosts.

In the zoom lens according to the present embodiment, it is preferable that the third lens group is constituted by a plastic lens. In the present embodiment, the third lens group is a lens group disposed close to the image forming plane, and performance change upon change of temperature can almost be ignored even if a plastic lens are used. Therefore it is preferable to use a plastic lens for the third lens group in terms of manufacturing cost.

In the zoom lens according to the present embodiment, the positive lens constituting the first lens group may be either a plastic lens or a glass lens. Using a plastic lens can contribute to decreasing cost.

In the zoom lens according to the present embodiment, it is preferable that the aperture stop is disposed closer to the image side than the first lens group. By this configuration, fluctuation of aberrations, such as coma aberration, due to zooming, can be corrected well.

In the zoom lens according to the present embodiment, it is preferable that the aperture stop moves along with the second lens group upon zooming from the wide-angle end state to the telephoto end state. By this configuration, fluctuation of aberrations, such as coma aberration, due to zooming, can be corrected well.

Figure 21:
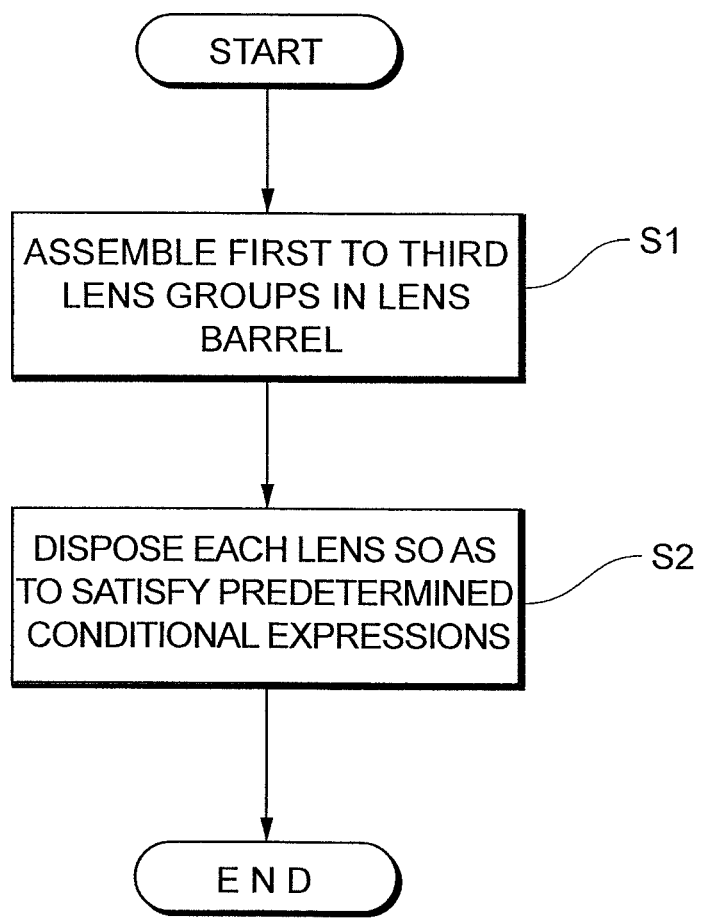
FIG. 21 is a flow chart depicting a method for manufacturing the zoom lens according to the second embodiment.

A method for manufacturing the zoom lens having the above mentioned configuration will be described with reference to FIG. 21. First the first to the third lens groups (e.g. the first to the third lens groups G1 to G3 in FIG. 13) are assembled in a lens barrel (step S1). In this assembly step, each lens is disposed so that the first lens group has negative refractive power, the second lens group has positive refractive power, and the third lens group has positive refractive power. At this time, the assembled first lens group has only one negative spherical lens and one positive lens with an air space there between. The assembled second lens group is constituted by three or less lenses including at least one positive lens and one negative lens. Then each lens is disposed so that the conditional expressions 1.4<n12<1.7 (conditional expression (11)), 2.05<f12/(−f1)<3.50 (conditional expression (12)) and 2.0<(−f1)/IH<3.3 (conditional expression (13)) are satisfied, where n12 denotes refractive index of the positive lens constituting the first lens group, f12 denotes a focal length of the positive lens constituting the first lens group, f1 denotes a focal length of the first lens group, and IH denotes the highest image height on the imaging plane in the telephoto end state (step S2). Each lens may be assembled in the lens barrel one at a time in order along the optical axis, or a part or all of the lenses may be integratedly held on a holding member, and then assembled in the lens barrel. After assembling each lens group in the lens barrel like this, it is checked whether the object image is formed in a state where each lens group is assembled in the lens barrel, that is, whether the center of each lens is aligned, then various operations of the zoom lens are checked. Examples of the various operations are a zoom operation in which zooming is performed from the wide-angle end state to the telephoto end state (e.g. in FIG. 13, the first lens group G1 and the second lens group G2 move, the third lens group G3 is always fixed, and the aperture stop S moves along with the second lens group G2), and a focusing operation in which a lens which performs focusing from an object at a long distance to an object at a short distance (e.g. third lens group G3 in FIG. 13) moves along the optical axis. The sequence of checking the various operations is arbitrary. According to this manufacturing method, a zoom lens which has high zoom ratio, compact size and high image quality can be implemented at low cost.

Examples

Each example of the second embodiment will now be described with reference to the drawings. Table 7 to Table 9 shown below are tables listing each data of the zoom lenses according to Example 7 to Example 9. Description on each data is omitted here since this is the same as the case of the first embodiment.

In [Variable Distance Data], di (i is an integer) is a variable distance between the i-th surface and the (i+1)th surface in each state of the wide-angle end state, intermediate focal length state, and telephoto end state. In [Focal Length of Group], a first surface of each group and focal length are shown. In [Conditional Expression], values corresponding to the conditional expressions (11) to (18) are shown.

In the tables, "mm" is normally used for the unit of the focal length f, radius of curvature r, surface distance d and other lengths. However, the unit is not limited to "mm", but another appropriate unit may be used, since an equivalent optical performance is obtained even if an optical system is proportionally expanded or proportionally reduced.

The above description on the tables can be applied to all the examples.

Example 7

Figure 13:
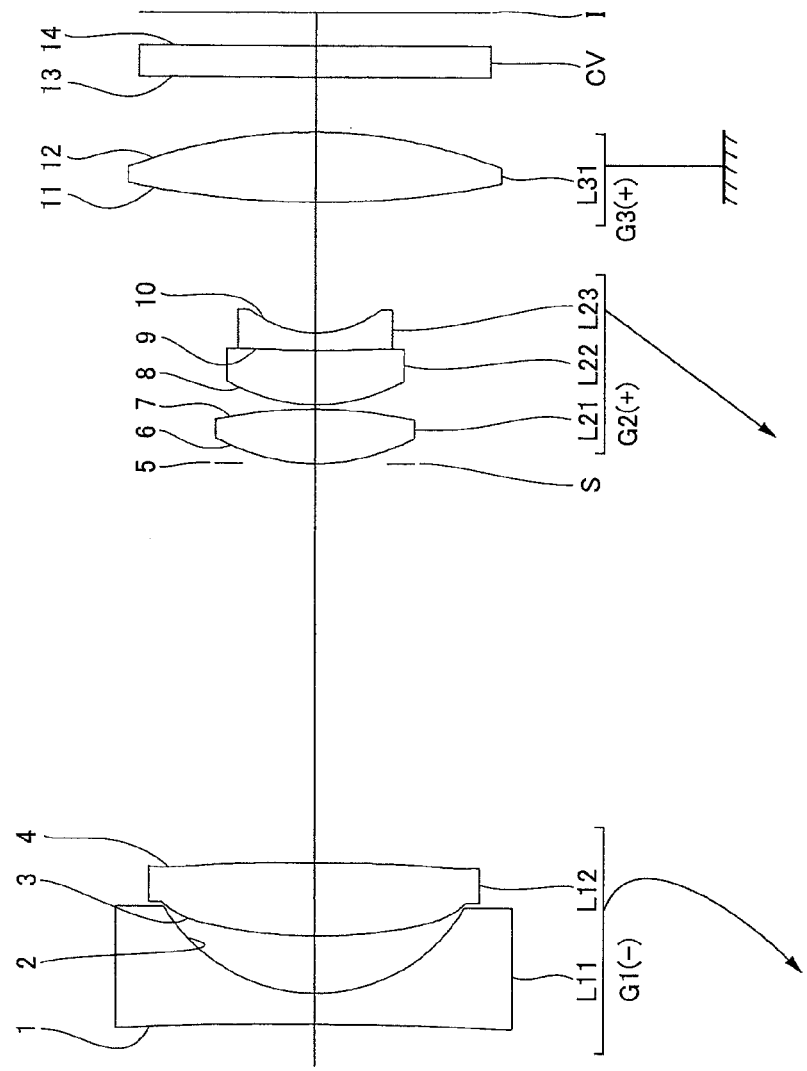
FIG. 13 is a diagram depicting a configuration and a zoom locus of the zoom lens according to Example 7.

Example 7 will now be described using FIG. 13 and FIG. 14 and Table 7. FIG. 13 is a diagram depicting a configuration and a zoom locus of a lens according to Example 7. As FIG. 13 shows, the zoom lens ZL (ZL1) according to Example 7 comprises, in order from an object, a first lens group G1 having negative refractive power, a second lens group G2 having positive refractive power, and a third lens group G3 having positive refractive power.

The first lens group G1 comprises, in order from an object, a biconcave spherical lens L11, and a plastic biconvex aspherical lens L12.

The second lens group G2 comprises, in order from an object, a biconvex positive lens L21, and a cemented lens of a positive meniscus lens L22 having a convex surface facing the object and a negative meniscus lens L23 having a convex surface facing the object.

The third lens group G3 comprises a biconvex plastic positive lens L31.

An aperture stop S for adjusting quantity of light is disposed between the first lens group G1 and the second lens group G2. Between the third lens group 3 and the image plane I, a sensor cover glass CV of the solid-state image sensor, such as CCD, installed on the image plane I, is disposed.

According to this example, upon zooming from the wide-angle end state to the telephoto end state, the first lens group G1 and the second lens group G2 move, and the third lens group G3 is always fixed. The aperture stop S moves along with the second lens group G2.

Table 7 shows each data of Example 7. The surface numbers 1 to 14 in Table 7 correspond to the surfaces 1 to 14 in FIG. 13. In Example 7, the third surface, fourth surface, sixth surface, seventh surface and twelfth surface are formed to be aspherical.

TABLE 7

[General Data]

| | wide-angle end | intermediate | telephoto end |
|---|---|---|---|
| f | 3.63 | 7.48 | 15.40 |
| Fno | 2.79 | 4.12 | 6.88 |
| ω | 43.28 | 23.85 | 11.92 |
| image height | 2.85 | 3.25 | 3.25 |

[Lens Data]

| surface number | r | d | nd | νd |
|---|---|---|---|---|
| 1 | −98.8377 | 0.70 | 1.74100 | 52.7 |
| 2 | 3.9780 | 1.30 | | |
| 3 | 11.9990 | 1.65 | 1.63200 | 23.4 |
| 4 | −281.3669 | (D4) | | |
| 5 | 0.0000 | 0.00 | (aperture stop) | |
| 6 | 4.3972 | 1.25 | 1.59201 | 67.1 |
| 7 | −9.5474 | 0.10 | | |
| 8 | 4.0000 | 1.25 | 1.77250 | 49.6 |
| 9 | 77.2082 | 0.40 | 1.90366 | 31.3 |
| 10 | 2.3927 | (D10) | | |

TABLE 7-continued

| 11 | 20.6616 | 1.60 | 1.53110 | 56.0 | (ZEONEX E48R) |
|----|---------|------|---------|------|----------------|
| 12 | −10.2673 | (D12) | | | |
| 13 | 0.0000 | 0.71 | 1.51680 | 64.1 | |
| 14 | 0.0000 | (BF) | | | |

[Aspherical Data]

third surface

κ = 5.645, A4 = 8.6211E−05, A6 = −2.1308E−04, A8 = 2.6762E−05, A10 = −1.2594E−07 fourth surface

κ = 1.000, A4 = −9.2497E−04, A6 = −2.0163E−04, A8 = 3.0631E−05, A10 = −8.6828E−07 sixth surface

κ = 2.043, A4 = −3.0230E−03, A6 = −1.8165E−04, A8 = −9.9188E−06, A10 = 0.0000E+00 seventh surface

κ = −6.000, A4 = 0.0000E+00, A6 = 0.0000E+00, A8 = 0.0000E+00, A10 = 0.0000E+00 twelfth surface

κ = 1.000, A4 = 9.2424E−04, A6 = −6.6053E−05, A8 = 1.9619E−06, A10 = 0.0000E+00

[Variable Distance Data]

| | wide-angle end | intermediate | telephoto end |
|---|---|---|---|
| f | 3.63 | 7.48 | 15.4 |
| (D4) | 9.136 | 3.354 | 0.547 |
| (D10) | 2.991 | 6.974 | 15.179 |
| (D12) | 1.247 | 1.247 | 1.247 |
| (BF) | 0.763 | 0.763 | 0.763 |
| BF converted to air | 2.478 | 2.478 | 2.478 |
| Total length converted to air | 22.855 | 21.056 | 26.453 |

[Focal Length of Group]

| | first surface of group | focal length of group |
|---|---|---|
| first lens group | 1 | −8.00 |
| second lens group | 6 | 6.50 |
| third lens group | 11 | 13.14 |

[Conditional Expression Correspondence Value]

| | |
|---|---|
| Conditional Expression (11) | n12 = 1.63200 |
| Conditional Expression (12) | f12/(−f1) = 2.28 |
| Conditional Expression (13) | (−f1)/IH = 2.46 |
| Conditional Expression (14) | (−f1)/f2 = 1.23 |
| Conditional Expression (15) | vd1 = 23.4 |
| Conditional Expression (16) | vd21 = 67.1 |
| Conditional Expression (17) | −(R12 + R11)/(R12 − R11) = 0.92 |
| Conditional Expression (18) | vd22 = 31.3 |

As the data table in Table 7 shows, the zoom lens according to this example satisfies all the conditional expressions (11) to (18).

Figure 14A:
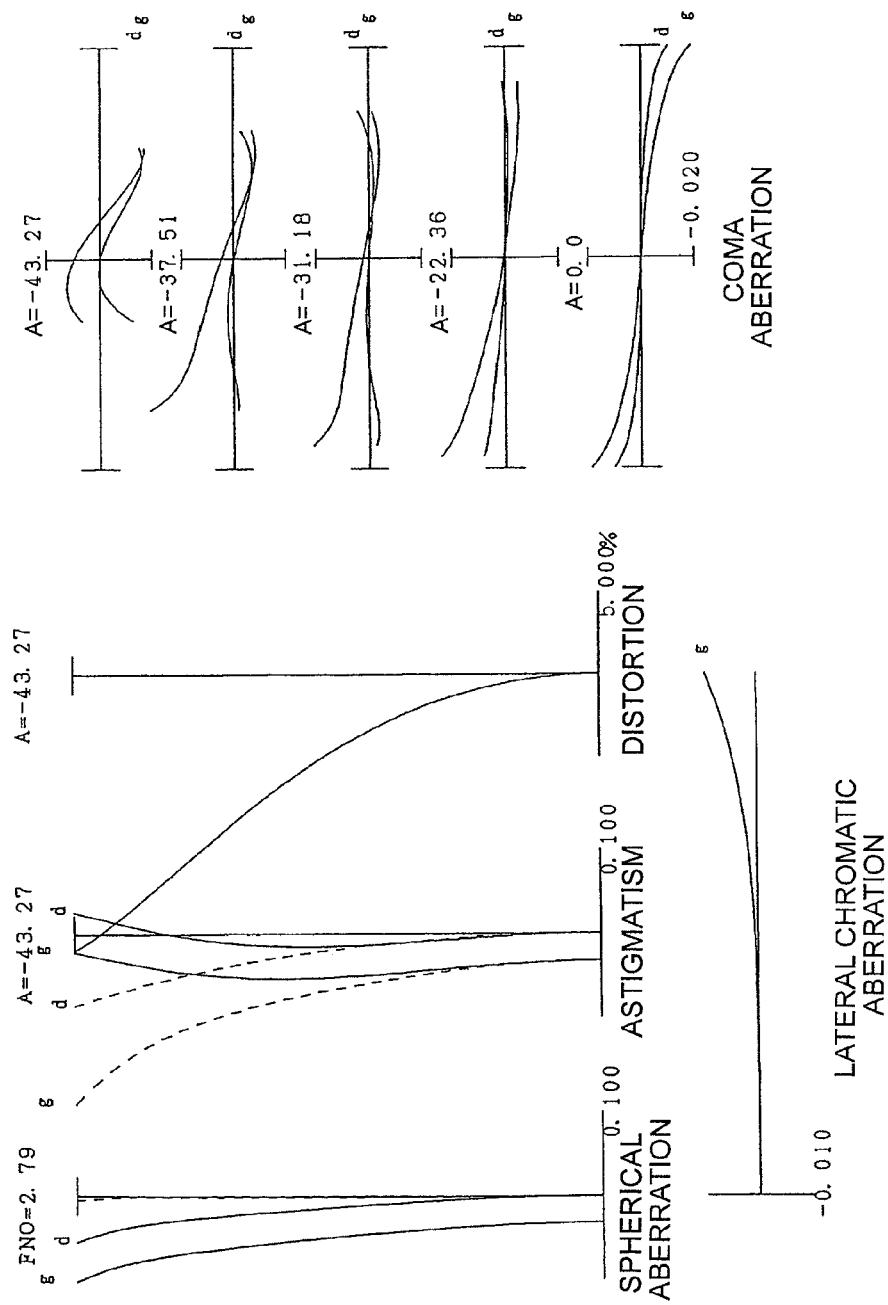
Figure 14B:
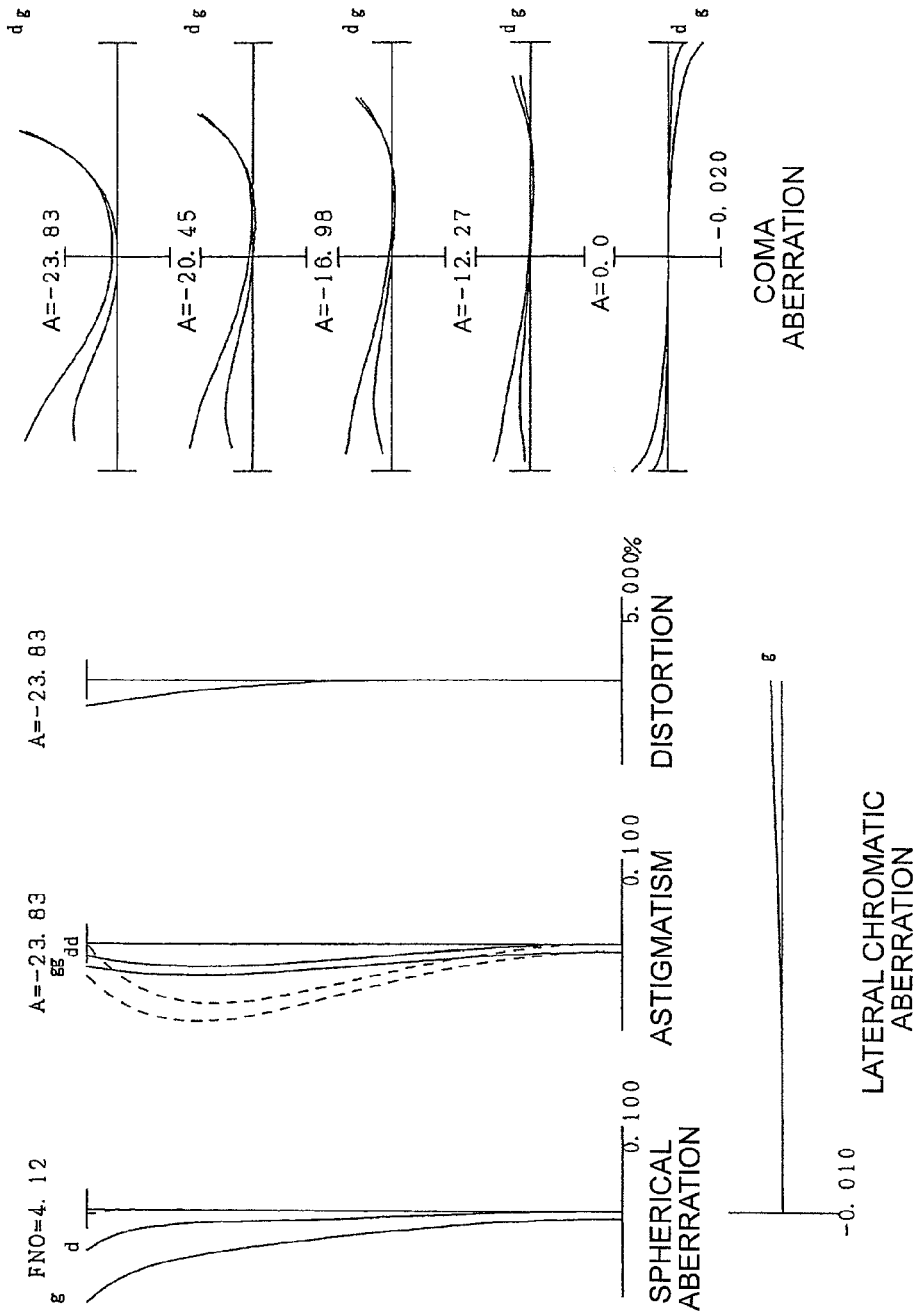

FIG. 14 are graphs showing various aberrations (spherical aberration, astigmatism, distortion, lateral chromatic aberration and coma aberration) according to Example 7, where FIG. 14A are graphs showing various aberrations of the zoom lens upon focusing on infinity in the wide-angle end state, FIG. 14B are graphs showing various aberrations of the zoom lens upon focusing on infinity in the intermediate focal length state, and FIG. 14C are graphs showing various aberrations of the zoom lens upon focusing on infinity in the telephoto end state. In each graph showing aberrations, FNo is an F number, and A is an angle of view. In the graphs showing spherical aberration, the solid line indicates spherical aberration, and the dotted line indicates a sine condition. In the graphs showing astigmatism, the solid line indicates the sagittal image surface, and the dotted line indicates the meridional image surface. In the graphs showing coma aberration, the meridional coma is shown. d indicates various aberrations at d-line (wavelength: 587.6 nm), and g indicates various aberrations at g-line (wavelength: 435.8 nm), and no indication indicates various aberrations at d-line. The description on the graphs showing aberrations is the same for the other examples, where this description is omitted.

As each graph showing aberrations clarifies, in the zoom lens according to Example 7, various aberrations other than distortion are corrected well in each focal length state, from the wide-angle end state to the telephoto end state. For the distortion, optical correction is unnecessary, since this amount of aberration can be sufficiently corrected by image processing after capturing the image.

Example 8

Example 8 will now be described using FIG. 15 and FIG. 16 and Table 8. FIG. 15 is a diagram depicting a configuration and a zoom locus of a lens according to Example 8. As FIG. 15 shows, the zoom lens ZL (ZL2) according to Example 8 comprises, in order from an object, a first lens group G1 having negative refractive power, a second lens group G2 having positive refractive power, and a third lens group G3 having positive refractive power.

The first lens group G1 comprises, in order from an object, a negative spherical meniscus lens L11 having a convex surface facing the object, and a positive meniscus lens L12 having a convex surface facing the object.

The second lens group G2 comprises, in order from an object, a biconvex positive lens L21, and a cemented lens of a positive meniscus lens L22 having a convex surface facing the object and a negative meniscus lens L23 having a convex surface facing the object.

The third lens group G3 comprises a positive meniscus plastic positive lens L31 having a convex surface facing the image.

An aperture stop S for adjusting quantity of light is disposed between the first lens group G1 and the second lens group G2. Between the third lens group 3 and the image plane I, a sensor cover glass CV of the solid-state image sensor, such as CCD, installed on the image plane I, is disposed.

According to this example, upon zooming from the wide-angle end state to the telephoto end state, the first lens group G1 and the second lens group G2 move, and the third lens group G3 is always fixed. The aperture stop S moves along with the second lens group G2.

Table 8 shows each data of Example 8. The surface numbers 1 to 14 in Table 8 correspond to the surfaces 1 to 14 in FIG. 15. In Example 8, the third surface, fourth surface, sixth surface, seventh surface and twelfth surface are formed to be aspherical.

TABLE 8

[General Data]

| | wide-angle end | intermediate | telephoto end |
|---|---|---|---|
| f | 3.63 | 7.88 | 17.11 |
| Fno | 2.75 | 4.10 | 7.05 |
| ω | 43.28 | 22.51 | 10.76 |
| image height | 2.85 | 3.25 | 3.25 |

TABLE 8-continued

[Lens Data]

| surface number | r | d | nd | vd | |
|---|---|---|---|---|---|
| 1 | 1000.0000 | 0.70 | 1.75500 | 52.3 | |
| 2 | 4.1278 | 1.30 | | | |
| 3 | 9.0001 | 1.65 | 1.62150 | 24.9 | |
| 4 | 38.3933 | (D4) | | | |
| 5 | 0.0000 | 0.00 | (aperture stop) | | |
| 6 | 4.3229 | 1.40 | 1.49589 | 82.2 | |
| 7 | −8.4553 | 0.10 | | | |
| 8 | 3.8877 | 1.25 | 1.81600 | 45.6 | |
| 9 | 27.1204 | 0.40 | 1.85026 | 32.4 | |
| 10 | 2.3579 | (D10) | | | |
| 11 | −78.9226 | 1.60 | 1.53110 | 56.0 | (ZEONEX E48R) |
| 12 | −7.2924 | (D12) | | | |
| 13 | 0.0000 | 0.71 | 1.51680 | 64.1 | |
| 14 | 0.0000 | (BF) | | | |

[Aspherical Data]

third surface

κ = 5.402, A4 = −5.0579E−04, A6 = −1.3041E−04, A8 = 7.0122E−06, A10 = 1.3040E−09 fourth surface

κ = 1.000, A4 = −9.5363E−04, A6 = −8.6402E−05, A8 = 5.5133E−06, A10 = 5.3923E−08 sixth surface

κ = 0.243, A4 = −8.6187E−04, A6 = 0.0000E+00, A8 = 0.0000E+00, A10 = 0.0000E+00 seventh surface

κ = −2.500, A4 = 0.0000E+00, A6 = 0.0000E+00, A8 = 0.0000E+00, A10 = 0.0000E+00 twelfth surface

κ = 1.000, A4 = 1.0246E−03, A6 = −4.4886E−05, A8 = 1.3988E−06, A10 = 0.0000E+00

[Variable Distance Data]

| | wide-angle end | intermediate | telephoto end |
|---|---|---|---|
| f | 3.63 | 7.88 | 17.11 |
| (D4) | 10.163 | 3.389 | 0.269 |
| (D10) | 2.602 | 6.726 | 15.678 |
| (D12) | 1.706 | 1.706 | 1.706 |
| (BF) | 0.763 | 0.763 | 0.763 |
| BF converted to air | 2.937 | 2.937 | 2.937 |
| Total length converted to air | 24.102 | 21.452 | 27.284 |

[Focal Length of Group]

| | first surface of group | focal length of group |
|---|---|---|
| first lens group | 1 | −8.45 |
| second lens group | 6 | 6.65 |
| third lens group | 11 | 15.00 |

[Conditional Expression Correspondence Value]

Conditional Expression (11)  n12 = 1.62150
Conditional Expression (12)  f12/(−f1) = 2.19
Conditional Expression (13)  (−f1)/IH = 2.60
Conditional Expression (14)  (−f1)/f2 = 1.27
Conditional Expression (15)  vd1 = 24.9
Conditional Expression (16)  vd21 = 82.2
Conditional Expression (17)  −(R12 + R11)/(R12 − R11) = 0.96
Conditional Expression (18)  vd22 = 32.4

As the data table in Table 8 shows, the zoom lens according to this example satisfies all the conditional expressions (11) to (18).

Figure 16A:
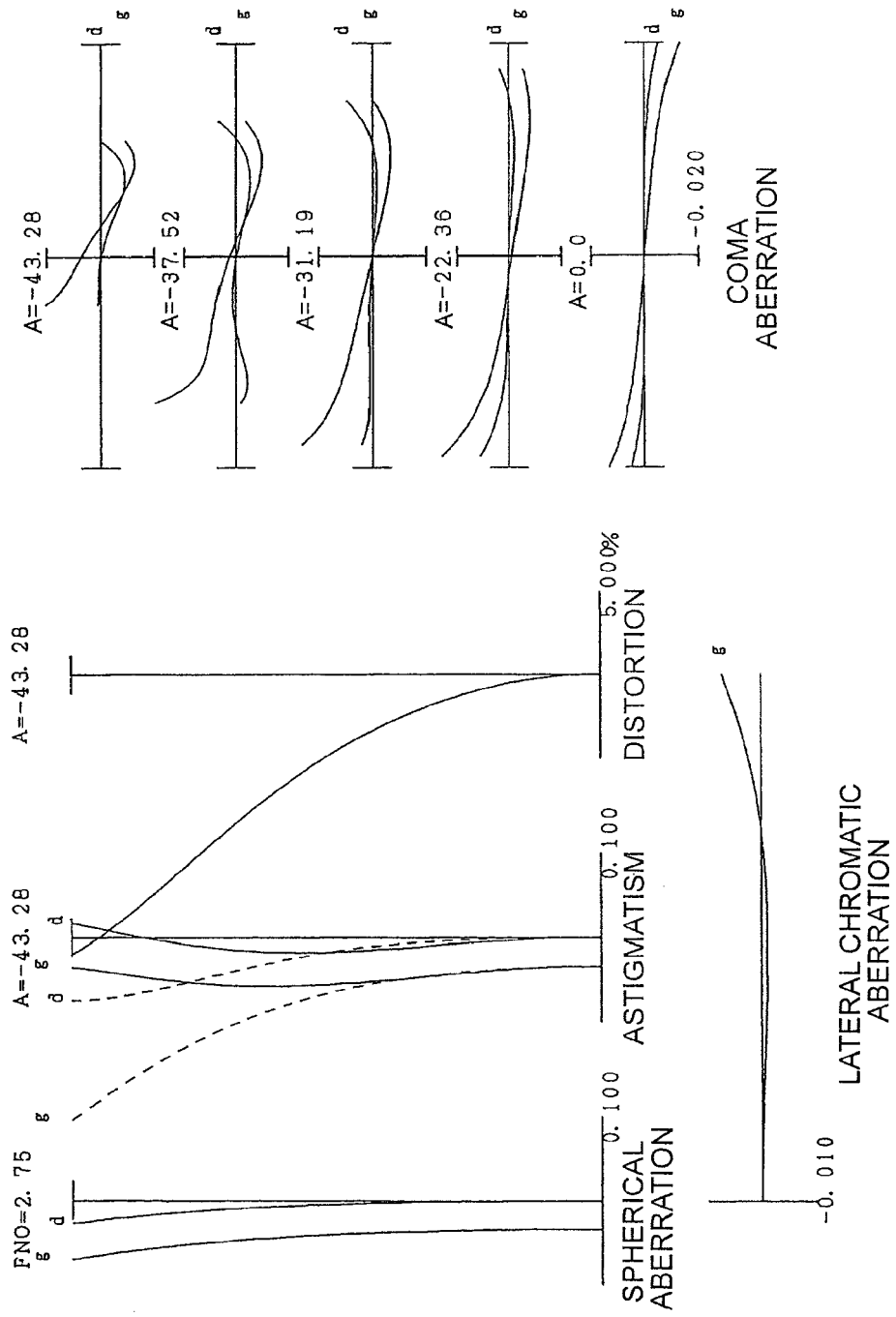
Figure 16B:
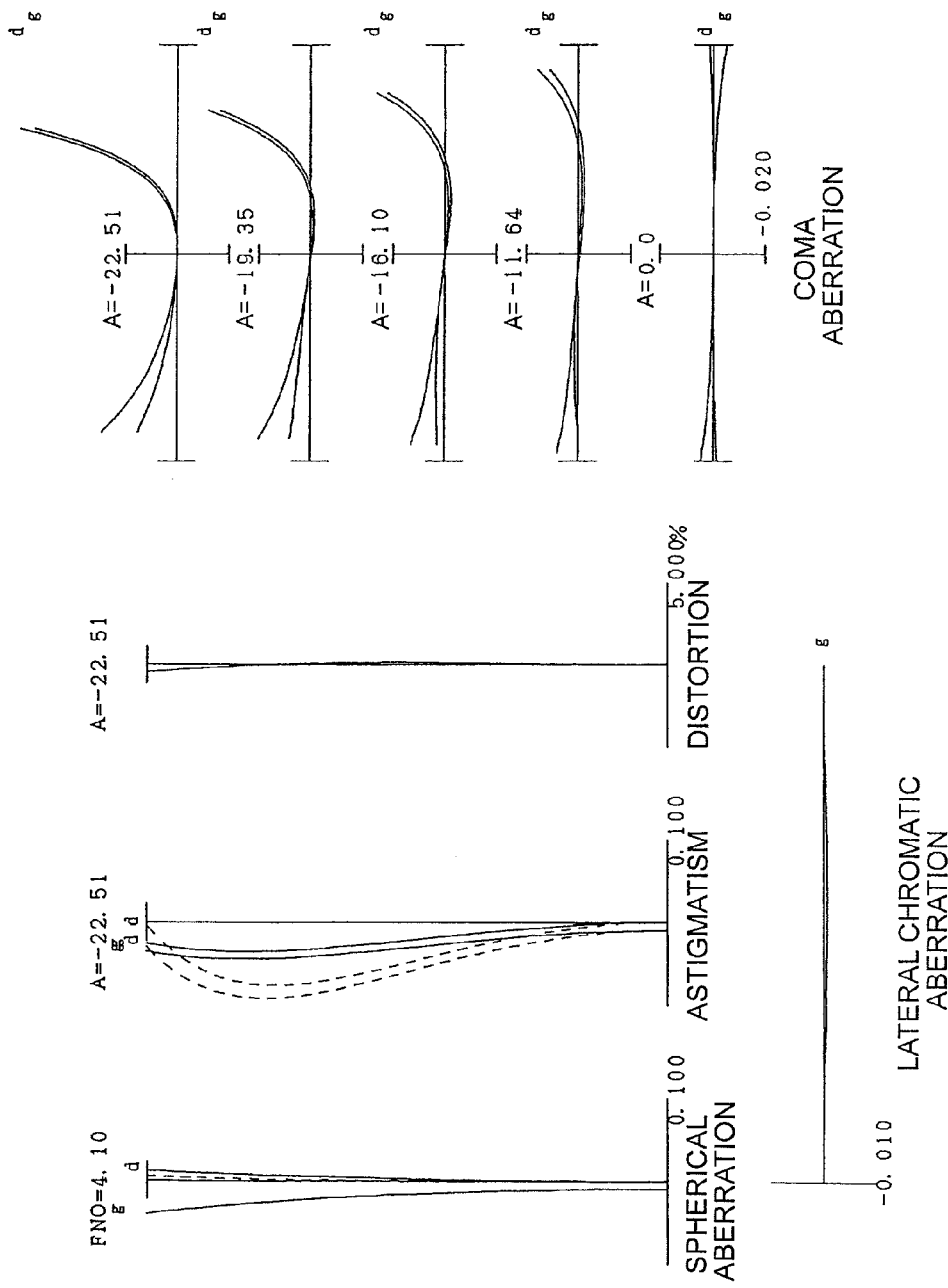

FIG. 16 are graphs showing various aberrations (spherical aberration, astigmatism, distortion, lateral chromatic aberration and coma aberration) according to Example 8, where FIG. 16A are graphs showing various aberrations of the zoom lens upon focusing on infinity in the wide-angle end state, FIG. 16B are graphs showing various aberrations of the zoom lens upon focusing on infinity in the intermediate focal length state, and FIG. 16C are graphs showing various aberrations of the zoom lens upon focusing on infinity in the telephoto end state. As each graph showing aberrations clarifies, in the zoom lens according to Example 2, various aberrations are corrected well in each focal length state, from the wide-angle end state to the telephoto end state. For distortion, optical correction is unnecessary, since this amount of aberration can be sufficiently corrected by image processing after capturing the image.

Example 9

Figure 17:
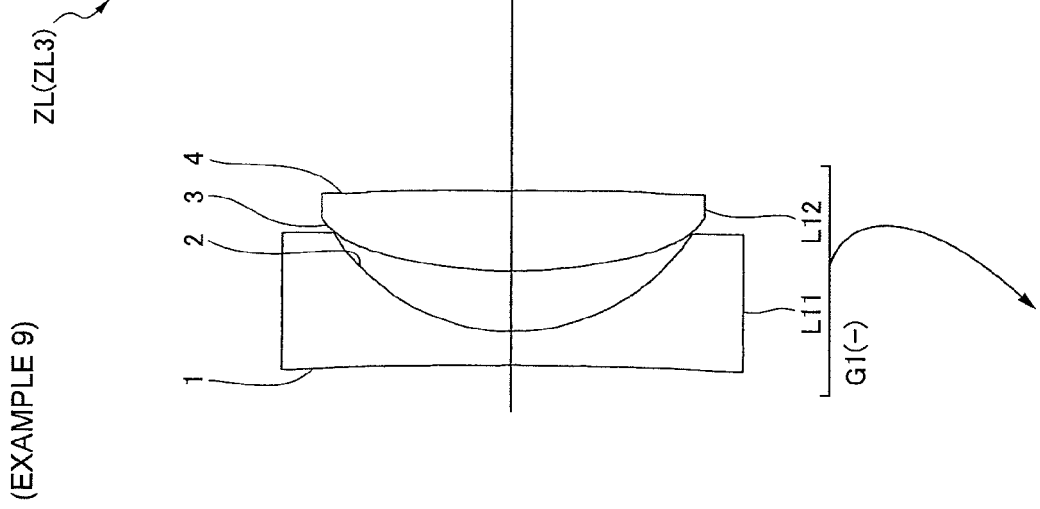
FIG. 17 is a diagram depicting a configuration and a zoom locus of the zoom lens according to Example 9.

Example 9 will now be described using FIG. 17, FIG. 18 and Table 9. FIG. 17 is a diagram depicting a configuration and a zoom locus of a lens according to Example 9. As FIG. 17 shows, the zoom lens ZL (ZL3) according to Example 9 comprises, in order from an object, a first lens group G1 having negative refractive power, a second lens group G2 having positive refractive power, and a third lens group G3 having positive refractive power.

The first lens group G1 comprises, in order from an object, a biconcave spherical lens L11, and a positive meniscus lens L12 having a convex surface facing the object.

The second lens group G2 comprises, in order from an object, a biconvex positive lens L21, and a cemented lens of a positive meniscus lens L22 having a convex surface facing the object and a negative meniscus lens L23 having a convex surface facing the object.

The third lens group G3 comprises a biconvex plastic positive lens L31.

An aperture stop S for adjusting quantity of light is disposed between the biconvex positive lens L21, and the cemented lens of the positive meniscus lens L22 having a convex surface facing the object and the negative meniscus lens L23 having a convex surface facing the object. Between the third lens group G3 and the image plane I, a sensor cover glass CV of the solid-state image sensor, such as CCD, installed on the image plane I, is disposed.

According to this example, all the lens groups, that is, the first lens group G1 to the third lens group G3, move upon zooming from the wide-angle end state to the telephoto end state. The aperture stop S also moves along with the second lens group G2.

Table 9 shows each data of Example 9. The surface numbers 1 to 14 in Table 9 correspond to the surfaces 1 to 14 in FIG. 17. In Example 9, the third surface, fourth surface, fifth surface, sixth surface and twelfth surface are formed to be aspherical.

TABLE 9

[General Data]

| | wide-angle end | intermediate | telephoto end |
|---|---|---|---|
| f | 3.63 | 7.70 | 16.35 |
| Fno | 2.72 | 4.07 | 6.95 |
| ω | 43.33 | 23.06 | 11.24 |
| image height | 2.85 | 3.25 | 3.25 |

TABLE 9-continued

[Lens Data]

| surface number | r | d | nd | vd | |
|---|---|---|---|---|---|
| 1 | −102.4852 | 0.70 | 1.75500 | 52.3 | |
| 2 | 4.4036 | 1.25 | | | |
| 3 | 10.3541 | 1.65 | 1.63200 | 23.4 | |
| 4 | 75.6572 | (D4) | | | |
| 5 | 4.5335 | 1.40 | 1.59201 | 67.1 | |
| 6 | −11.0929 | 0.00 | | | |
| 7 | 0.0000 | 0.10 | (aperture stop) | | |
| 8 | 3.8877 | 1.25 | 1.77250 | 49.6 | |
| 9 | −23.2550 | 0.40 | 1.85026 | 32.4 | |
| 10 | 2.3444 | (D10) | | | |
| 11 | 83.7966 | 1.75 | 1.53110 | 56.0 | (ZEONEX E48R) |
| 12 | −7.4763 | (D12) | | | |
| 13 | 0.0000 | 0.71 | 1.51680 | 64.1 | |
| 14 | 0.0000 | (BF) | | | |

[Aspherical Data]

third surface

κ = 6.352, A4 = −7.9897E−04, A6 = −6.0381E−05, A8 = 3.8609E−06, A10 = 1.2414E−07 fourth surface

κ = 1.000, A4 = −1.1791E−03, A6 = −2.3964E−05, A8 = 2.9507E−06, A10 = 6.6300E−08 fifth surface

κ = 0.835, A4 = −1.1780E−03, A6 = 0.0000E+00, A8 = 0.0000E+00, A10 = 0.0000E+00 sixth surface

κ = 1.000, A4 = 6.4163E−04, A6 = 0.0000E+00, A8 = 0.0000E+00, A10 = 0.0000E+00 twelfth surface

κ = 1.000, A4 = 1.3503E−03, A6 = −7.8321E−05, A8 = 2.4062E−06, A10 = 0.0000E+00

[Variable Distance Data]

| | wide-angle end | intermediate | telephoto end |
|---|---|---|---|
| f | 3.63 | 7.70 | 16.35 |
| (D4) | 10.422 | 3.570 | 0.334 |
| (D10) | 2.948 | 6.712 | 14.999 |
| (D12) | 1.519 | 1.635 | 1.892 |
| (BF) | 0.400 | 0.400 | 0.400 |
| BF converted to air | 2.387 | 2.503 | 2.760 |
| Total length converted to air | 24.256 | 21.285 | 26.593 |

[Focal Length of Group]

| | first surface of group | focal length of group |
|---|---|---|
| first lens group | 1 | −8.66 |
| second lens group | 5 | 6.65 |
| third lens group | 11 | 13.00 |

[Conditional Expression Correspondence Value]

Conditional Expression (11) n12 = 1.63200
Conditional Expression (12) f12/(−f1) = 2.17
Conditional Expression (13) (−f1)/IH = 2.66
Conditional Expression (14) (−f1)/f2 = 1.30
Conditional Expression (15) vd1 = 23.4
Conditional Expression (16) vd21 = 67.1
Conditional Expression (17) −(R12 + R11)/(R12 − R11) = 0.92
Conditional Expression (18) vd22 = 32.4

As the data table in Table 9 shows, the zoom lens according to this example satisfies all the conditional expressions (11) to (18).

Figure 18A:
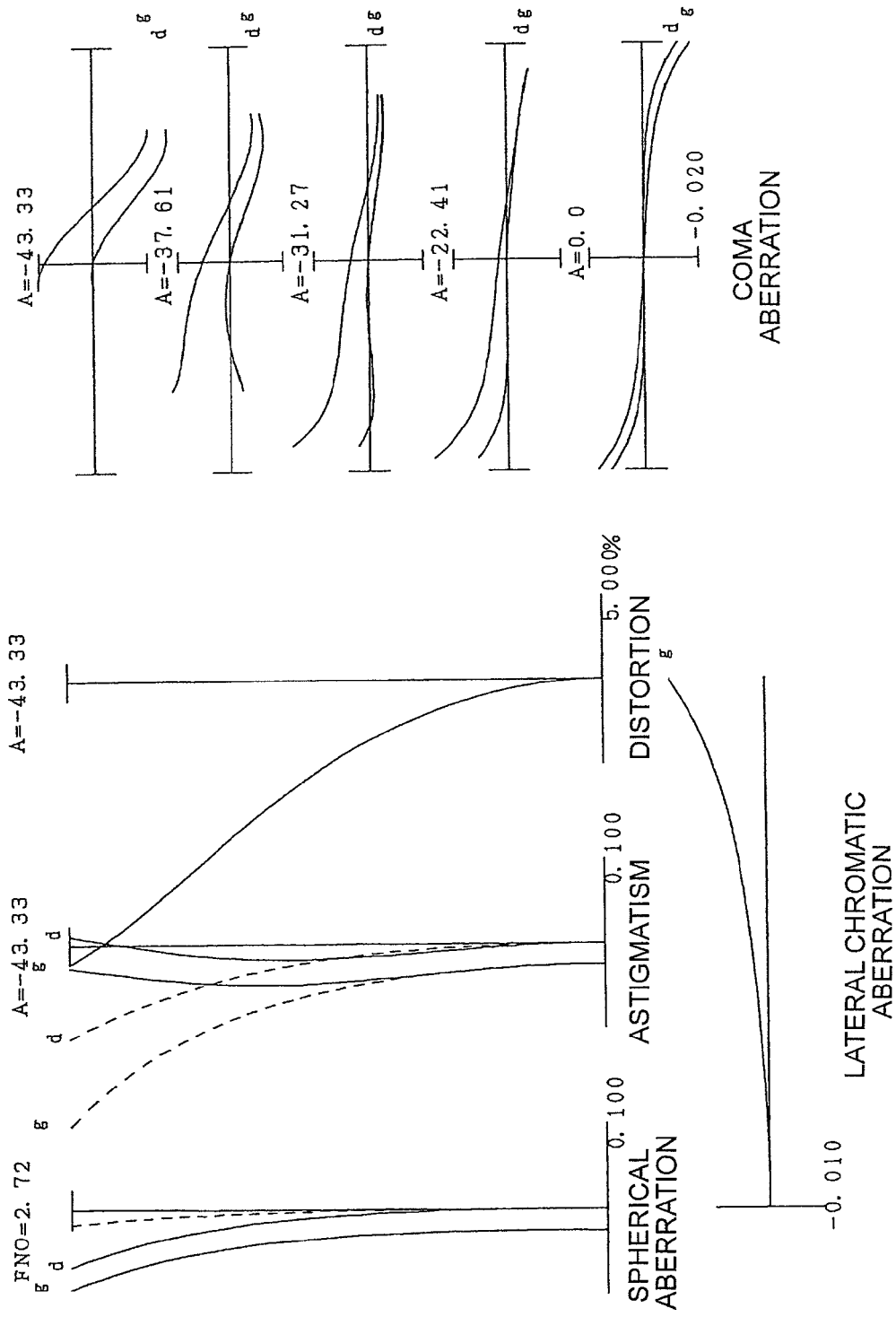
FIGS. 18A-C are graphs showing various aberrations of the zoom lens according to Example 9, where FIG. 18A are graphs showing various aberrations of the zoom lens upon focusing on infinity in the wide-angle end sate, FIG. 18B are graphs showing various aberrations of the zoom lens upon focusing on infinity in the intermediate focal length state, and FIG. 18C are graphs showing various aberrations of the zoom lens upon focusing on infinity in the telephoto end state.
Figure 18B:
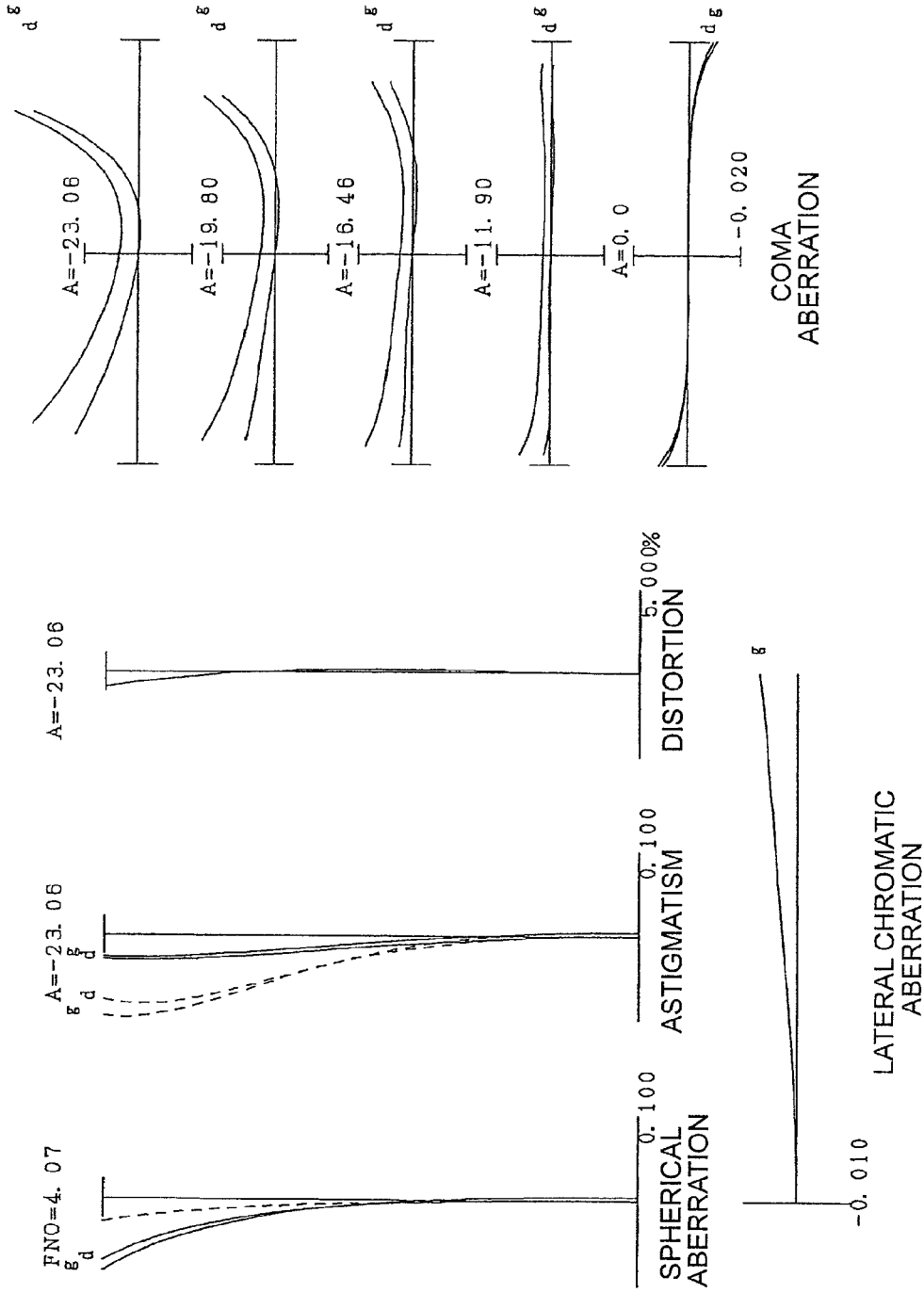
Figure 18C:
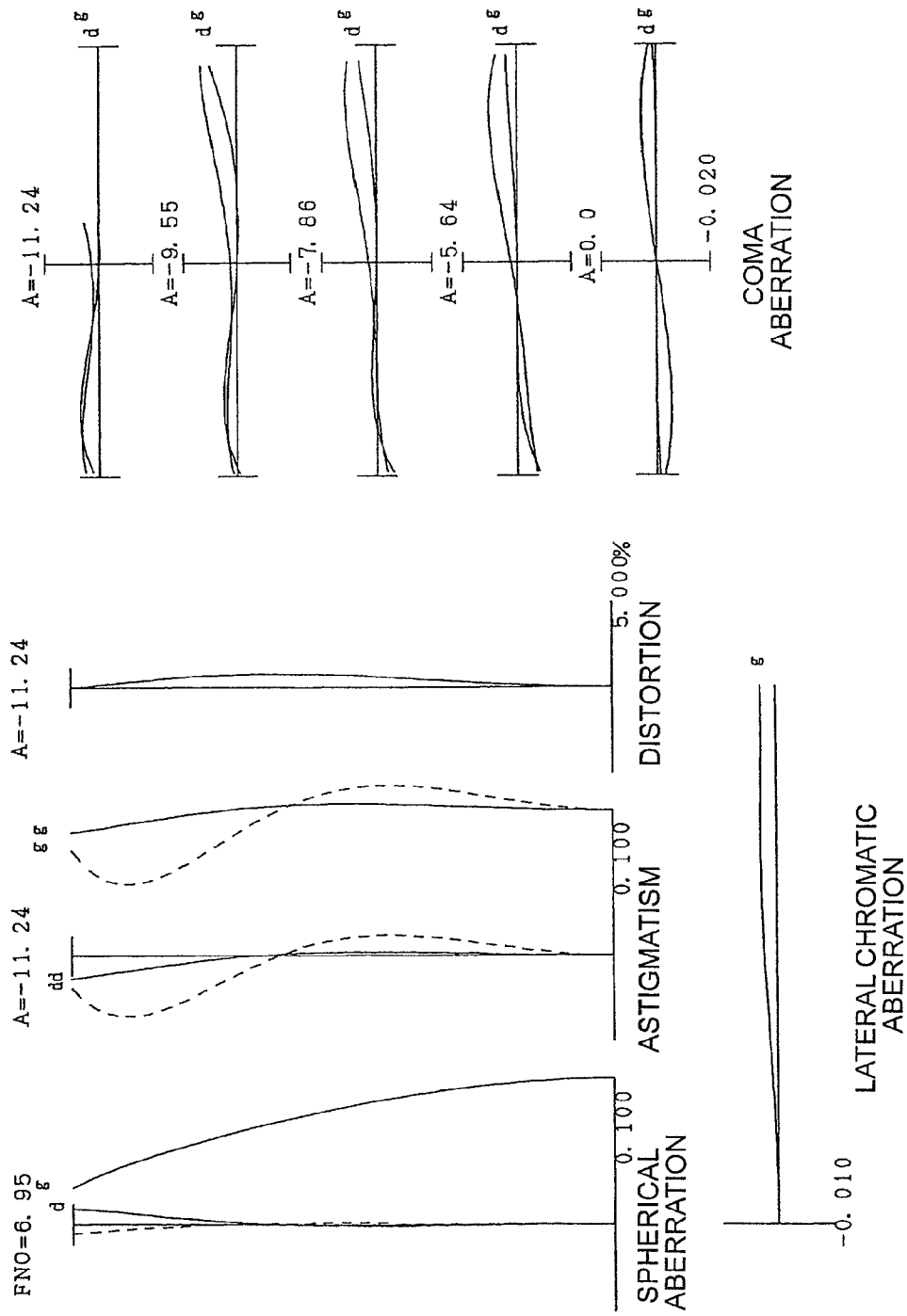

FIG. 18 are graphs showing various aberrations (spherical aberration, astigmatism, distortion, lateral chromatic aberration and coma aberration) according to Example 9, where FIG. 18A are graphs showing various aberrations of the zoom lens upon focusing on infinity in the wide-angle end state, FIG. 18B are graphs showing various aberrations of the zoom lens upon focusing on infinity in the intermediate focal length state, and FIG. 18C are graphs showing various aberrations of the zoom lens upon focusing on infinity in the telephoto end state. As each graph showing aberrations clarifies, in the zoom lens according to Example 3, various aberrations are corrected well in each focal length state, from the wide-angle end state to the telephoto end state. For distortion, optical correction is unnecessary, since this amount of aberration can be sufficiently corrected by image processing after capturing the image.

In the first and second embodiments described above, the following content can be adopted within a range where the optical performance is not diminished.

In the above examples, the zoom lens comprised of three lens groups or four lens groups were shown, but the present invention can also be applied to a configuration using a different number of lens groups, such as five lens groups. In the configuration, a lens or a lens group may be added to the side closest to the object, or a lens or a lens group may be added to the side closest to the image. A "lens group" refers to a portion having a least one lens isolated by an air space which changes upon zooming.

In the above embodiment, a single or a plurality of lens group(s) or a partial lens group may be designed to be a focusing lens group, which performs focusing from an object at infinity to an object at close distance by moving in the optical axis direction. This focusing lens group can be applied to auto focus, and is also suitable for driving a motor for auto focusing (e.g. driving using an ultrasonic motor). It is particularly preferable that the third lens group is designed to be the focusing lens group.

In the above embodiments, a lens group or a partial lens group may be designed to be a vibration-isolating lens group, which corrects image blurs generated by hand motion by moving the lens group or the partial lens group in a direction perpendicular to the optical axis or rotating (oscillating) the lens group or the partial lens group in an in-plane direction including the optical axis. It is particularly preferable that at least a part of the second lens group is designed to be the vibration-isolating lens group.

In the above embodiments, the lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. Even if the image plane is shifted, the drawing performing is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite aspherical surface generated by forming a resin on the surface of the glass to be an aspherical shape. The lens surface may be a diffraction surface, and the lens may be a refractive index distributed lens (GRIN lens) or a plastic lens.

In the above embodiments, it is preferable that the aperture stop is disposed among or near the second lens group, but the role of the aperture stop may be substituted by the frame of the lens, without disposing a separate element as the aperture stop.

In the above embodiments, each lens surface may be coated with an anti-reflection film which has high transmittance in a wide wavelength region, in order to decrease flares and ghosts, and implement a high optical performance with high contrast.

The zoom ratio of the zoom lens (zooming optical system) according to the above embodiments is about 2 to 7 in the case of the first embodiment, and 2 to 7 in the second embodiment.

In the zoom lens (zooming optical system) according to the Above embodiments, it is preferable that the first lens group has one positive lens component and one negative lens component. It is preferable that the lens components are disposed, in order from the object, to be in the sequence of negative and positive, with an air space there between.

In the zoom lens (zooming optical system) according to the Above embodiments, it is preferable that the second lens group has one positive lens component and one negative lens component. It is preferable that the lens components are disposed, in order from the object, to be in the sequence of positive and negative, with an air space there between.

In the zoom lens (zooming optical system) according to the Above embodiments, it is preferable that the third lens group has one positive lens component.

The zoom lens (zooming optical system) according to the Above embodiments is used for a digital still camera, but the present invention is not limited to this, but may be used for such a optical apparatus as a digital video camera.

The present invention was described with configuration requirements in the embodiments, but needless to say, the present invention is not limited to these embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object:
   a first lens group having negative refractive power; a second lens group having positive refractive power; and a third lens group having positive refractive power, at least the first lens group and the second lens group moving along the optical axis respectively upon zooming from a wide-angle end state to a telephoto end state,
   the first lens group including, in order from the object, a first lens having negative refractive power and a second lens having positive refractive power, and the second lens being a plastic lens having an aspherical surface,
   the second lens group including, in order from the object, a third lens having positive refractive power, a fourth lens and a fifth lens, and one of the fourth lens and the fifth lens being a negative lens and the other a positive lens,
   the third lens group including a sixth lens having positive refractive power, and
   the following conditional expressions being satisfied respectively:

$1.50 < (-f1)/fw < 2.52$ $0.4 < (-f1)/fL2 < 0.8$ $n2 \times n2 \times v2 < 77.0$ where f1 denotes a focal length of the first lens group,
   fw denotes a focal length of the zoom lens in the wide-angle end state,
   fL2 denotes a focal length of the seconds lens,
   n2 denotes a refractive index of the second lens,
   and v2 denotes an Abbe number of the second lens.

2. The zoom lens according to claim 1, wherein the following conditional expression is satisfied:

$1.89 < f2/(-fLn) < 2.85$ where f2 denotes a focal length of the second lens group, and fLn denotes a focal length of the negative lens out of the fourth lens and the fifth lens.

3. The zoom lens according to claim 1, wherein the following conditional expression is satisfied:

$-1.8 < (Rb+Ra)/(Rb-Ra) < 0.1$ where Rb denotes a radius of curvature of the lens surface, which is closest to the image, of the sixth lens, and Ra denotes a radius of curvature of the lens surface, which is closest to the object, of the sixth lens.

4. The zoom lens according to claim 1, wherein the following conditional expression is satisfied:

$0.9 < (-f1)/f2 < 1.4$ where f2 denotes a focal length of the second lens group.

5. The zoom lens according to claim 1, wherein the following conditional expression is satisfied:

$-1.2 < (Rd+Rc)/(Rd-Rc) < -0.1$ where Rd denotes a radius of curvature of the image side lens surface of the first lens, and Rc denotes a radius of curvature of the object side lens surface of the first lens.

6. The zoom lens according to claim 1, wherein the following conditional expression is satisfied:

$0.30 < \Sigma D1/(-f1) < 0.50$ where $\Sigma D1$ denotes a distance on the optical axis from the object side lens surface of the first lens to the image side lens surface of the second lens.

7. The zoom lens according to claim 1, wherein the sixth lens has an aspherical surface.

8. The zoom lens according to claim 1, wherein the sixth lens is a plastic lens.

9. The zoom lens according to claim 1, wherein the following conditional expression is satisfied:

$48.0 < v3$ where v3 denotes an Abbe number of the third lens.

10. The zoom lens according to claim 1, wherein the third lens has an aspherical surface.

11. The zoom lens according to claim 1, wherein the fourth lens and the fifth lens constitute a cemented lens.

12. The zoom lens according to claim 1, wherein focusing is performed from an object at infinity to an object at a finite distance by moving the third lens group along the optical axis.

13. An optical apparatus comprising a zoom lens for forming an image of an object on a predetermined surface, the zoom lens being the zoom lens according to claim 1.

14. A method for manufacturing a zoom lens used for manufacturing the zoom lens according to claim 1.

15. The method for manufacturing a zoom lens according to claim 14, wherein the following conditional expression is satisfied:

$1.89 < f2/(-fLn) < 2.85$ where f2 denotes a focal length of the second lens group, and fLn denotes a focal length of the negative lens out of the fourth lens and the fifth lens.

16. The method for manufacturing a zoom lens according to claim 14, wherein the following conditional expression is satisfied:

$-1.8 < (Rb+Ra)/(Rb-Ra) < 0.1$ where Rb denotes a radius of curvature of the lens surface, which is closest to the image, of the sixth lens, and Ra denotes a radius of curvature of the lens surface, which is closest to the object, of the sixth lens.

17. The method for manufacturing a zoom lens according to claim 14, wherein the following conditional expression is satisfied:

$$0.9<(-f1)/f2<1.4$$

where f2 denotes a focal length of the second lens group.

18. The method for manufacturing a zoom lens according to claim 14, wherein the following conditional expression is satisfied:

$$-1.2<(Rd+Rc)/(Rd-Rc)<-0.1$$

where Rd denotes a radius of curvature of the image side lens surface of the first lens, and Rc denotes a radius of curvature of the object side lens surface of the first lens.

19. The method for manufacturing a zoom lens according to claim 14, wherein the following conditional expression is satisfied:

$$0.30<\Sigma D1/(-f1)<0.50$$

where $\Sigma D1$ denotes a distance on the optical axis from the object side lens surface of the first lens to the image side lens surface of the second lens.

20. A zoom lens comprising, in order from the object:
a first lens group having negative refractive power; a second lens group having positive refractive power; and a third lens group having positive refractive power,
the first lens group being constituted only by one negative spherical lens and one positive lens having an air space therebetween,
the second lens group being constituted by three or less lenses including at least one positive lens and one negative lens, and
the following conditional expressions being satisfied:

$$1.4<n12<1.7$$

$$2.05<f12/(-f1)<3.50$$

$$2.0<(-f1)/IH<3.3$$

where n12 denotes refractive index of the positive lens constituting the first lens group, f12 denotes a focal length of the positive lens constituting the first lens group, f1 denotes a focal length of the first lens group, and IH denotes a maximum image height on an image forming 21. The zoom lens according to claim 20, wherein the following conditional expression is satisfied:

$$0.8<(-f1)/f2<1.8$$

where f2 denotes a focal length of the second lens group.

22. The zoom lens according to claim 20, wherein the following conditional expression is satisfied:

$$15.0<vd1<35.0$$

where vd1 denotes an Abbe number of the positive lens constituting the first lens group.

23. The zoom lens according to claim 20, wherein the following conditional expression is satisfied:

$$55.0<vd21<95.0$$

where vd21 denotes an Abbe number of the positive lens closest to the object out of the positive lenses constituting the second lens group.

24. The zoom lens according to claim 20, wherein the negative spherical lens constituting the first lens group satisfies the following conditional expression:

$$0.60<-(R12+R11)/(R12-R11)<1.50$$

where R11 denotes a radius of curvature of the object side lens surface, and R12 denotes a radius of curvature of the image side lens surface.

25. The zoom lens according to claim 20, wherein the following conditional expression is satisfied:

$$25.0<vd22<55.0$$

where vd22 denotes an Abbe number of the negative lens closest to the image out of the negative lenses constituting the second lens group.

26. The zoom lens according to claim 20, wherein the third lens group is constituted by one lens.

27. The zoom lens according to claim 20, wherein the third lens group is constituted by plastic lenses.

28. The zoom lens according to claim 20, wherein the positive lens constituting the first lens group is a plastic lens.

29. The zoom lens according to claim 20, wherein an aperture stop is disposed closer to the image side than the first lens group.

30. The zoom lens according to claim 20, wherein upon zooming from a wide-angle end state to a telephoto end state, the aperture stop moves along with the second lens group.

31. An optical apparatus comprising the zoom Lens according to claim 20.

32. A method for manufacturing a zoom lens used for manufacturing the zoom lens according to claim 20.

33. The method for manufacturing a zoom lens according to claim 32, wherein the following conditional expression is satisfied:

$$0.8<(-f1)/f2<1.8$$

where f2 denotes a focal length of the second lens group.

34. The method for manufacturing a zoom lens according to claim 32, wherein the following conditional expression is satisfied:

$$15.0<vd1<35.0$$

where vd1 denotes an Abbe number of the positive lens constituting the first lens group.

35. The method for manufacturing a zoom lens according to claim 32, wherein the following conditional expression is satisfied:

$$55.0<vd21<95.0$$

where vd21 denotes an Abbe number of the positive lens closest to the object out of the positive lenses constituting the second lens group.

36. The method for manufacturing a zoom lens according to claim 32, wherein the negative spherical lens constituting the first lens group satisfies the following conditional expression:

$$0.60<-(R12+R11)/(R12-R11)<1.50$$

where R11 denotes a radius of curvature of the object side lens surface, and R12 denotes a radius of curvature of the image side lens surface.

* * * * *